United States Patent
Ono

(10) Patent No.: US 11,122,215 B2
(45) Date of Patent: Sep. 14, 2021

(54) IMAGING APPARATUS, UNMANNED MOVING OBJECT, IMAGING METHOD, SYSTEM, AND PROGRAM

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/950,875

(22) Filed: Nov. 17, 2020

(65) Prior Publication Data

US 2021/0075953 A1 Mar. 11, 2021

Related U.S. Application Data

(63) Continuation of application No. PCT/JP2019/022149, filed on Jun. 4, 2019.

(30) Foreign Application Priority Data

Jun. 21, 2018 (JP) ............................. JP2018-118240

(51) Int. Cl.
*H04N 5/235* (2006.01)
*G02B 13/02* (2006.01)
(Continued)

(52) U.S. Cl.
CPC ........... *H04N 5/2355* (2013.01); *G02B 13/02* (2013.01); *G06T 5/50* (2013.01); *H04N 5/2257* (2013.01)

(58) Field of Classification Search
CPC .. H04N 5/2355; H04N 5/2257; H04N 5/2351; H04N 9/045; H04N 5/2353;
(Continued)

(56) References Cited

U.S. PATENT DOCUMENTS

| 10,025,999 B2 | 7/2018 | Tani et al. |
| 2013/0155293 A1* | 6/2013 | Lee .................... H04N 5/23222 348/240.2 |

(Continued)

FOREIGN PATENT DOCUMENTS

| JP | 2006189940 | 7/2006 |
| JP | 2007164258 | 6/2007 |

(Continued)

OTHER PUBLICATIONS

"International Search Report (Form PCT/ISA/210)" of PCT/JP2019/022149, dated Aug. 13, 2019, with English translation thereof, pp. 1-5.

(Continued)

*Primary Examiner* — Mekonnen D Dagnew
(74) *Attorney, Agent, or Firm* — JCIPRNET

(57) ABSTRACT

An imaging apparatus, an unmanned moving object, an imaging method, a system, and a program capable of favorably compositing a telephoto image group even in a case where an overlapping region between images of the telephoto image group is small, and accurately compositing a telephoto image regardless of a subject (scene) of a wide angle image are provided. An imaging apparatus (100) includes an imaging optical system, a directional sensor, a wide dynamic range image generation part (302) that generates a wide dynamic range wide angle image obtained by enlarging a dynamic range of a wide angle image, an image acquisition part (2a) that acquires a wide dynamic range wide angle image group and a telephoto image group configured with a telephoto image, a composition information acquisition part (2b) that acquires composition information to be used for compositing the telephoto image group by analyzing the acquired wide dynamic range wide angle image group, and a composite image generation part (2c) that generates an image in which the telephoto image group (Continued)

is composited, based on the composition information, information related to focal lengths of the wide angle optical system and the telephoto optical system, and the telephoto image group.

16 Claims, 36 Drawing Sheets

(51) Int. Cl.
*G06T 5/50* (2006.01)
*H04N 5/225* (2006.01)

(58) Field of Classification Search
CPC .... H04N 5/232; H04N 5/23238; H04N 5/265; H04N 7/18; G02B 13/02; G02B 13/00; G02B 17/08; G06T 5/50; G06T 3/4038; G03B 7/091; G03B 15/00; G03B 19/07; G03B 37/00

See application file for complete search history.

(56) References Cited

U.S. PATENT DOCUMENTS

| | | |
|---|---|---|
| 2017/0099436 A1 | 4/2017 | Ono |
| 2017/0289461 A1 | 10/2017 | Ono |
| 2018/0096487 A1* | 4/2018 | Nash ................. H04N 5/23232 |
| 2018/0152624 A1* | 5/2018 | Li .......................... H04N 5/265 |
| 2019/0082093 A1 | 3/2019 | Ono |
| 2020/0314309 A1* | 10/2020 | Kitaura ................ H04N 5/2628 |
| 2021/0044753 A1* | 2/2021 | Uekusa ............ H04N 5/232935 |

FOREIGN PATENT DOCUMENTS

| | | |
|---|---|---|
| JP | 2016012785 | 1/2016 |
| JP | 2016164745 | 9/2016 |
| JP | 2017022574 | 1/2017 |
| WO | 2016080081 | 5/2016 |
| WO | 2017199557 | 11/2017 |

OTHER PUBLICATIONS

"Written Opinion of the International Searching Authority (Form PCT/ISA/237)" of PCT/JP2019/022149, dated Aug. 13, 2019, with English translation thereof, pp. 1-9.

\* cited by examiner

FIG. 1
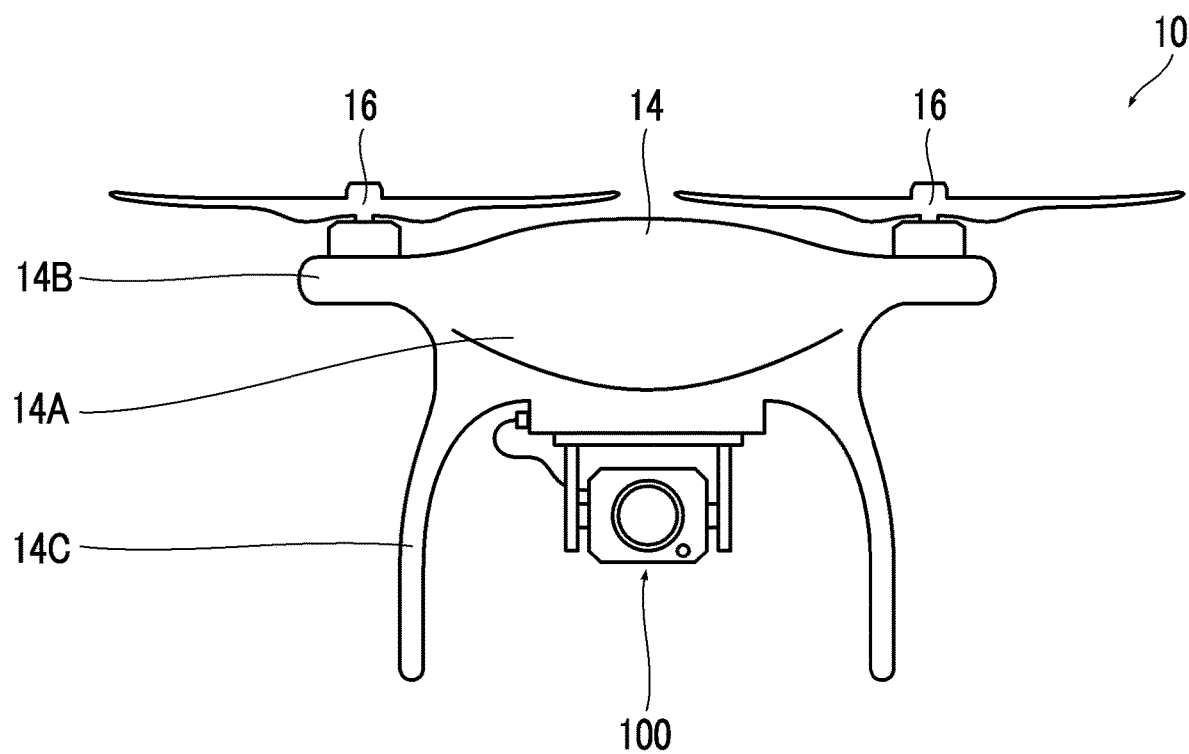
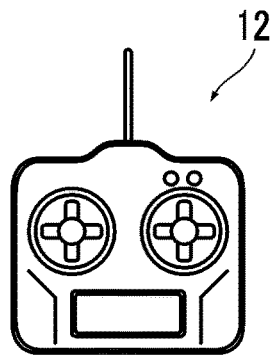

FIG. 18
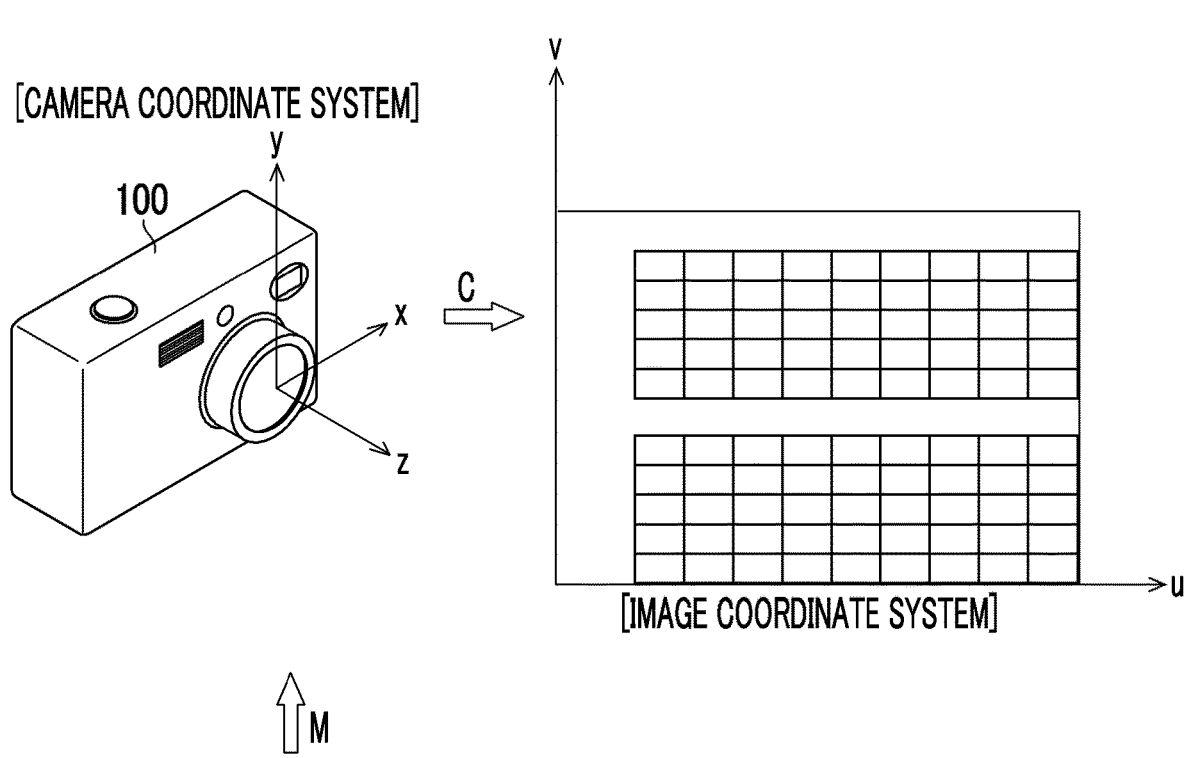
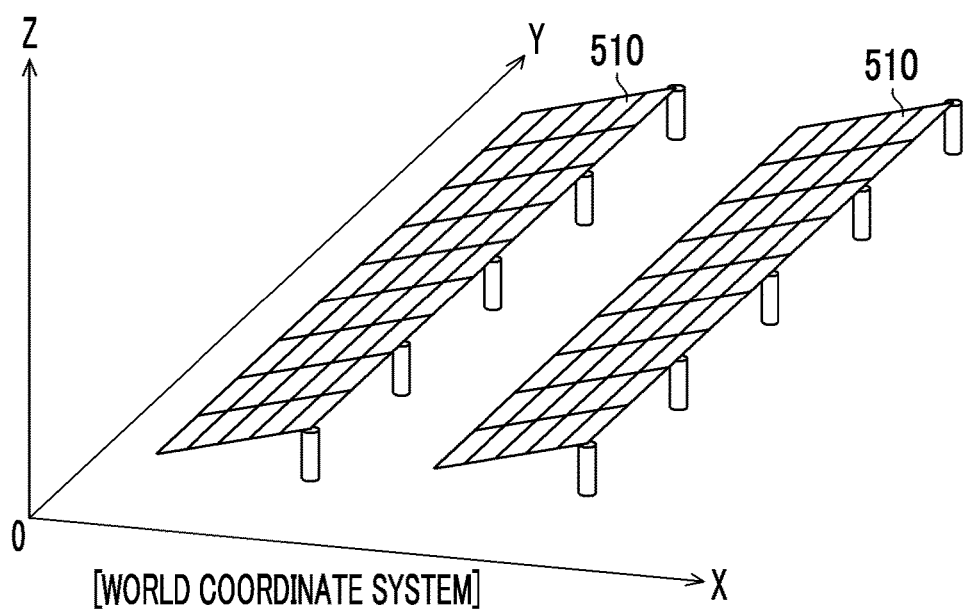

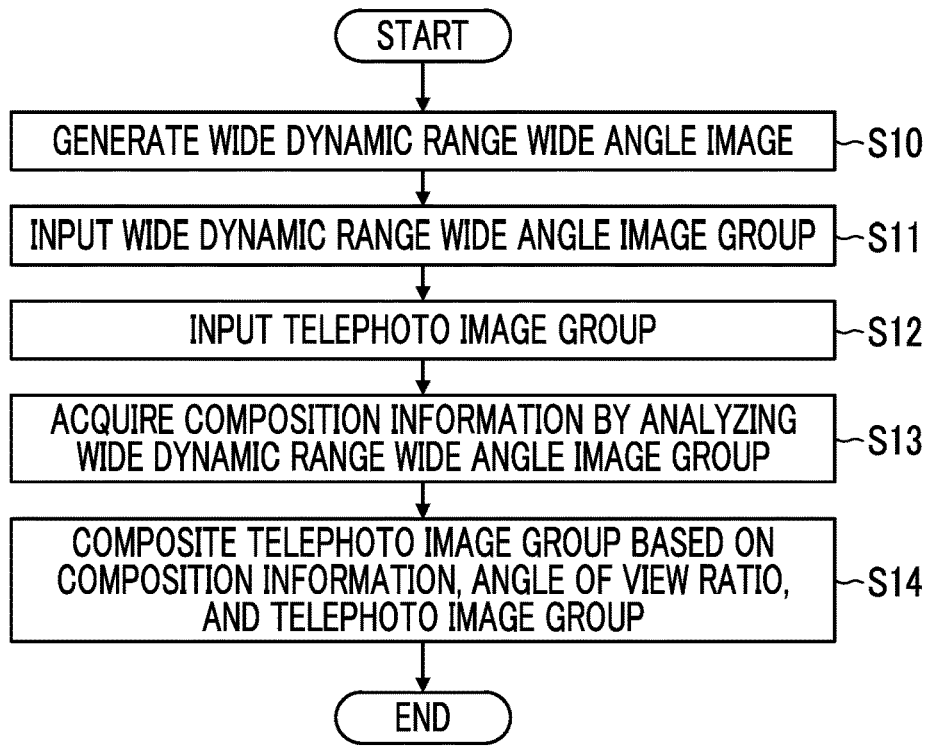
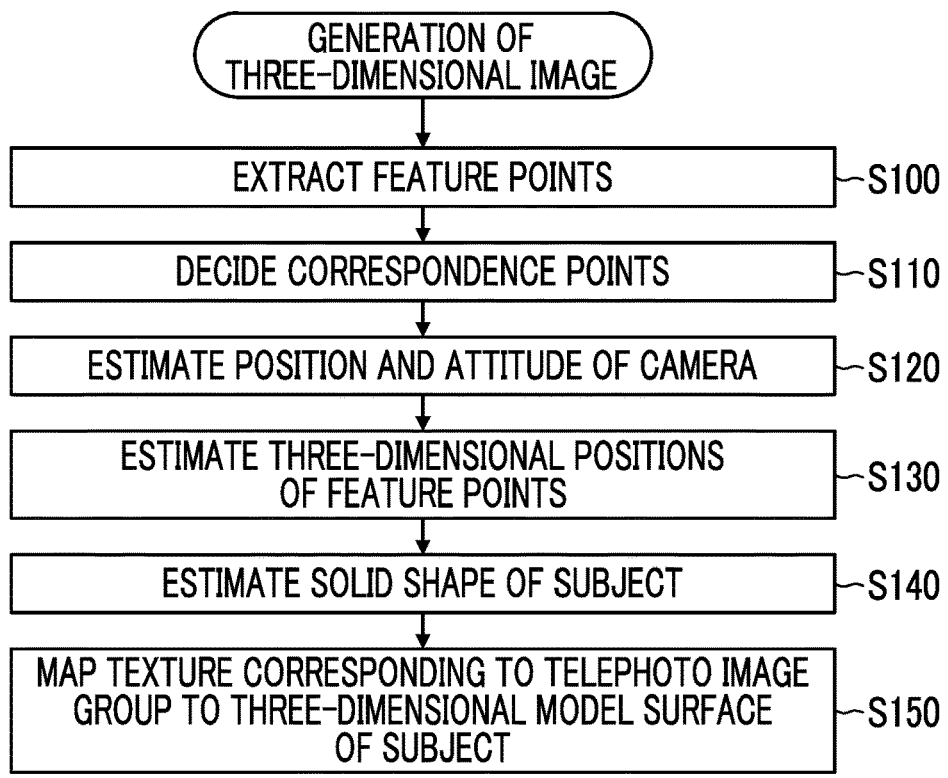

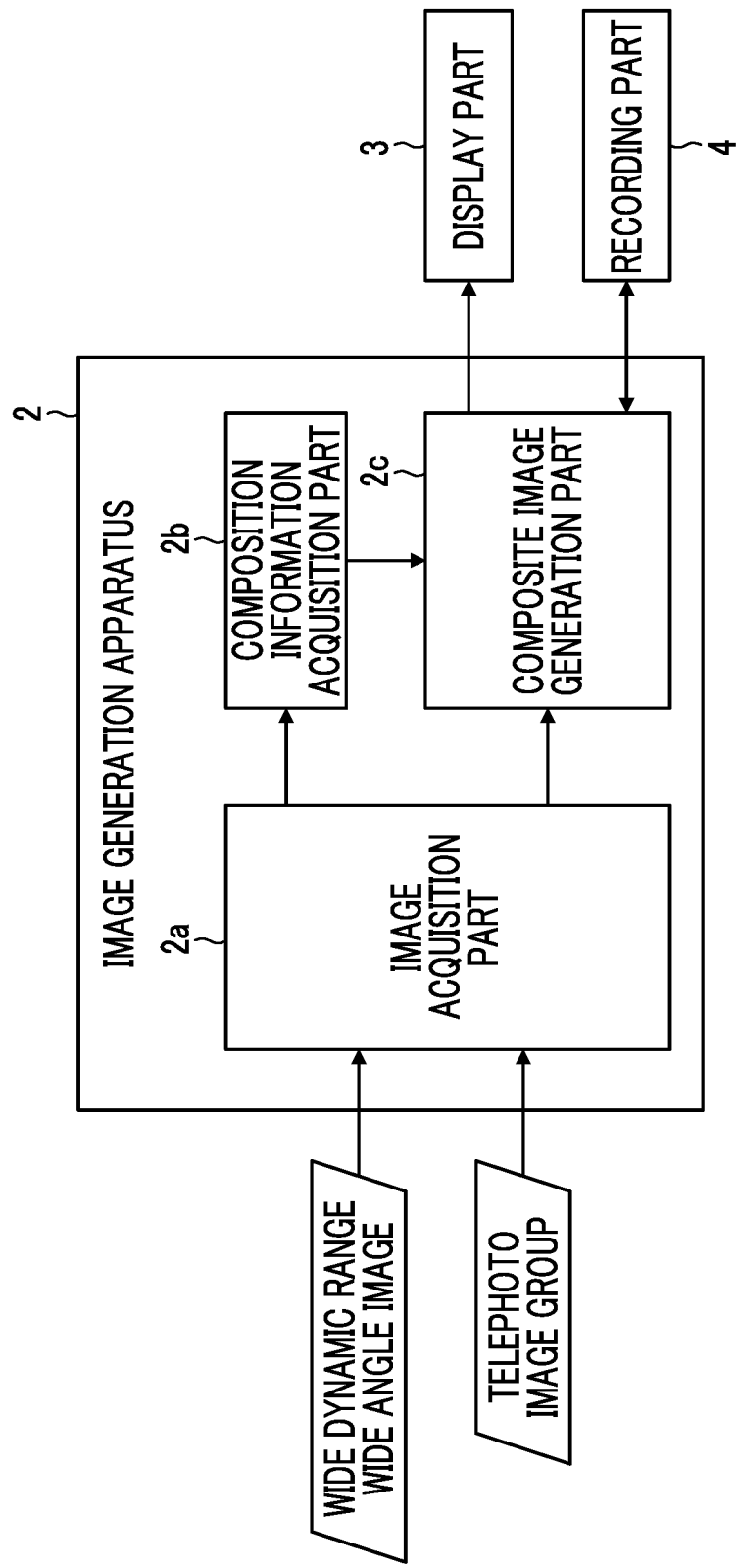

IMAGING APPARATUS, UNMANNED MOVING OBJECT, IMAGING METHOD, SYSTEM, AND PROGRAM

CROSS-REFERENCE TO RELATED APPLICATIONS

The present application is a Continuation of PCT International Application No. PCT/JP2019/022149 filed on Jun. 4, 2019 claiming priority under 35 U.S.C § 119(a) to Japanese Patent Application No. 2018-118240 filed on Jun. 21, 2018. Each of the above applications is hereby expressly incorporated by reference, in its entirety, into the present application.

BACKGROUND OF THE INVENTION

1. Field of the Invention

The present invention relates to an imaging apparatus, an unmanned moving object, an imaging method, a system, and a program and particularly, to a technology for enlarging a dynamic range of a captured image acquired in a case where a composite image is generated from a plurality of images (image group) obtained by imaging a subject while moving an imaging position.

2. Description of the Related Art

A technology for acquiring a larger image by combining a plurality of images is present and is called panorama composition, stitching, and the like.

A mosaic image composition apparatus disclosed in JP2006-189940A composites one image (mosaic image) of a wide field of view from an image group of a narrow field of view captured while moving, and acquires a position and attitude information of a camera at a time of capturing each image as information to be used for composition.

The position and the attitude information of the camera can be estimated by analyzing the image group. JP2006-189940A discloses a procedure of estimating the position and the attitude information of the camera for a (j+1)-th image in a case where the position and the attitude information of the camera for a j-th image (j<N−1) of N images are known.

First, feature points present in a region of overlap between the j-th image and the (j+1)-th image are associated, and an appropriate number of pairs of corresponding feature points are acquired. Next, the position and the attitude information of the camera at a time of capturing the (j+1)-th image with respect to the position and the attitude information of the camera at a time of capturing the j-th image are acquired such that a least square error between the associated feature points of the j-th image and feature points of the (j+1)-th image is minimized.

Based on the acquired position and attitude information of the camera at a time of capturing the first image to the N-th image, one mosaic image of a wide field of view is composited by sequentially transforming (projecting) the first image to the N-th image to images in a mosaic image plane and combining the images.

JP2007-164258A suggests an image composition processing apparatus that captures a wide angle image and a telephoto image and composites one or a plurality of telephoto images in the wide angle image in order to acquire a high detail image. The wide angle image and the telephoto image are captured one at a time and may be images captured by changing a direction of an optical axis of the camera in a case where imaging is performed from the same location. Even in a case where a deviation occurs between optical axis centers of the wide angle image and the telephoto image, the telephoto image can be deformed such that the telephoto image is captured from an optical axis of the wide angle image by performing projective transformation of the telephoto image, and it is possible to match subject images of both images.

JP2017-022574A discloses a system that captures a wide angle image and a telephoto image at the same time using one camera, measures an amount of change of an imaging range based on the wide angle image having a stable imaging range, and controls a moving object (a movement direction or a movement speed) in which the camera is mounted or the camera (or an imaging angle of view) based on a measurement result such that image processing such as region matching using the telephoto image is restricted to a normally processable range.

Furthermore, a structure from motion (SfM) method of tracking motions of multiple feature points from a motion picture in which the imaging position of the camera moves, and estimating a three-dimensional structure (structure) of a subject and a camera attitude (motion) at the same time is present. In recent years, an optimization calculation method called bundle adjustment has been developed, and high accuracy output is produced within an actual usage time period.

In a case where the captured image is acquired for a subject (or a scene) having a wide dynamic range, a washed-out highlight part and a blocked-up shadow part may occur. As one method of suppressing wash-out and blocked-up shadow and displaying a wider dynamic range of a subject, dynamic range enlargement processing (high-dynamic-range (HDR) processing) is known.

The technology disclosed in JP2016-164745A discloses a technology that is intended to facilitate edge detection by correcting wash-out and blocked-up shadow and reproducing a detailed pattern or roughness in a captured image by enlarging a dynamic range of the captured image in a case where an obstacle is detected by analyzing the captured image.

SUMMARY OF THE INVENTION

In a case of compositing one mosaic image of a wide field of view from the image group of a narrow field of view using the mosaic image composition apparatus disclosed in JP2006-189940A, a large number of overlapping parts (overlapping regions between images) of the image group of a narrow field of view are necessary for extracting an appropriate number of corresponding feature points. Thus, a problem arises in that a large number of images are necessary. While the position and the attitude information of the camera at the time of imaging can be acquired using a sensor, a problem arises in that an expensive sensor is necessary for acquiring high accuracy information, or accuracy of image composition is decreased.

In the SfM method, it is necessary to include multiple feature points in a plurality of images. Thus, images captured at a wide angle are used in order to perform favorable estimation. Wide angle images are effective for estimation of an approximate three-dimensional structure of the subject. However, a problem arises in that the subject image in each image is small, and details of the subject cannot be checked.

The image composition processing apparatus disclosed in JP2007-164258A embeds (composites) one or a plurality of telephoto images in one wide angle image and acquires a high accuracy image in which the whole subject in a wide range is captured in detail. The image composition processing apparatus does not generate a composite image of a wider range than one wide angle image.

The system disclosed in JP2017-022574A captures a wide angle image and a telephoto image at the same time using one camera, measures the amount of change of the imaging range based on the wide angle image, and controls the moving object in which the camera is mounted or controls the camera. Accordingly, image processing such as region matching based on the telephoto image can be normally processed. However, information about the wide angle image is not used in composition of the telephoto image.

In the technology disclosed in JP2016-164745A, only processing of enlarging the dynamic range is performed on the captured image captured for detecting the obstacle, and there is no mention related to the dynamic range enlargement processing in a case of capturing a wide angle image and a telephoto image and compositing the telephoto image.

The present invention is conceived in view of such matters. An object of the present invention is to provide an imaging apparatus, an unmanned moving object, an imaging method, a system, and a program capable of favorably compositing a telephoto image group even in a case where an overlapping region between images of the telephoto image group is small, and accurately compositing a telephoto image regardless of a subject (scene) of a wide angle image.

In order to achieve the object, an imaging apparatus that is one aspect of the present invention comprises an imaging optical system including a wide angle optical system and a telephoto optical system having a common optical axis, a directional sensor that includes a plurality of pixels configured with photoelectric conversion elements arranged in two dimensions, the directional sensor including the plurality of pixels selectively receiving luminous flux incident through each of the wide angle optical system and the telephoto optical system by pupil separation, a wide dynamic range image generation part that generates, based on an image signal from the directional sensor, a wide dynamic range wide angle image obtained by enlarging a dynamic range of a wide angle image captured through the wide angle optical system, an image acquisition part that acquires a wide dynamic range wide angle image group configured with the wide dynamic range wide angle image generated by the wide dynamic range image generation part, and a telephoto image group which is captured at the same time as the wide dynamic range wide angle image group and is configured with a telephoto image which is the image signal from the directional sensor and is captured through the telephoto optical system, a subject being imaged in the wide dynamic range wide angle image group and the telephoto image group while an imaging position is changed, a composition information acquisition part that acquires composition information to be used for compositing the telephoto image group by analyzing the acquired wide dynamic range wide angle image group, and a composite image generation part that generates an image in which the telephoto image group is composited, based on the composition information, information related to focal lengths of the wide angle optical system and the telephoto optical system, and the telephoto image group.

In the wide angle image group and the telephoto image group acquired by the image acquisition part, the subject is captured while a position of the imaging apparatus comprising the imaging optical system including the wide angle optical system and the telephoto optical system having the common optical axis is changed. An image of a center region (region corresponding to an angle of view of the telephoto image) of each image of the wide angle image group and each image of the telephoto image group are the same image except for having different resolution.

Accordingly, the composition information to be used for compositing the telephoto image group can be acquired by analyzing the wide angle image group, and the telephoto image group can be favorably composited even in a case where the overlapping region between the images of the telephoto image group is small. Accordingly, the number of times of capturing the telephoto image group can be significantly decreased, and a high resolution composite image can be generated.

The composition information for compositing the telephoto image group is obtained by analyzing the wide dynamic range wide angle image group configured with the wide dynamic range wide angle image obtained by enlarging the dynamic range of the wide angle image. Accordingly, appropriate composition information can be acquired regardless of a width of an intensity of light of a subject or a scene of the wide angle image, and the telephoto image group can be accurately composited.

It is preferable that the composition information acquisition part detects a feature point of the wide dynamic range wide angle image by analyzing the wide dynamic range wide angle image group.

According to the present aspect, since the feature point of the wide dynamic range wide angle image is detected, more appropriate composition information can be acquired.

It is preferable that the composition information acquisition part estimates the imaging position and an attitude in a case of capturing the wide dynamic range wide angle image and a solid shape of the subject using a structure from motion method or a simultaneous localization and mapping method.

It is preferable that the imaging apparatus further comprises a determination part that determines whether or not to execute generation of the wide dynamic range wide angle image by the wide dynamic range image generation part in accordance with a width of an intensity of light of the wide angle image, the image acquisition part acquires a wide angle image group configured with the wide angle image and the telephoto image group in a case where the wide dynamic range wide angle image is not generated by the wide dynamic range image generation part, and the composition information acquisition part acquires the composition information to be used for compositing the telephoto image group by analyzing the wide angle image group.

According to the present aspect, the determination part determines whether or not to execute generation of the wide dynamic range wide angle image by the wide dynamic range image generation part in accordance with the width of the intensity of light of the wide angle image. Thus, dynamic range enlargement processing is efficiently performed on the wide angle image as necessary.

It is preferable that the determination part performs determination in accordance with a width of an intensity of light of a region of the wide angle image corresponding to a region analyzed by the composition information acquisition part in the wide dynamic range wide angle image.

According to the present aspect, since determination is performed in accordance with the width of the intensity of light of the region of the wide angle image corresponding to the region analyzed by the composition information acquisition part, the dynamic range enlargement processing is efficiently performed on the wide angle image as necessary.

It is preferable that the wide dynamic range image generation part generates the wide dynamic range wide angle image based on the wide angle image obtained by performing imaging at an exposure smaller than an appropriate exposure. That is, the wide dynamic range wide angle image is generated based on one wide angle image.

It is preferable that the wide dynamic range image generation part generates the wide dynamic range wide angle image based on two wide angle images of different exposures. That is, the wide dynamic range wide angle image is generated based on two wide angle images.

It is preferable that the directional sensor receives luminous flux corresponding to a plurality of the wide angle images of different exposures at the same time.

According to the present aspect, since the directional sensor can receive the luminous flux corresponding to the plurality of wide angle images of different exposures at the same time, the dynamic range enlargement processing is performed using the wide angle images acquired at the same time. Thus, the wide dynamic range wide angle image of good image quality in which image blurs are suppressed can be obtained.

An unmanned moving object that is another aspect of the present invention comprises the imaging apparatus that is mounted on the unmanned moving object, and a movement control part that controls movement, in which the movement control part decreases a movement speed in a case of acquiring two wide angle images of different exposures. According to the present aspect, in a case of acquiring two wide angle images of different exposures, the movement speed is decreased. Thus, two wide angle images of different exposures between which a deviation in image is suppressed can be acquired.

An unmanned moving object that is still another aspect of the present invention comprises the imaging apparatus that is mounted on the unmanned moving object, and a movement control part that controls movement.

An imaging method that is still another aspect of the present invention is an imaging method of an imaging apparatus including an imaging optical system including a wide angle optical system and a telephoto optical system having a common optical axis, and a directional sensor that includes a plurality of pixels configured with photoelectric conversion elements arranged in two dimensions, the directional sensor including the plurality of pixels selectively receiving luminous flux incident through each of the wide angle optical system and the telephoto optical system by pupil separation, the imaging method comprising a wide dynamic range image generation step of generating, based on an image signal from the directional sensor, a wide dynamic range wide angle image obtained by enlarging a dynamic range of a wide angle image captured through the wide angle optical system, an image acquisition step of acquiring a wide dynamic range wide angle image group configured with the wide dynamic range wide angle image generated in the wide dynamic range image generation step, and a telephoto image group which is captured at the same time as the wide dynamic range wide angle image group and is configured with a telephoto image which is the image signal from the directional sensor and is captured through the telephoto optical system, a subject being imaged in the wide dynamic range wide angle image group and the telephoto image group while an imaging position is changed, a composition information acquisition step of acquiring composition information to be used for compositing the telephoto image group by analyzing the acquired wide dynamic range wide angle image group, and a composite image generation step of generating an image in which the telephoto image group is composited, based on the composition information, information related to focal lengths of the wide angle optical system and the telephoto optical system, and the telephoto image group.

It is preferable that in the composition information acquisition step, a feature point of the wide dynamic range wide angle image is detected by analyzing the wide dynamic range wide angle image group.

It is preferable that in the composition information acquisition step, the imaging position and an attitude in a case of capturing the wide dynamic range wide angle image and a solid shape of the subject are estimated using a structure from motion method or a simultaneous localization and mapping method.

It is preferable that the imaging method further comprises a determination step of determining whether or not to execute generation of the wide dynamic range wide angle image in the wide dynamic range image generation step in accordance with a width of an intensity of light of the wide angle image, in which in the image acquisition step, a wide angle image group configured with the wide angle image and the telephoto image group are acquired in a case where the wide dynamic range wide angle image is not generated in the wide dynamic range image generation step, and in the composition information acquisition step, the composition information to be used for compositing the telephoto image group is acquired by analyzing the wide angle image group.

A system that is still another aspect of the present invention is a system comprising an imaging apparatus, and an image generation apparatus, in which the imaging apparatus includes an imaging optical system including a wide angle optical system and a telephoto optical system having a common optical axis, a directional sensor that includes a plurality of pixels configured with photoelectric conversion elements arranged in two dimensions, the directional sensor including the plurality of pixels selectively receiving luminous flux incident through each of the wide angle optical system and the telephoto optical system by pupil separation, and a wide dynamic range image generation part that generates, based on an image signal from the directional sensor, a wide dynamic range wide angle image obtained by enlarging a dynamic range of a wide angle image captured through the wide angle optical system, and the image generation apparatus includes an image acquisition part that acquires a wide dynamic range wide angle image group configured with the wide dynamic range wide angle image generated by the wide dynamic range image generation part, and a telephoto image group which is captured at the same time as the wide dynamic range wide angle image group and is configured with a telephoto image which is the image signal from the directional sensor and is captured through the telephoto optical system, a subject being imaged in the wide dynamic range wide angle image group and the telephoto image group while an imaging position is changed, a composition information acquisition part that acquires composition information to be used for compositing the telephoto image group by analyzing the acquired wide dynamic range wide angle image group, and a composite image generation part that generates an image in which the telephoto image group is composited, based on the composition information, information related to focal lengths of the wide angle optical system and the telephoto optical system, and the telephoto image group.

A program that is still another aspect of the present invention is a program causing a computer to execute an imaging step of an imaging apparatus including an imaging optical system including a wide angle optical system and a telephoto optical system having a common optical axis, and a directional sensor that includes a plurality of pixels configured with photoelectric conversion elements arranged in two dimensions, the directional sensor including the plurality of pixels selectively receiving luminous flux incident through each of the wide angle optical system and the telephoto optical system by pupil separation, the program causing the computer to execute the imaging step comprising a wide dynamic range image generation step of generating, based on an image signal from the directional sensor, a wide dynamic range wide angle image obtained by enlarging a dynamic range of a wide angle image captured through the wide angle optical system, an image acquisition step of acquiring a wide dynamic range wide angle image group configured with the wide dynamic range wide angle image generated in the wide dynamic range image generation step, and a telephoto image group which is captured at the same time as the wide dynamic range wide angle image group and is configured with a telephoto image which is the image signal from the directional sensor and is captured through the telephoto optical system, a subject being imaged in the wide dynamic range wide angle image group and the telephoto image group while an imaging position is changed, a composition information acquisition step of acquiring composition information to be used for compositing the telephoto image group by analyzing the acquired wide dynamic range wide angle image group, and a composite image generation step of generating an image in which the telephoto image group is composited, based on the composition information, information related to focal lengths of the wide angle optical system and the telephoto optical system, and the telephoto image group.

According to the present invention, the telephoto image group can be favorably composited even in a case where the overlapping region between the images of the telephoto image group is small. Accordingly, the number of times of capturing the telephoto image group can be significantly decreased, and a high resolution composite image can be generated. In addition, since the telephoto image is composited based on the composition information obtained by analyzing the wide dynamic range wide angle image group, the telephoto image can be accurately composited without being affected by the width of the intensity of light of the subject (scene) of the wide angle image.

BRIEF DESCRIPTION OF THE DRAWINGS

FIG. 1 is an exterior view illustrating an imaging apparatus and an unmanned aerial vehicle constituting an image generation system according to an embodiment of the present invention.

FIG. 18 is a diagram illustrating a relationship among a world coordinate system, a local coordinate system, and an image coordinate system.

FIG. 22 is a flowchart of an image generation method.

FIG. 23 is a flowchart illustrating another embodiment of the image generation method.

FIG. 39 is a block diagram illustrating a functional configuration example of an image generation apparatus.

DESCRIPTION OF THE PREFERRED EMBODIMENTS

Figure 2:
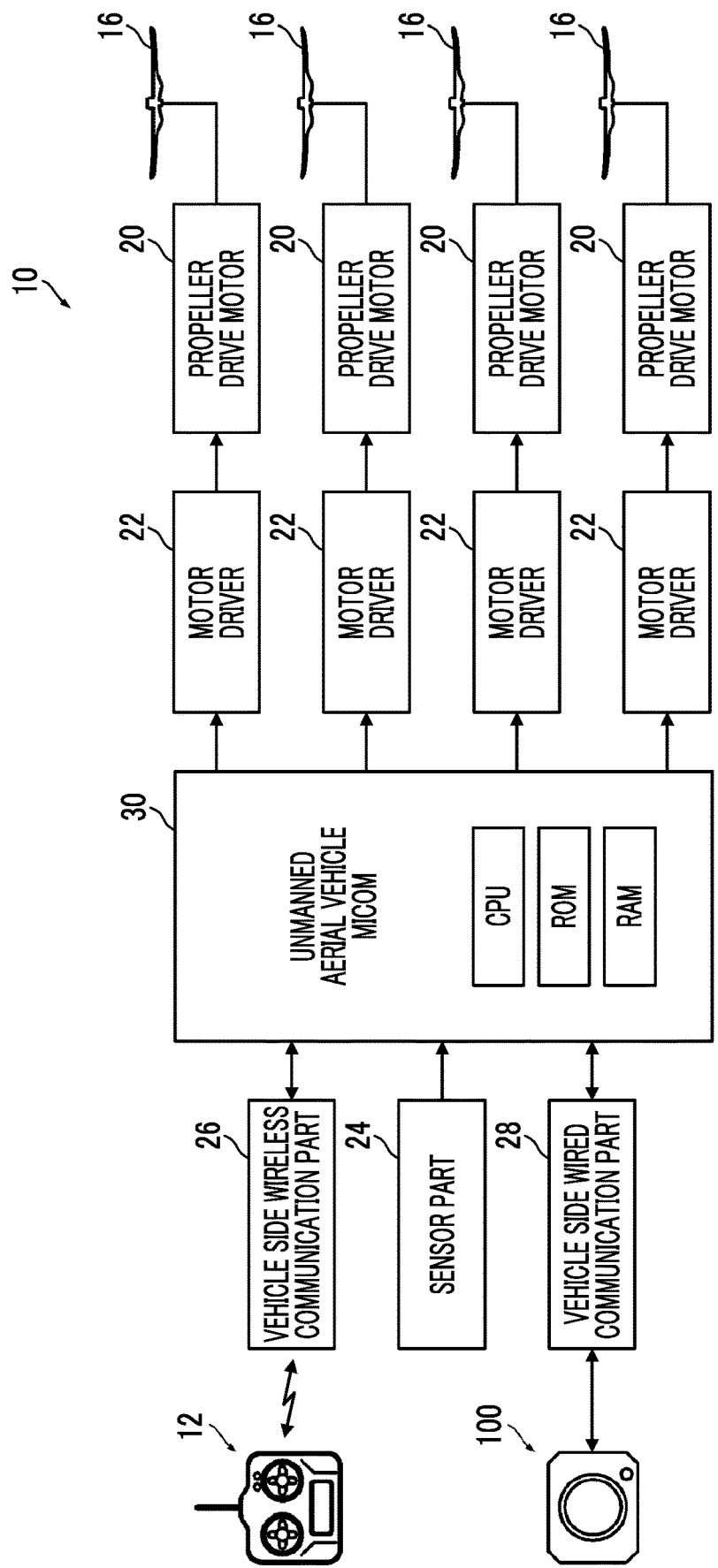
FIG. 2 is a block diagram illustrating an electric configuration of the unmanned aerial vehicle.

Hereinafter, an imaging apparatus, an unmanned moving object, an imaging method, a system, and a program according to a preferred embodiment of the present invention will be described in accordance with the appended drawings.

FIG. 1 is an exterior view illustrating an imaging apparatus 100 and an unmanned aerial vehicle 10 as one example of the unmanned moving object according to the embodiment of the present invention.

<<Unmanned Aerial Vehicle>>

The unmanned aerial vehicle 10 is one example of a moving object. The unmanned aerial vehicle 10 is a so-called drone and flies in the air based on an operation performed by a controller 12.

<Exterior Configuration of Unmanned Aerial Vehicle>

As illustrated in FIG. 1, the unmanned aerial vehicle 10 is configured to comprise a plurality of flying propellers 16 in a main body frame 14.

The main body frame 14 is configured to comprise a torso portion 14A, four arm portions 14B (only two are illustrated in FIG. 1) radially extending from the torso portion 14A, and four leg portions 14C (only two are illustrated in FIG. 1) radially extending from the torso portion 14A.

The propeller 16 is comprised at a distal end of each arm portion 14B. Accordingly, four propellers 16 are comprised in the unmanned aerial vehicle 10 of the present embodiment (only two are illustrated in FIG. 1).

The unmanned aerial vehicle 10 flies in the air by buoyant force generated by rotating the propellers 16. Rising, falling, direction changing, and the like of the unmanned aerial vehicle 10 are performed by individually controlling rotation of each propeller 16. In addition, a flight speed is controlled by individually controlling rotation of each propeller 16.

<Electric Configuration of Unmanned Aerial Vehicle>

FIG. 2 is a block diagram illustrating an electric configuration of the unmanned aerial vehicle.

The unmanned aerial vehicle 10 comprises a propeller drive motor 20, a motor driver 22, a sensor part 24, a vehicle side wireless communication part 26, a vehicle side wired communication part 28, and an unmanned aerial vehicle micom (micom: microcomputer) 30.

The propeller drive motor 20 is a rotation drive unit of the propeller 16. The propeller drive motor 20 is comprised for each propeller 16. Driving of each propeller drive motor 20 is individually controlled by the motor driver 22. Each motor driver 22 controls driving of the propeller drive motor 20 in accordance with an instruction from the unmanned aerial vehicle micom 30.

The sensor part 24 detects a flight state of the vehicle. The sensor part 24 is configured to comprise various types of sensors such as a gyro sensor, a geomagnetic sensor, an acceleration sensor, a speed sensor, an altitude sensor, and a global positioning system (GPS). The sensor part 24 outputs information about the flight state of the vehicle by detected by various sensors to the unmanned aerial vehicle micom 30.

The vehicle side wireless communication part 26 wirelessly communicates with the controller 12 and transmits and receives various signals with the controller 12 under control of the unmanned aerial vehicle micom 30. For example, in a case where the controller 12 is operated, a control signal based on the operation is transmitted toward the unmanned aerial vehicle 10 from the controller 12. The vehicle side wireless communication part 26 receives the control signal transmitted from the controller 12 and outputs the control signal to the unmanned aerial vehicle 10. A method of communication is not particularly limited. A generally used communication method (for example, a communication method based on a wireless local area network (LAN) standard, a communication method based on a specific power saving wireless standard, and a communication method using a mobile phone network) is used.

The vehicle side wired communication part 28 communicates with the imaging apparatus 100 in a wired manner and transmits and receives various signals with the imaging apparatus 100 under control of the unmanned aerial vehicle micom 30. A method of communication is not particularly limited. A generally used communication method (for example, a communication method based on a universal serial bus (USB) standard) is used.

The unmanned aerial vehicle micom 30 is a control part that controls an operation of the whole unmanned aerial vehicle 10. The unmanned aerial vehicle micom 30 comprises a central processing unit (CPU), a read only memory (ROM), and a random access memory (RAM) and implements various functions by executing a predetermined program. The program is stored in the ROM.

Figure 3:
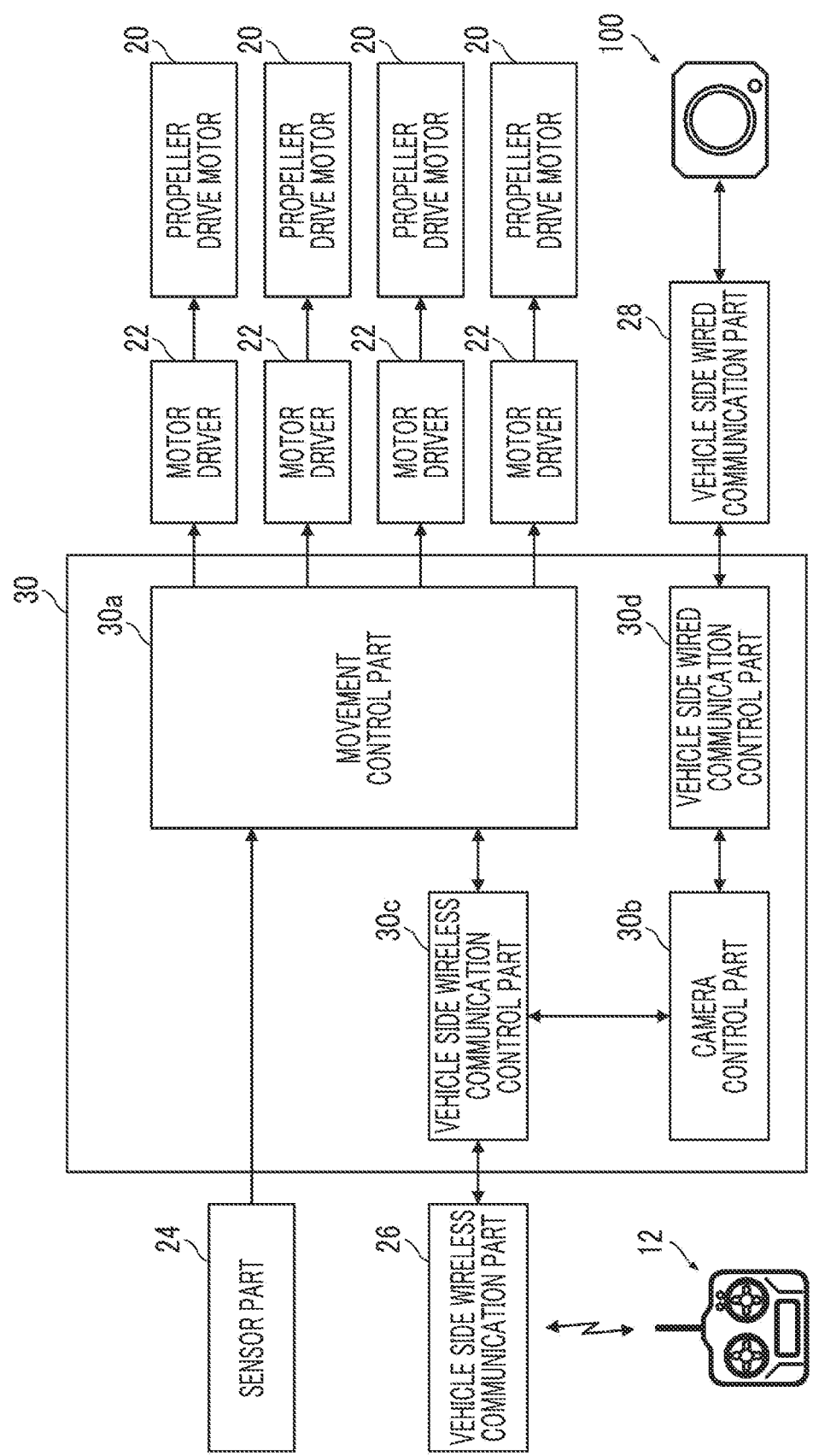
FIG. 3 is a block diagram of main functions implemented by an unmanned aerial vehicle micom.

FIG. 3 is a block diagram of main functions implemented by the unmanned aerial vehicle micom.

The unmanned aerial vehicle micom 30 functions as a movement control part 30a, a camera control part 30b, a vehicle side wireless communication control part 30c, a vehicle side wired communication control part 30d, and the like by executing the predetermined program.

The movement control part 30a controls flight (movement) of the unmanned aerial vehicle 10 by controlling driving of each propeller drive motor 20 through the motor driver 22. The movement control part 30a controls driving of each propeller drive motor 20 and controls flight of the unmanned aerial vehicle 10 based on the control signal transmitted from the controller 12 and the information about the flight state of the vehicle output from the sensor part 24. For example, in a case where a rising instruction is provided from the controller 12, driving of each propeller drive motor 20 is controlled such that the vehicle rises. In a case where a falling instruction is provided from the controller 12, driving of each propeller drive motor 20 is controlled such that the vehicle falls. In a case where a revolution instruction is provided from the controller 12, driving of each propeller drive motor 20 is controlled such that the vehicle revolves in a direction of the instruction. During imaging, driving of each propeller drive motor 20 is controlled such that the vehicle flies at a predetermined speed. The movement control part 30a decreases a movement speed in a case of acquiring two wide angle images of different exposures described later. Accordingly, two wide angle images in which image blurs are suppressed can be acquired.

The camera control part 30b controls the imaging apparatus 100 based on the control signal transmitted from the controller 12. For example, the imaging apparatus 100 starts imaging in accordance with an imaging start instruction from the controller 12. The imaging apparatus 100 finishes imaging in accordance with an imaging finish instruction from the controller 12.

The vehicle side wireless communication control part 30c controls communication with the controller 12 through the vehicle side wireless communication part 26.

The vehicle side wired communication control part 30d controls communication with the imaging apparatus 100 through the vehicle side wired communication part 28.

<Configuration of Controller>

Figure 4:
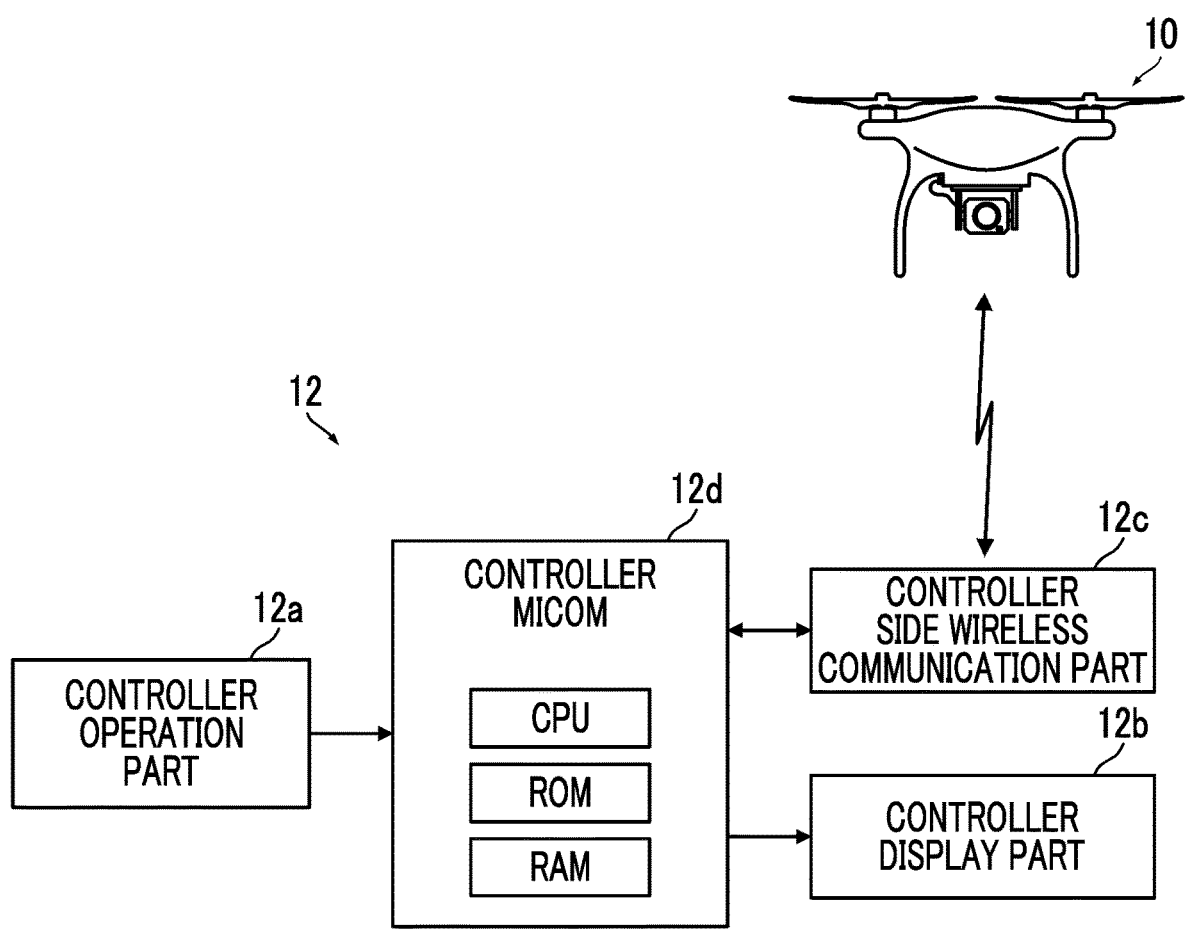
FIG. 4 is a block diagram illustrating an electric configuration of a controller.

FIG. 4 is a block diagram illustrating an electric configuration of the controller.

The controller 12 comprises a controller operation part 12a, a controller display part 12b, a controller side wireless communication part 12c, and a controller micom 12d.

The controller operation part 12a is configured to comprise various operation members that operate the unmanned aerial vehicle 10 and the imaging apparatus 100. For example, the operation members operating the unmanned aerial vehicle 10 include an operation member providing the rising and falling instructions for the unmanned aerial vehicle 10, and an operation member providing the revolution instruction for the unmanned aerial vehicle 10. For example, the operation members operating the imaging apparatus 100 include an operation member providing the imaging start instruction and the imaging finish instruction.

For example, the controller display part 12b is configured with a liquid crystal display (LCD). For example, the information about the flight state of the unmanned aerial vehicle 10 is displayed on the controller display part 12b.

The controller side wireless communication part 12c wirelessly communicates with the unmanned aerial vehicle 10 and transmits and receives various signals with the unmanned aerial vehicle 10 under control of the controller micom 12d.

The controller micom 12d is a control part that controls an operation of the whole controller 12. The controller micom 12d comprises a CPU, a ROM, and a RAM and implements various functions by executing a predetermined program. For example, in a case where the controller operation part 12a is operated, a control signal corresponding to the operation is generated and transmitted to the unmanned aerial vehicle 10 through the controller side wireless communication part 12c. In addition, for example, the information about the flight state is acquired from the unmanned aerial vehicle 10 through the controller side wireless communication part 12c and displayed on the controller display part 12b. The program is stored in the ROM.

<<Imaging Apparatus>>

Figure 5:
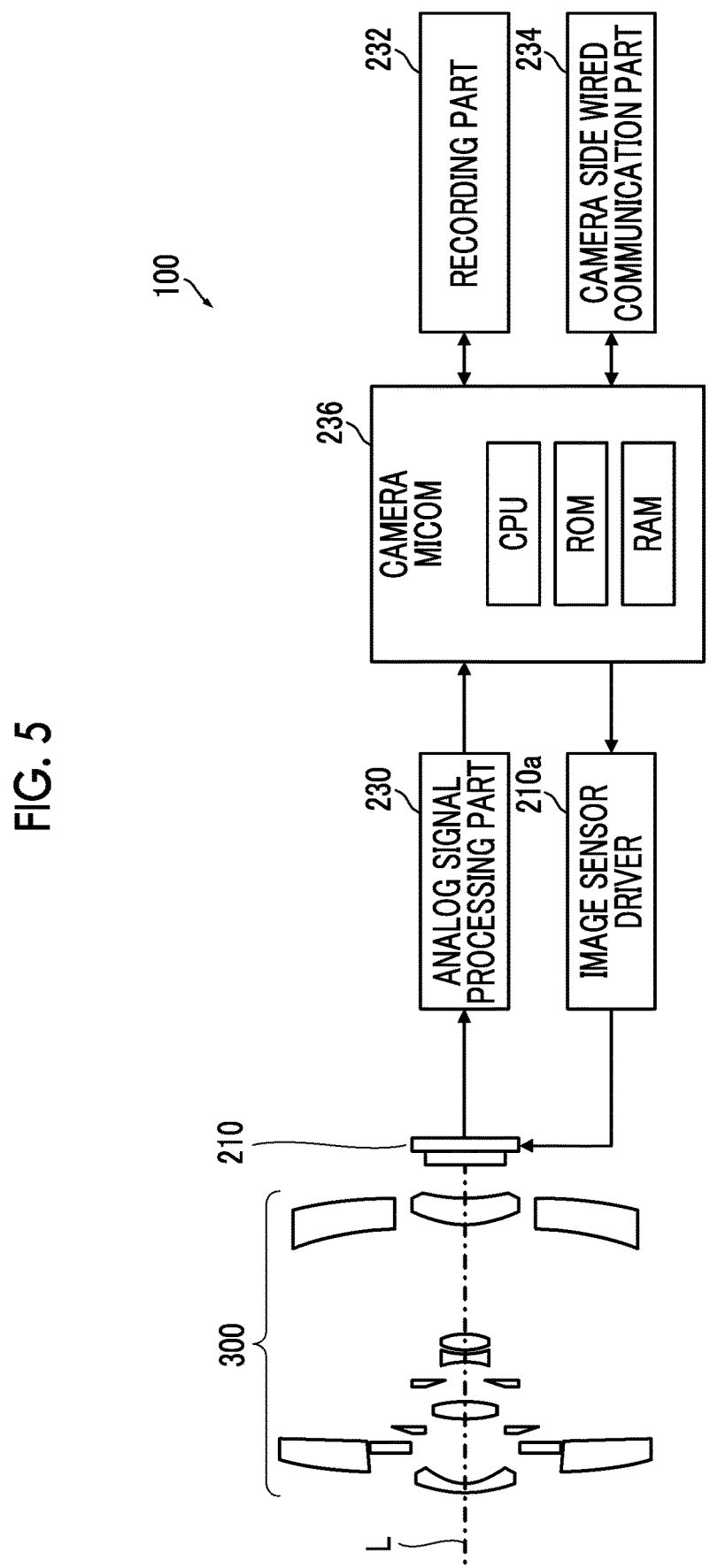
FIG. 5 is a block diagram illustrating a schematic configuration of the imaging apparatus according to the embodiment of the present invention.

FIG. 5 is a block diagram illustrating a schematic configuration of the imaging apparatus 100 according to the embodiment of the present invention.

The imaging apparatus 100 is configured with a single lens camera. The imaging apparatus 100 is mounted on the unmanned aerial vehicle 10 through a tripod head. An imaging direction is adjusted using the tripod head.

The imaging apparatus 100 continuously images a motion picture in accordance with an imaging instruction from the controller 12. The imaging apparatus 100 is not limited to a motion picture and may sequentially image still pictures.

As illustrated in FIG. 5, the imaging apparatus 100 is configured to comprise an imaging lens 300, an image sensor 210, an analog signal processing part 230, a recording part 232, a camera side wired communication part 234, a camera micom 236, and the like.

<Imaging Lens>

Figure 6:
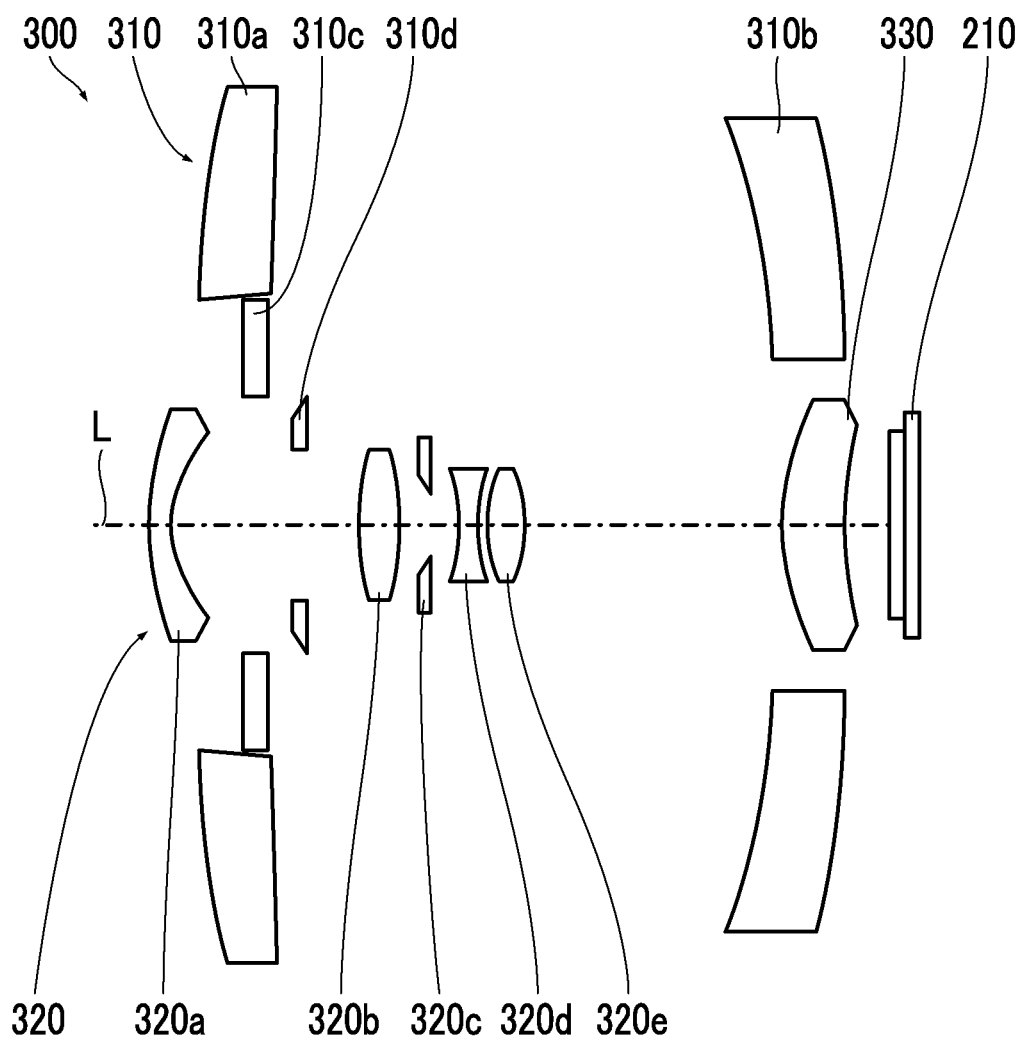
FIG. 6 is a schematic configuration diagram of an imaging lens.

FIG. 6 is a schematic configuration diagram of the imaging lens.

As illustrated in FIG. 6, the imaging lens 300 that functions as an imaging optical system includes two optical systems (a telephoto optical system 310 and a wide angle optical system 320) for capturing two images of different angles of view at the same time. The telephoto optical system 310 and the wide angle optical system 320 have the same optical axis L for performing imaging on the same axis. Particularly, in the imaging lens 300 of the present embodiment, the telephoto optical system 310 and the wide angle optical system 320 are concentrically arranged. In addition, the telephoto optical system 310 and the wide angle optical system 320 have different focal lengths for capturing images of different angles of view. In the present example, the wide angle optical system 320 of the present example is a central optical system having a circular shape, and the telephoto optical system 310 is an annular optical system that is concentrically arranged with respect to the central optical system.

<Telephoto Optical System>

The telephoto optical system 310 of the present embodiment is configured with an optical system of a reflecting telephoto type.

As illustrated in FIG. 6, the telephoto optical system 310 is configured by arranging a first lens 310a, a first mirror 310b, a second mirror 310c, a stop 310d, and a common lens 330 in this order from a subject side. Each of the first lens 310a, the first mirror 310b, the second mirror 310c, and the stop 310d has a ring shape.

The first mirror 310b constitutes a primary mirror of the reflecting telephoto optical system and reflects, toward the second mirror 310c, light passing through the first lens 310a.

The second mirror 310c constitutes a secondary mirror of the reflecting telephoto optical system and reflects, toward the common lens 330, light reflected by the first mirror 310b.

The stop 310d adjusts a quantity of light incident on the common lens 330 from the second mirror 310c. The stop 310d is configured by combining a plurality of stop leaf blades in a ring shape and adjusts the quantity of light by increasing or decreasing an outer diameter thereof.

The common lens 330 is the final lens. Light incident on the telephoto optical system 310 exits from the common lens 330 and is incident on the image sensor 210. The common lens 330 is shared with the wide angle optical system 320.

Figure 7:
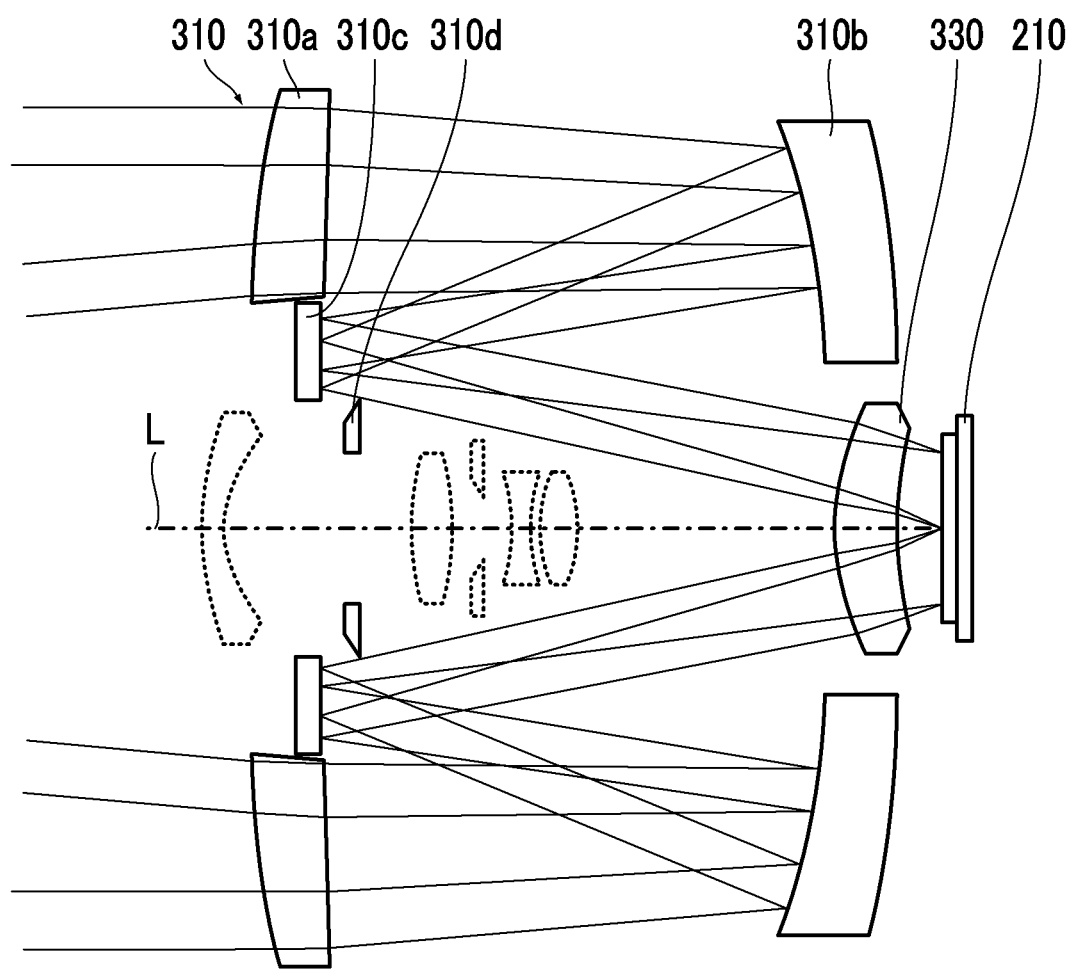
FIG. 7 is a diagram illustrating a ray trajectory of light passing through a telephoto optical system.

FIG. 7 is a diagram illustrating a ray trajectory of light passing through the telephoto optical system.

As illustrated in FIG. 7, light is incident on the image sensor 210 through the first lens 310a, the first mirror 310b, the second mirror 310c, the stop 310d, and the common lens 330.

<Wide Angle Optical System>

The wide angle optical system 320 of the present embodiment is configured with a fixed focal point optical system that enables pan-focus imaging.

As illustrated in FIG. 6, in the wide angle optical system 320, a first lens 320a, a second lens 320b, a stop 320c, a third lens 320d, a fourth lens 320e, and the common lens 330 are arranged in this order from the subject side. Each optical element is arranged on the same axis in an inner circumferential portion of the telephoto optical system 310. Since the wide angle optical system 320 has a fixed focal point, each optical element (including the common lens 330) is fixedly arranged at a constant position. The stop 320c is also configured with a fixed stop and is fixedly arranged at a constant position.

Figure 8:
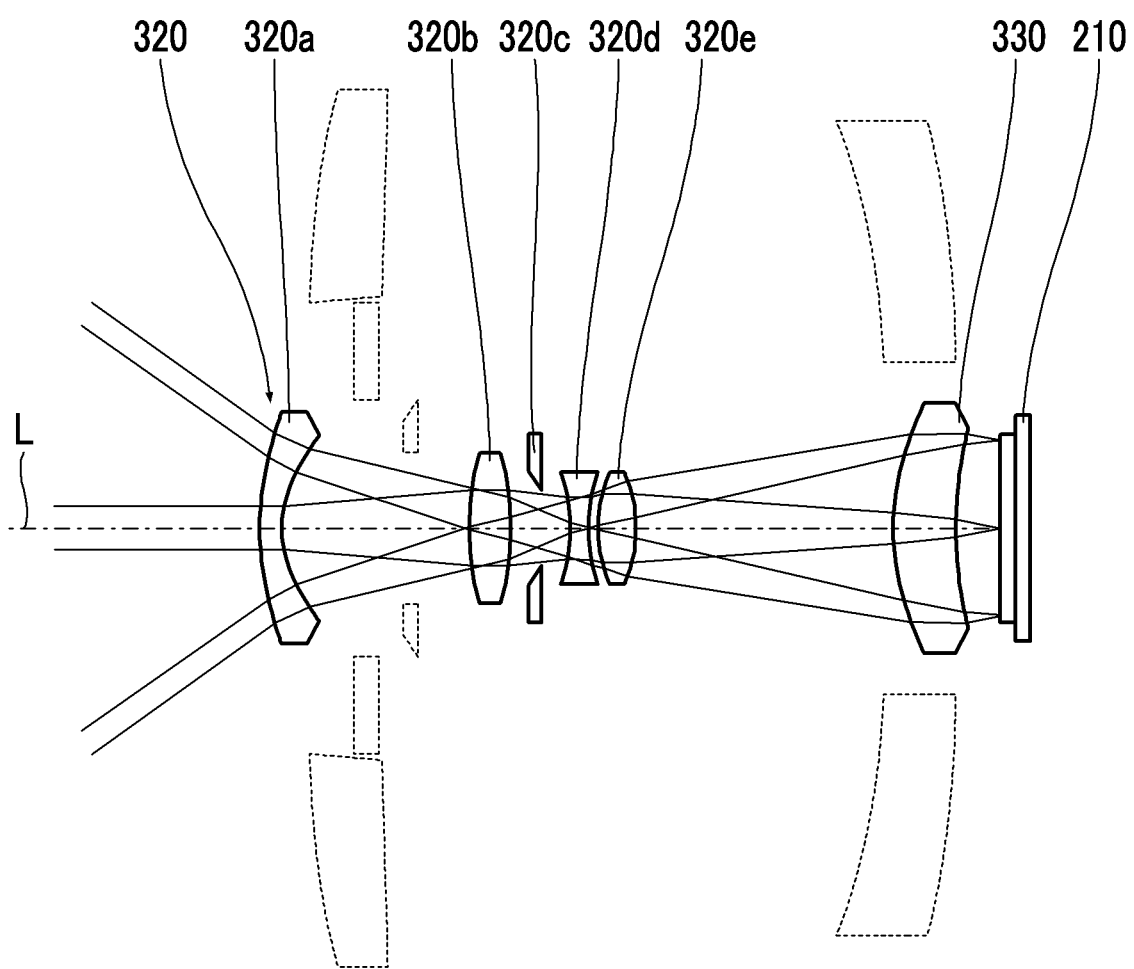
FIG. 8 is a diagram illustrating a ray trajectory of light passing through a wide angle optical system.

FIG. 8 is a diagram illustrating a ray trajectory of light passing through the wide angle optical system 320.

Light is incident on the image sensor 210 through the first lens 320a, the second lens 320b, the stop 320c, the third lens 320d, the fourth lens 320e, and the common lens 330.

<Drive System of Imaging Lens>

Figure 9:
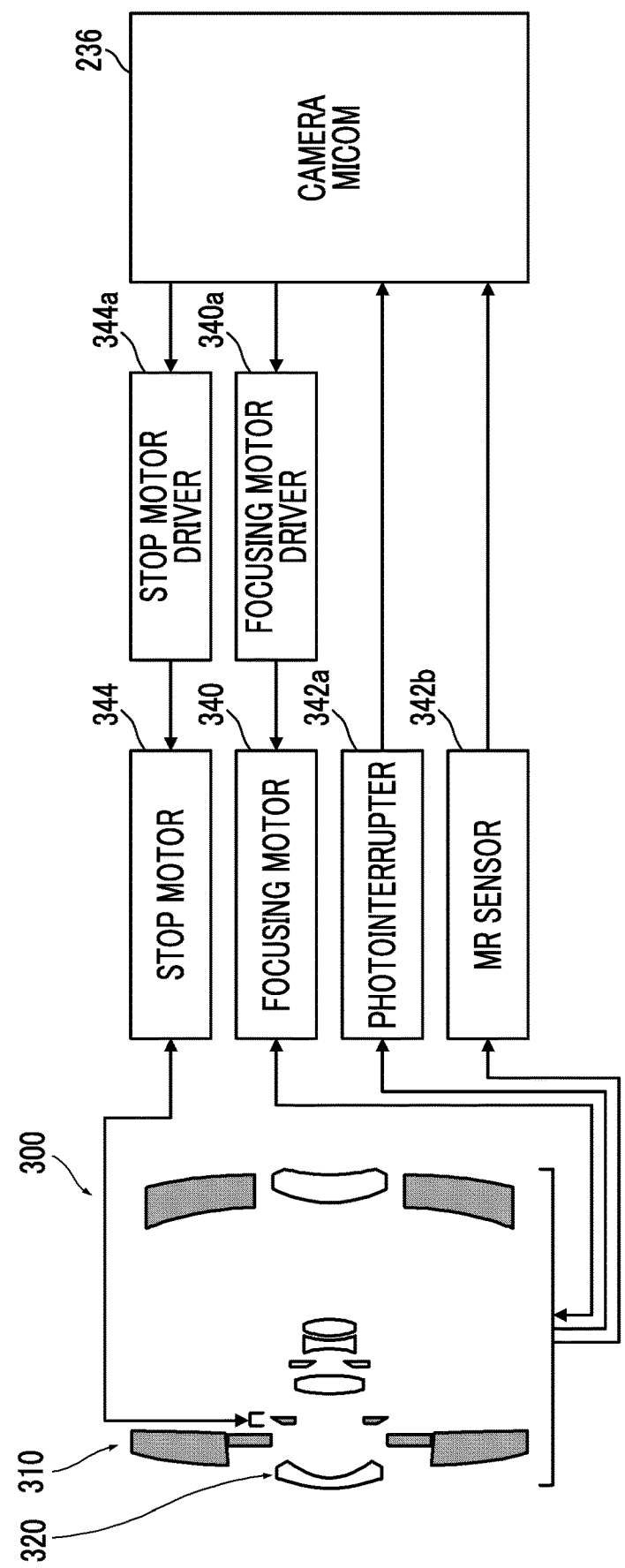
FIG. 9 is a block diagram illustrating a schematic configuration of a drive system of the imaging lens.

FIG. 9 is a block diagram illustrating a schematic configuration of a drive system of the imaging lens 300.

As described above, the wide angle optical system 320 has a fixed focal point and a fixed stop. Thus, the drive system is comprised for only the telephoto optical system 310.

The telephoto optical system 310 comprises a focusing mechanism functioning as a focal point adjusting part that adjusts a focal point of the telephoto optical system 310.

The focusing mechanism displaces a focus position by moving a part of optical elements of the telephoto optical system 310 forward and rearward along a shaft.

Figure 10A:
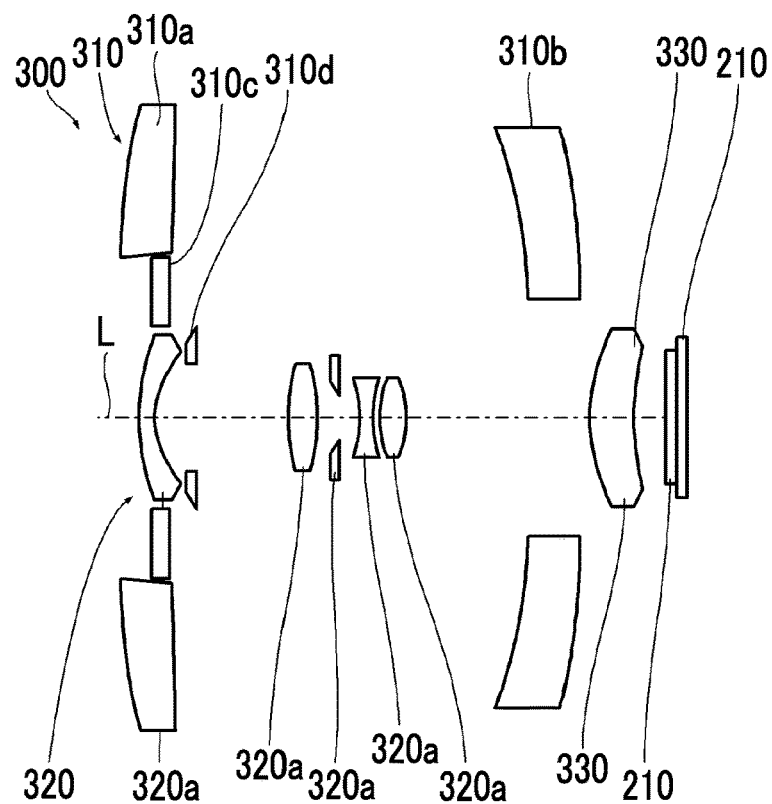
FIGS. 10A and 10B are operation description diagrams of the telephoto optical system driven by a focusing mechanism.
Figure 10B:
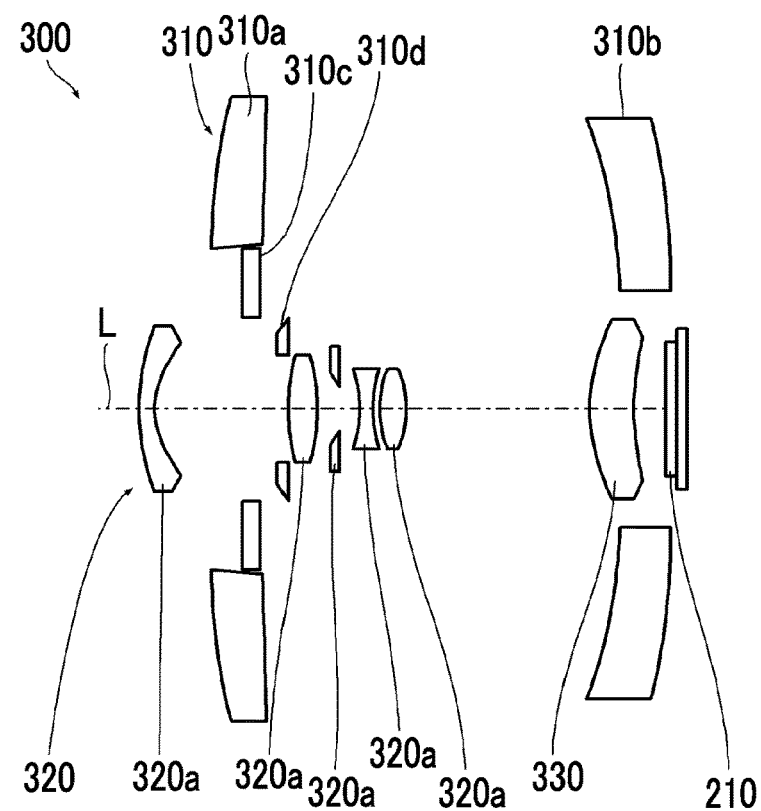

FIGS. 10A and 10B are operation description diagrams of the telephoto optical system driven by the focusing mechanism. FIG. 10A illustrates a state where a movable portion is moved to the subject side. FIG. 10B illustrates a state where the movable portion is moved to an image plane side.

As illustrated in FIG. 9 and FIGS. 10A and 10B, the focusing mechanism displaces the focus position by moving the first lens 310a, the first mirror 310b, the second mirror 310c, and the stop 310d constituting the telephoto optical system 310 together.

The focusing mechanism is configured to comprise a support part (not illustrated) that supports the first lens 310a, the first mirror 310b, the second mirror 310c, and the stop 310d (hereinafter, referred to as the "movable portion") to be movable together along the shaft, and a focusing motor 340 that moves the movable portion of the telephoto optical system along the shaft. For example, the focusing motor 340 is configured with a linear motor. The camera micom 236 controls driving of the focusing motor 340 through a focusing motor driver 340a.

The telephoto optical system 310 comprises a photointerrupter 342a and a magneto resistive (MR) sensor 342b as a unit detecting a position of the movable portion. The photointerrupter 342a detects positioning of the movable portion at a predetermined origin. The MR sensor 342b detects a displacement amount of the movable portion. By detecting positioning of the movable portion at the origin by the photointerrupter 342a and detecting the displacement amount from the origin by the MR sensor 342b, the position of the movable portion with respect to the origin can be detected. Detection results of the photointerrupter 342a and the MR sensor 342b are output to the camera micom 236. The camera micom 236 detects the position of the movable portion based on outputs of the photointerrupter 342a and the MR sensor 342b.

The stop 310d is driven by a stop motor 344. The camera micom 236 controls driving of the stop motor 344 through a stop driver 344a.

<Image Sensor>

The image sensor 210 is a solid-state imaging element such as a complementary metal oxide semiconductor (CMOS) or a charged coupled device (CCD). Particularly, the image sensor 210 is configured with a directional sensor in which pixels that selectively receive light passing through the telephoto optical system 310 and light passing through the wide angle optical system 320 are arranged in two dimensions.

Figure 11:
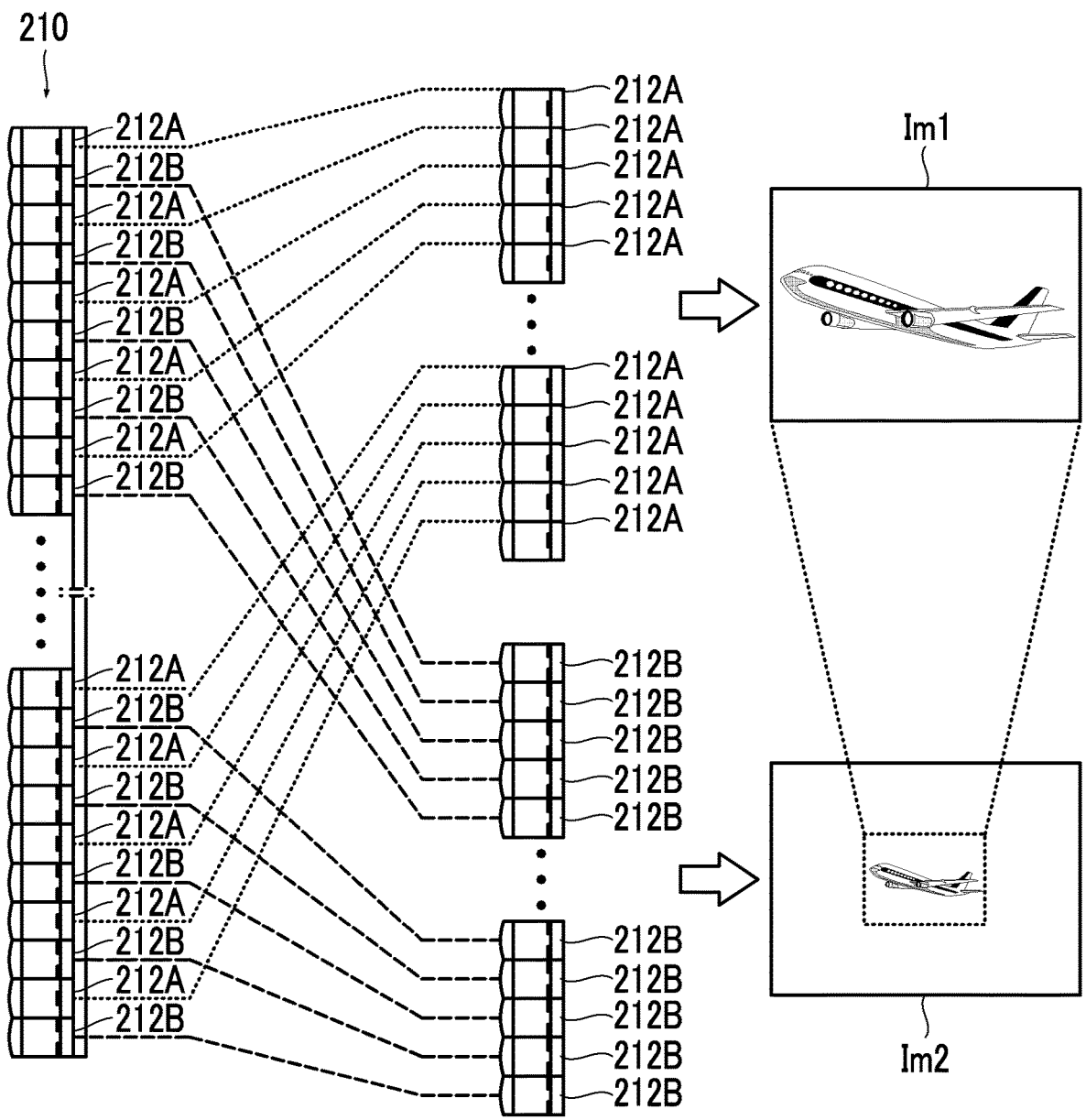
FIG. 11 is a schematic configuration diagram of an image sensor.

FIG. 11 is a schematic configuration diagram of the image sensor 210.

As illustrated in FIG. 11, the image sensor 210 includes a plurality of pixels configured with photoelectric conversion elements arranged in two dimensions and includes first pixels 212A that selectively receive light passing through the telephoto optical system 310, and second pixels 212B that selectively receive light passing through the wide angle optical system 320. The first pixels 212A and the second pixels 212B are alternately arranged on the same flat surface.

Figure 12:
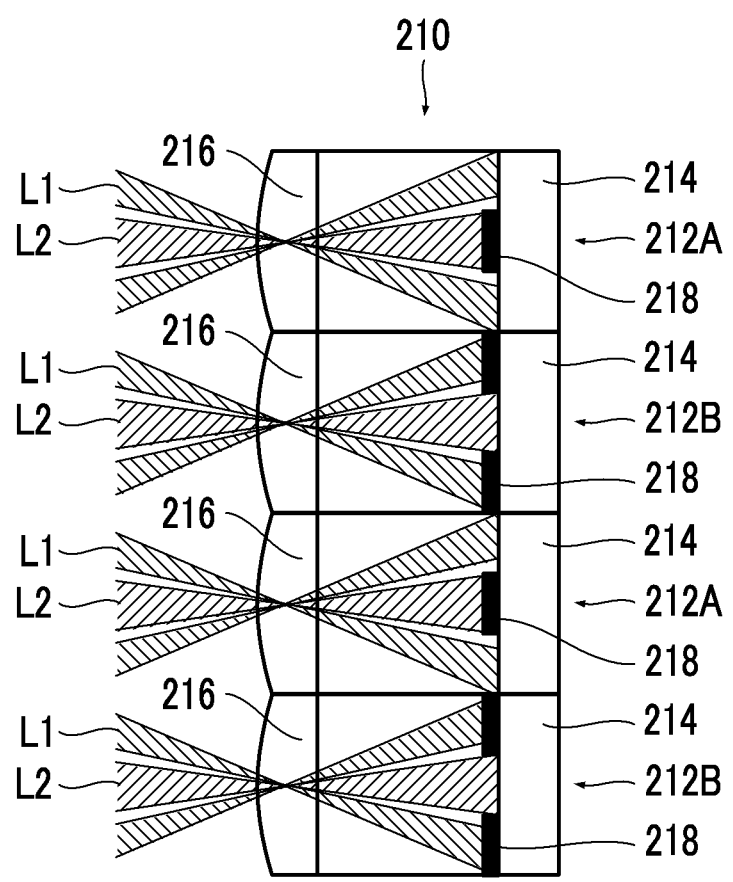
FIG. 12 is a conceptual diagram of a configuration in which each pixel of the image sensor selectively receives light from a corresponding optical system.

FIG. 12 is a conceptual diagram of a configuration in which each pixel of the image sensor 210 selectively receives light from a corresponding optical system.

As illustrated in FIG. 12, each pixel is configured to comprise a photodiode 214, a microlens 216, and a light blocking mask 218. The microlens 216 and the light blocking mask 218 function as a pupil separation unit that causes luminous flux passing through each of the telephoto optical system 310 and the wide angle optical system 320 to be selectively incident on each pixel of the image sensor 210 by pupil separation.

That is, the microlens 216 is arranged in front of the photodiode 214. The microlens 216 forms pupil images of the telephoto optical system 310 and the wide angle optical system 320 in the photodiode 214.

The light blocking mask 218 is arranged between the microlens 216 and the photodiode 214. The light blocking mask 218 blocks a part of light passing through the microlens 216. The light blocking mask 218 of the first pixel 212A has a shape that blocks light L2 passing through the wide angle optical system 320. Specifically, the light blocking mask 218 of the first pixel 212A has a circular shape. The light blocking mask 218 of the second pixel 212B has a shape that blocks light L1 passing through the telephoto optical system 310. Specifically, the light blocking mask 218 of the second pixel 212B has a ring shape.

By the above configuration, the first pixels 212A selectively receive the light L1 passing through the telephoto optical system 310, and the second pixels 212B selectively receive the light L2 passing through the wide angle optical system 320. Accordingly, by acquiring image signals of the first pixel 212A, an image signal of an image Im1 acquired through the telephoto optical system 310 can be acquired at the same time. By acquiring image signals of the second pixels 212B, an image signal of an image Im2 acquired through the wide angle optical system 320 can be acquired.

In the imaging lens 300 of the present embodiment, the optical axis of the telephoto optical system 310 is the same as the optical axis of the wide angle optical system 320. Thus, the image Im1 of the telephoto optical system 310 is an image that does not have parallax and is an image obtained by enlarging a central part of the image Im2 of the wide angle optical system 320.

In a case of acquiring a color image, color filters are comprised in the first pixels 212A and the second pixels 212B. The color filters are arranged in a predetermined arrangement. For example, color filters including three colors including red, green, and blue are arranged in a Bayer arrangement. Accordingly, a color image can be acquired.

<Analog Signal Processing Part>

In FIG. 5, the analog signal processing part 230 acquires an analog image signal of each pixel output from the image sensor 210, performs predetermined signal processing on the analog image signal, then converts the analog image signal into a digital signal, and outputs the digital signal. The digital image signal output from the analog signal processing part 230 is acquired by the camera micom 236.

<Recording Part>

The recording part 232 is a recording part of various data. Captured image data is recorded in the recording part 232. The recording part 232 is configured with a storage device using a non-volatile memory such as a solid state drive (SSD). The imaging apparatus 100 of the present embodiment captures two images (a telephoto image and a wide angle image) at the same time by performing imaging once. Thus, two images are recorded by performing imaging once. Specifically, image data captured by the telephoto optical system 310 and image data captured by the wide angle optical system 320 are recorded.

<Camera Side Wired Communication Part>

The camera side wired communication part 234 communicates with the unmanned aerial vehicle 10 in a wired manner and transmits and receives various signals with the unmanned aerial vehicle 10 under control of the camera micom 236.

<Camera Micom>

The camera micom 236 is a control part that controls an operation of the whole imaging apparatus 100. The camera micom 236 comprises a CPU, a ROM, and a RAM and implements various functions by executing a predetermined program. The program is stored in the ROM.

Figure 13:
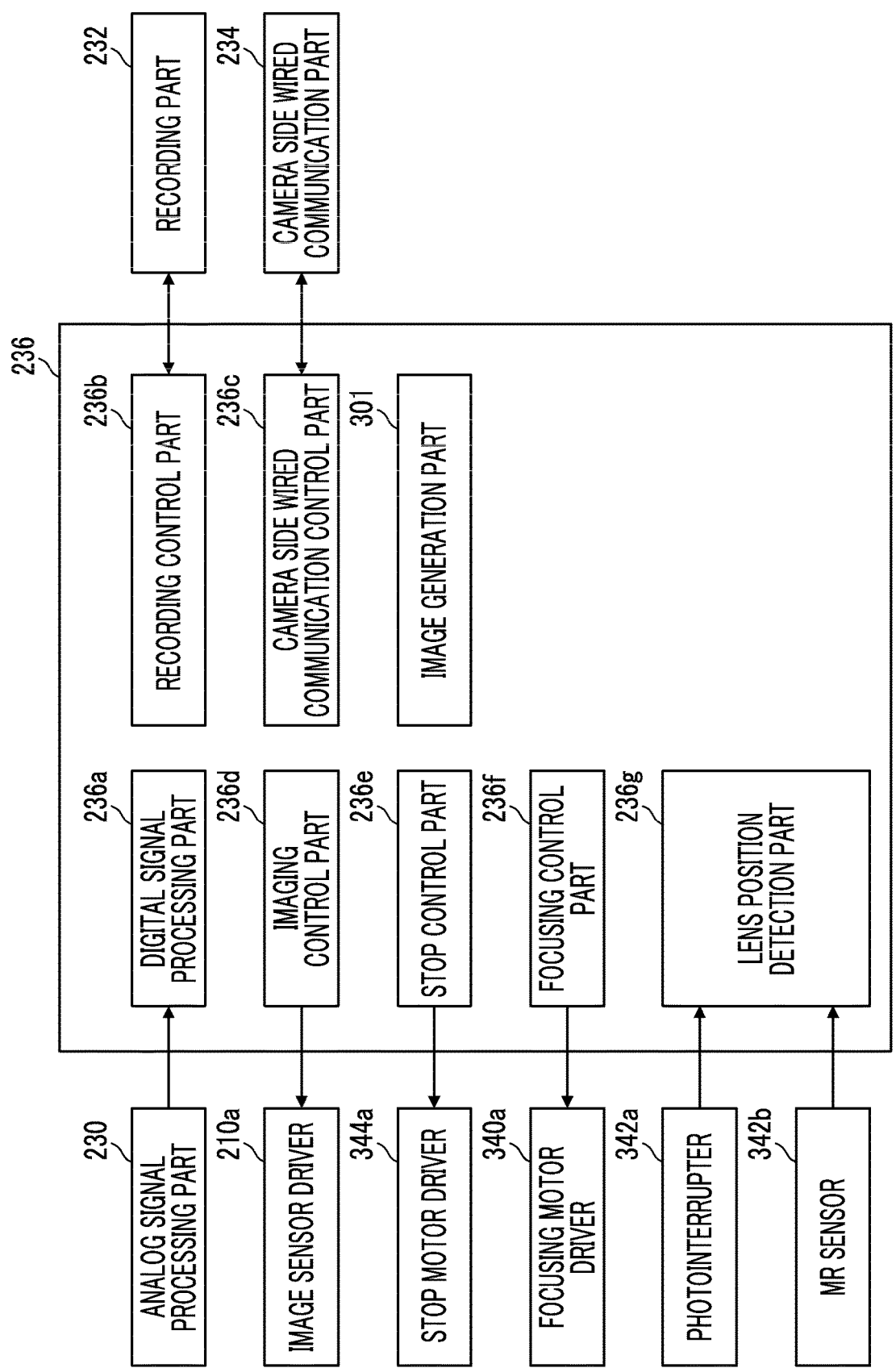
FIG. 13 is a block diagram of main functions implemented by a camera micom.

FIG. 13 is a block diagram of main functions implemented by the camera micom 236.

As illustrated in FIG. 13, the camera micom 236 functions as a digital signal processing part 236a, a recording control part 236b, a camera side wired communication control part 236c, an imaging control part 236d, a stop control part 236e, a focusing control part 236f, a lens position detection part 236g, an image generation part 301, and the like by executing the predetermined program.

The digital signal processing part 236a acquires the analog image signal output from the analog signal processing part 230 and generates image data by performing predetermined signal processing (for example, color interpolation, color separation, color balance adjustment, gamma correction, and image highlight processing) on the analog image signal. The digital signal processing part 236a generates telephoto image data based on the image signals of the first pixels 212A of the image sensor 210 and generates wide angle image data based on the image signals of the second pixels 212B.

The recording control part 236b controls reading and writing of data in the recording part 232. The image data (the telephoto image data and the wide angle image data) obtained by imaging is recorded in the recording part 232 by the recording control part 236b. In a telephoto image group and a wide angle image group captured as a motion picture (or a plurality of still pictures), image data of a telephoto image and a wide angle image captured at the same time is stored in association with each other. A plurality of wide dynamic range wide angle images (wide dynamic range wide angle image group) described later are also recorded in the recording part 232 in the same manner as the wide angle image.

The camera side wired communication control part 236c controls communication with the unmanned aerial vehicle 10 through the camera side wired communication part 234.

The imaging control part 236d functioning as an image reading part that acquires image signals indicating the wide angle image and the telephoto image at the same time from the image sensor 210 controls driving of the image sensor 210 through an image sensor driver 210a. More specifically, driving of the image sensor 210 is controlled such that a motion picture is imaged at a predetermined frame rate.

The stop control part 236e controls driving of the stop motor 344 through the stop driver 344a. More specifically, driving of the stop motor 344 is controlled such that the stop 310d has a predetermined F number (opening amount). The F number is set based on a signal obtained from the image sensor 210. That is, the F number is set such that an appropriate exposure is set.

The focusing control part 236f controls driving of the focusing motor 340 through the focusing motor driver 340a.

The lens position detection part 236g detects a lens position based on the outputs from the photointerrupter 342a and the MR sensor 342b.

The image generation part 301, based on the wide dynamic range wide angle image group and the telephoto image group, generates an image (composite image) in which the telephoto image group is composited. The image generation part 301 generates the composite image of the telephoto image group based on the wide angle image group and the telephoto image group. The image generation part 301 will be described in detail later.

<Operation of Unmanned Aerial Vehicle>

The unmanned aerial vehicle 10 flies in the air based on an operation of the controller 12. Specifically, the unmanned aerial vehicle 10 rises in accordance with the rising instruction provided by the controller 12 and falls in accordance with the falling instruction. In addition, the unmanned aerial vehicle 10 revolves in the direction of the instruction in accordance with the revolution instruction.

<Operation of Imaging Apparatus>

The imaging apparatus 100 also performs imaging based on the operation of the controller 12. That is, imaging of a motion picture is started in accordance with the imaging start instruction provided by the controller 12. Imaging of the motion picture is finished in accordance with the imaging finish instruction provided by the controller 12. The motion picture is continuously imaged from the imaging start until the imaging finish instruction is provided.

The imaging apparatus 100 of the present embodiment captures the telephoto image of the telephoto optical system 310 and the wide angle image of the wide angle optical system 320 at the same time on the same axis. Both images are motion pictures not having parallax and are recorded in the recording part 232.

<Operation of Unmanned Aerial Vehicle During Imaging>

Figure 14:
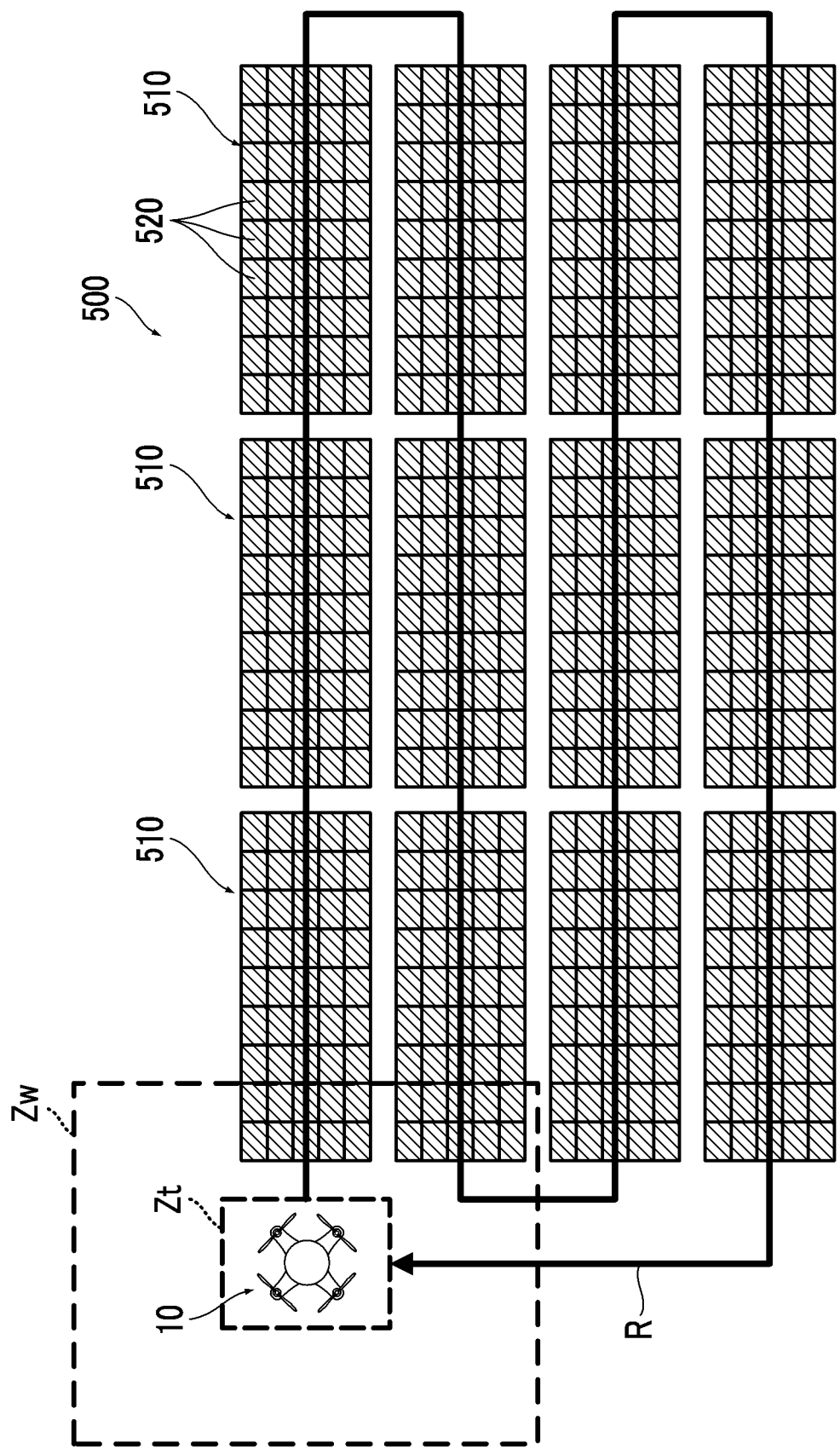
FIG. 14 is a diagram illustrating one example of a subject imaged by the imaging apparatus mounted on the unmanned aerial vehicle and a form of imaging.

FIG. 14 is a diagram illustrating one example of a subject imaged by the imaging apparatus 100 mounted on the unmanned aerial vehicle 10 and a form of imaging.

The subject illustrated in FIG. 14 is a solar power generation facility 500 that is installed on the ground. The imaging apparatus 100 mounted on the unmanned aerial vehicle 10 images the solar power generation facility 500 while moving along a flight route indicated by an arrow R from above by the unmanned aerial vehicle 10. That is, the unmanned aerial vehicle 10 flies such that the imaging apparatus 100 scans the solar power generation facility 500, and images the solar power generation facility 500 from above.

The solar power generation facility 500 is configured by regularly arranging a plurality of solar power generation units 510. One solar power generation unit 510 is configured by regularly arranging a plurality of solar cell modules 520. In the example illustrated in FIG. 14, 45 solar cell modules 520 are arranged in 5×9 vertically and horizontally, and constitute one solar power generation unit 510.

Figure 15:
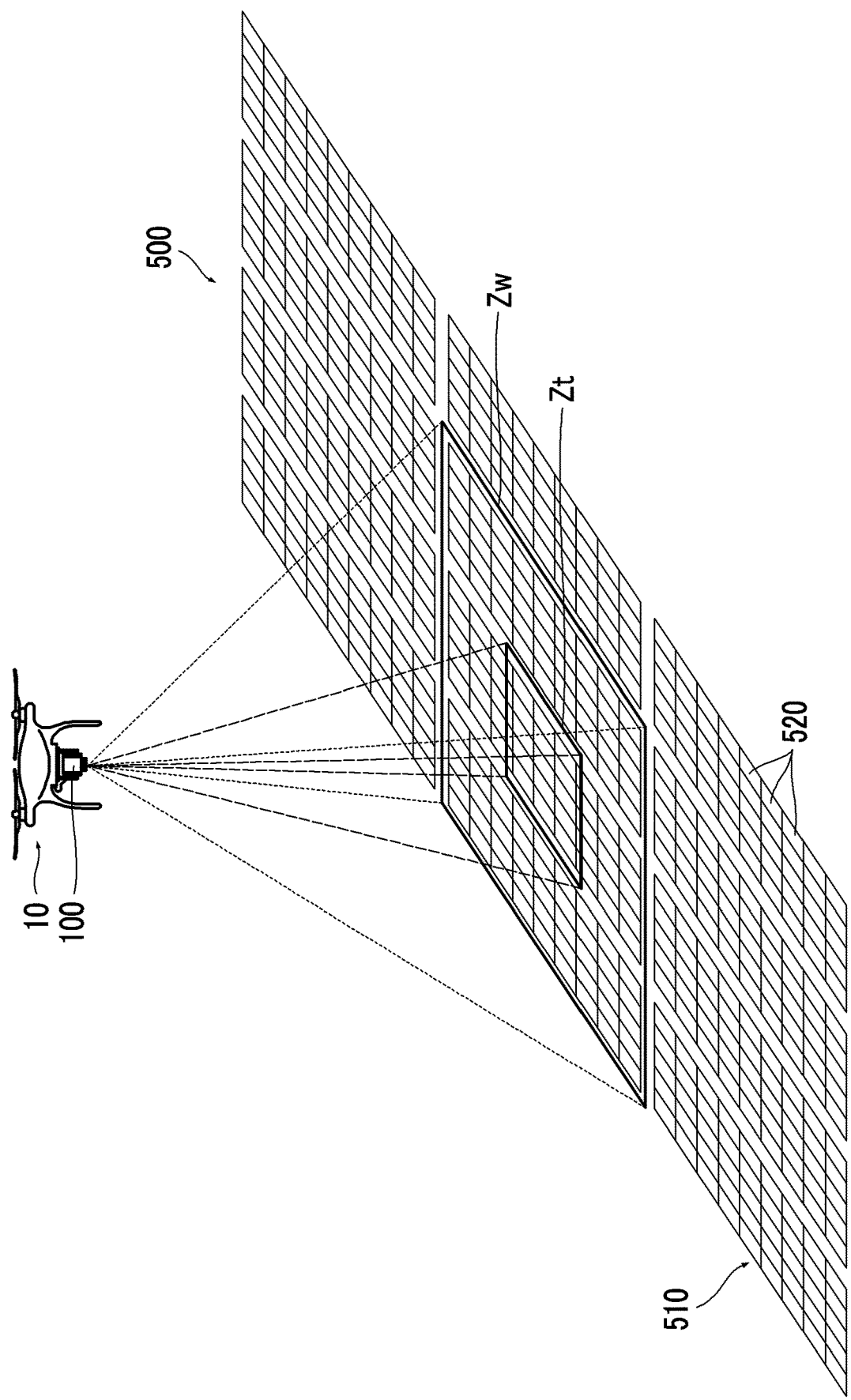
FIG. 15 is a perspective view illustrating a state where a solar power generation unit is imaged by the imaging apparatus mounted on the unmanned aerial vehicle.

FIG. 15 is a perspective view illustrating a state where the solar power generation unit 510 is imaged by the imaging apparatus 100 mounted on the unmanned aerial vehicle 10. An imaging range of imaging performed once through the telephoto optical system 310 is denoted by Zt, and an imaging range of imaging performed once through the wide angle optical system 320 is denoted by Zw.

In the example illustrated in FIG. 15, the imaging range Zt of imaging performed once through the telephoto optical system 310 is a range that can cover a length of one solar power generation unit 510 in a short direction. The imaging range Zw of imaging performed once through the wide angle optical system 320 is a range that can cover a length of three solar power generation units 510 in the short direction.

Figure 16:
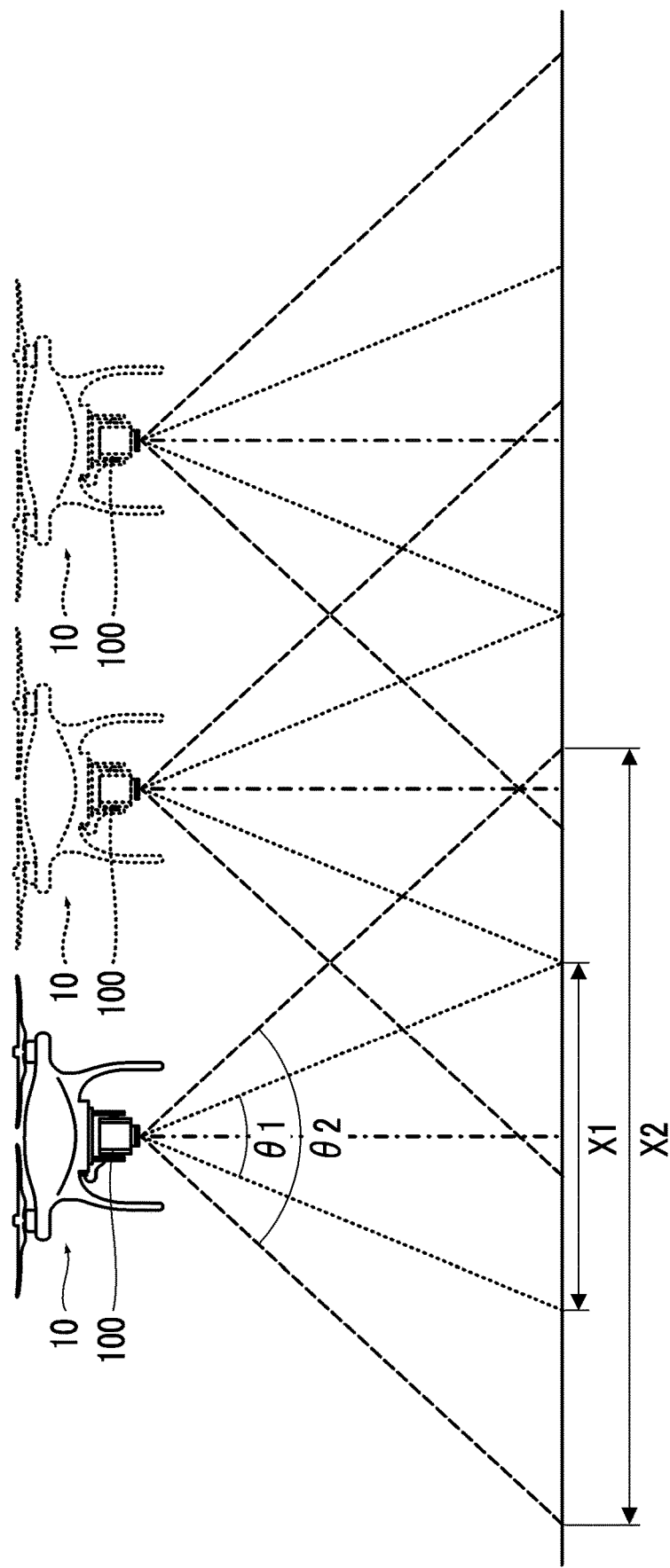
FIG. 16 is a diagram illustrating a state where a wide angle image and a telephoto image are captured while the unmanned aerial vehicle flies at an almost constant altitude.

As illustrated in FIG. 16, the unmanned aerial vehicle 10 flies (including hovering) at an almost constant altitude during imaging. Accordingly, revolution is the only operation during imaging.

The unmanned aerial vehicle micom 30 functioning as the movement control part 30a controls driving of each propeller drive motor 20 and flies at an almost constant altitude based on an output from the sensor part 24.

A case of performing imaging toward immediately below the imaging apparatus 100 from a constant altitude is considered. In this case, a range X1 of an angle of view θ1 is imaged by the telephoto optical system 310, and a range X2 of an angle of view θ2 is imaged by the wide angle optical system 320.

In the telephoto image group that is used for compositing the telephoto image described below, the range X1 does not need to overlap between adjacent telephoto images (it is preferable that the range X1 overlaps without a gap). In the wide angle image group, the range X2 needs to sufficiently overlap between adjacent wide angle images.

<Flight of Unmanned Aerial Vehicle>

The unmanned aerial vehicle 10 may be configured to automatically fly along a predetermined route. In this case, the controller 12 is not necessary. The unmanned aerial vehicle 10 flies along the determined route while performing autonomous control based on information about various sensors. Even in this case, the flight speed is set under the above condition.

<Imaging by Imaging Apparatus>

In the embodiment, it is configured that a motion picture is continuously imaged in accordance with the imaging instruction. Alternatively, it may be configured that still pictures are periodically imaged.

<<Composition Processing for Captured Images>>

A plurality of telephoto images (telephoto image group) captured by the telephoto optical system 310 and a plurality of wide angle images (wide angle image group) captured by the wide angle optical system 320 are recorded in the recording part 232.

Image composition processing, described later, for the telephoto image group and the wide dynamic range wide angle image group (wide angle image group) is performed by the image generation part 301 (FIG. 13) of the imaging apparatus 100. In this case, the camera micom 236 executes the processing by executing an image generation program.

<Image Composition Processing>

Figure 17:
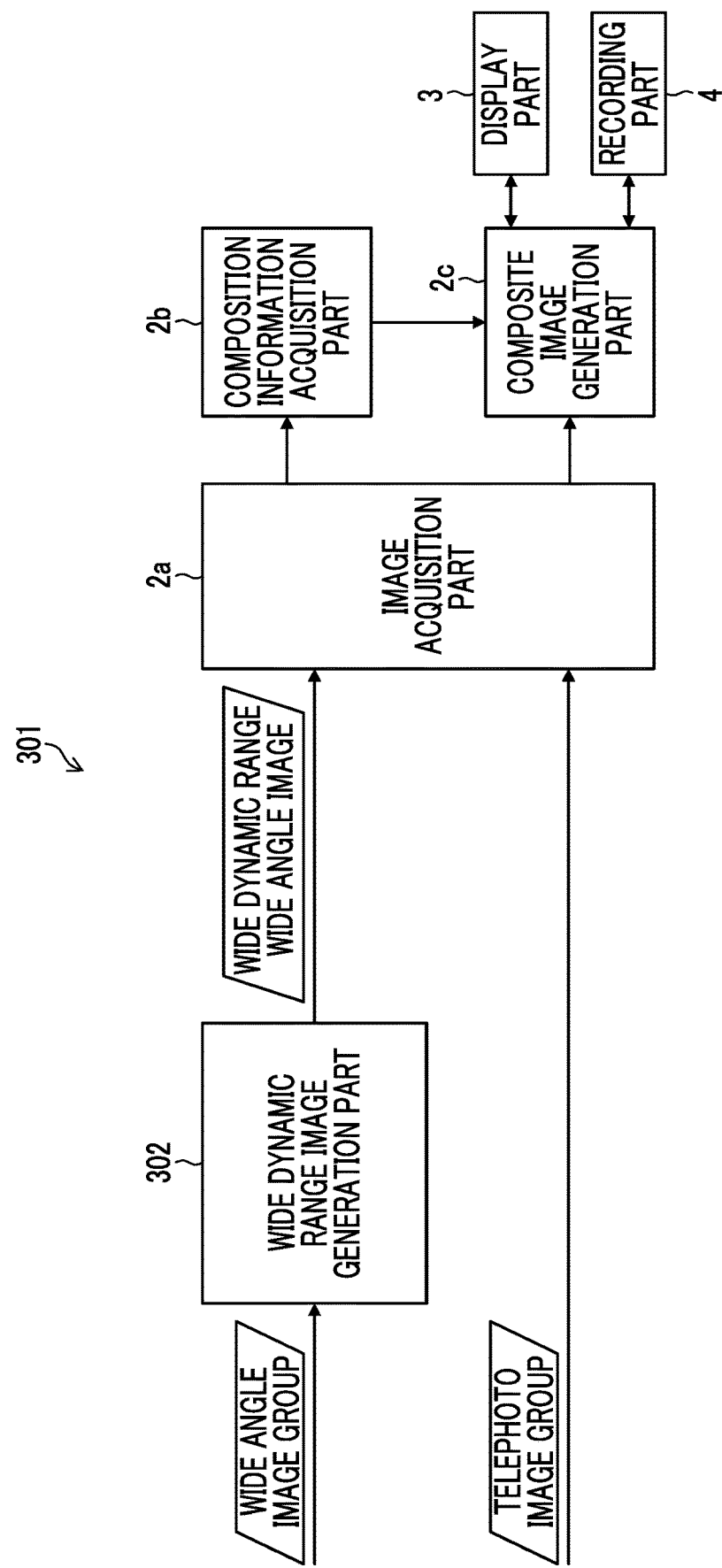
FIG. 17 is a function block diagram illustrating an embodiment of an image generation part.

FIG. 17 is a function block diagram illustrating an embodiment of the image generation part 301.

As illustrated in FIG. 17, the image generation part 301 mainly comprises a wide dynamic range image generation part 302, an image acquisition part 2a, a composition information acquisition part 2b, and a composite image generation part 2c.

The wide dynamic range image generation part 302 generates the wide dynamic range wide angle image by enlarging a dynamic range of the acquired wide angle image. The wide dynamic range image generation part 302 generates the wide dynamic range wide angle image based on a wide angle image obtained by performing imaging at an exposure smaller than an appropriate exposure. Specifically, the wide dynamic range image generation part 302 enlarges the dynamic range by performing tone mapping on one wide angle image captured at an exposure smaller than an appropriate exposure. Accordingly, pixels of wash-out and blocked-up shadow in the wide angle image can be suppressed. The wide dynamic range image generation part 302 can also generate the wide dynamic range wide angle image based on two wide angle images of different exposures. Specifically, the wide dynamic range image generation part 302 generates the wide dynamic range wide angle image by compositing two wide angle images of different exposures.

The image acquisition part 2a acquires the wide dynamic range wide angle image group and the telephoto image group.

The composition information acquisition part 2b acquires composition information to be used for compositing the telephoto image group by analyzing the wide dynamic range wide angle image group acquired by the image acquisition part 2a.

First Embodiment of Acquisition of Composition Information

The composition information acquisition part 2b estimates, as the composition information, each of a position and an attitude of the imaging apparatus 100 in a case where each wide dynamic range wide angle image of the wide dynamic range wide angle image group is captured, by analyzing the wide dynamic range wide angle image group.

Specifically, feature points included in a region (overlapping region) in which each wide dynamic range wide angle image of the wide dynamic range wide angle image group overlaps are extracted, and a correspondence relationship (correspondence points having a matching local feature amount) of the feature points between wide dynamic range wide angle images is specified.

A scale-invariant feature transform (SIFT) feature amount, a speeded-up robust feature (SURF) feature amount, and an accelerated KAZE (AKAZE) feature amount are known as a robust local feature amount that is strong against enlargement and reduction (difference in imaging distance), rotation, and the like between wide dynamic range wide angle images. It is preferable that the number (number of sets) of correspondence points having a matching feature amount is greater than or equal to a few tens of sets. Accordingly, it is preferable that the overlapping region between wide dynamic range wide angle images is large. In the example illustrated in FIG. 16, the overlapping region between wide dynamic range wide angle images exceeds 50% of the whole image.

Each of the position and the attitude of the imaging apparatus 100 is estimated based on a plurality of corresponding feature points between wide dynamic range wide angle images.

<Estimation of Position and Attitude of Imaging Apparatus>

FIG. 18 is a diagram illustrating a relationship among a world coordinate system, a local coordinate system, and an image coordinate system.

A three-dimensional position (three-dimensional shape) of the subject (in the present example, the solar power generation facility including the solar power generation units 510) can be represented by the world coordinate system of three orthogonal axes X, Y, and Z having an origin O.

The local coordinate system (hereinafter, referred to as a "camera coordinate system") of three orthogonal axes x, y, and z is a coordinate system of the imaging apparatus 100 (camera) that moves independently of the world coordinate system. An origin of the camera coordinate system is a focal position of the camera. A direction of the optical axis is along the z axis.

The image coordinate system is a coordinate system representing a two-dimensional position of a point on the image formed in the image sensor 210. Coordinates (u, v) of a feature point c on the image can be obtained from the number of pixels from a standard position of the image sensor 210 and a pixel pitch.

A relationship among the coordinates (u, v) of the feature point c in the image coordinate system, coordinates (X, Y, Z) of the feature point c in the world coordinate system, a matrix C representing camera intrinsic parameters, and a matrix M representing camera extrinsic parameters can be represented by the following expression.

$$c \begin{pmatrix} u \\ v \\ 1 \end{pmatrix} = CM \begin{pmatrix} X \\ Y \\ Z \\ 1 \end{pmatrix}$$ [Expression 1]

The camera intrinsic parameters include the focal length and an image size, the pixel pitch, an image center position, and the like of the image sensor and can be acquired in advance by calibration.

The matrix M representing the camera extrinsic parameters is a matrix for coordinate transformation from world coordinates to camera coordinates and includes a translation vector representing the position of the imaging apparatus 100 and a rotation matrix representing the attitude of the imaging apparatus 100.

The position and the attitude of the imaging apparatus 100 can be estimated by obtaining the matrix M representing the camera extrinsic parameters. A structure from motion (SfM) method is known as a method of estimating the camera extrinsic parameters based on a plurality of feature points on the image.

The SfM method includes tracing the plurality of feature points on the image captured while moving the imaging apparatus 100 (camera), and calculating the position and the attitude of the camera and three-dimensional positions of the feature points using the correspondence relationship between the feature points. In the SfM method, a relative position between the camera and the subject and a relative position and attitude between cameras can be estimated. However, scale information cannot be obtained using only the image. Thus, an absolute position cannot be estimated. Therefore, the absolute position can be estimated by providing absolute position information such as a marker having a known three-dimensional position, size information (for example, size information about the solar cell module 520) about the subject, or the like.

The composition information acquisition part 2b (FIG. 17) estimates, as the composition information, each of the position and the attitude of the imaging apparatus 100 in a case where each wide dynamic range wide angle image of the wide dynamic range wide angle image group is captured, using the SfM method for the input wide dynamic range wide angle image group.

The composition information acquisition part 2b is not limited to a case of using the SfM method and may use, for example, a simultaneous localization and mapping (SLAM) method. In the SLAM method, the positions of the feature points and the position and the attitude of the camera can be estimated at the same time using a set of feature points that are dynamically updated in accordance with a change in input image. A basic principle of the SLAM method is disclosed in Andrew J. Davison, "Real-Time Simultaneous Localization and Mapping with a Single Camera", Proceedings of the 9th IEEE International Conference on Computer Vision Volume 2, 2003, pp. 1403-1410.

Figure 19:
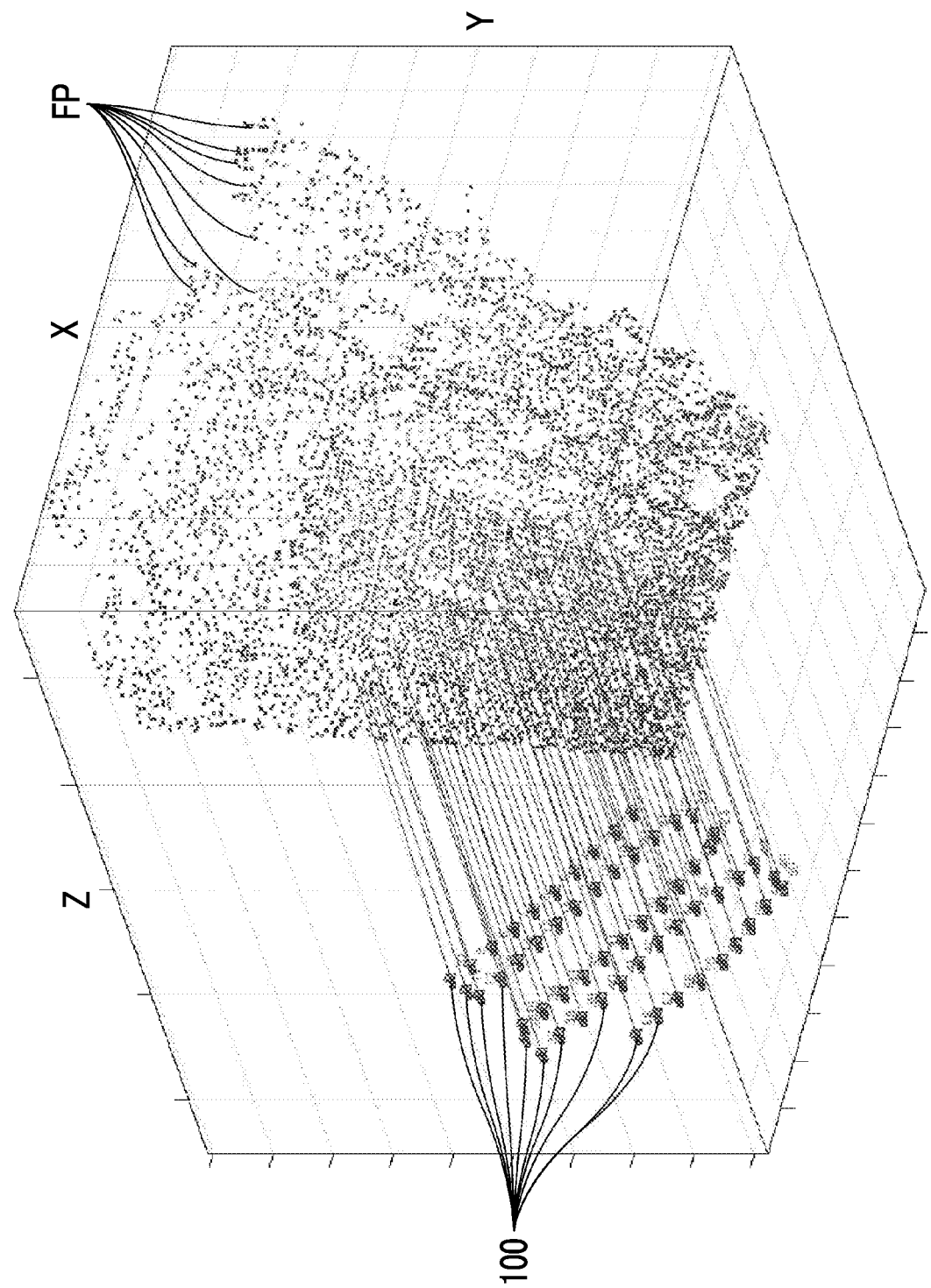
FIG. 19 is a diagram illustrating a position and an attitude of the imaging apparatus and three-dimensional positions of feature points FP estimated by a composition information acquisition part using a SfM method.

FIG. 19 is a diagram illustrating the position and the attitude of the imaging apparatus 100 and three-dimensional positions of feature points FP estimated by the composition information acquisition part 2b using the SfM method.

In FIG. 19, an XYZ coordinate system is the world coordinate system. In the present example, an X-Y plane represents a horizontal plane, and the Z axis represents a height direction (altitude). A line segment from each imaging position of the imaging apparatus 100 to the horizontal plane denotes the imaging (optical axis) direction of the imaging apparatus 100.

Returning to FIG. 17, the composite image generation part 2c generates an image in which the telephoto image group is composited based on the composition information (in the present example, the position, the attitude, and the like of the imaging apparatus 100) acquired by the composition information acquisition part 2b, information related to the focal lengths of the wide angle optical system 320 and the telephoto optical system 310 (in the present example, an angle of view ratio (focal length ratio) between both optical systems), and the telephoto image group acquired by the image acquisition part 2a.

Figure 20:
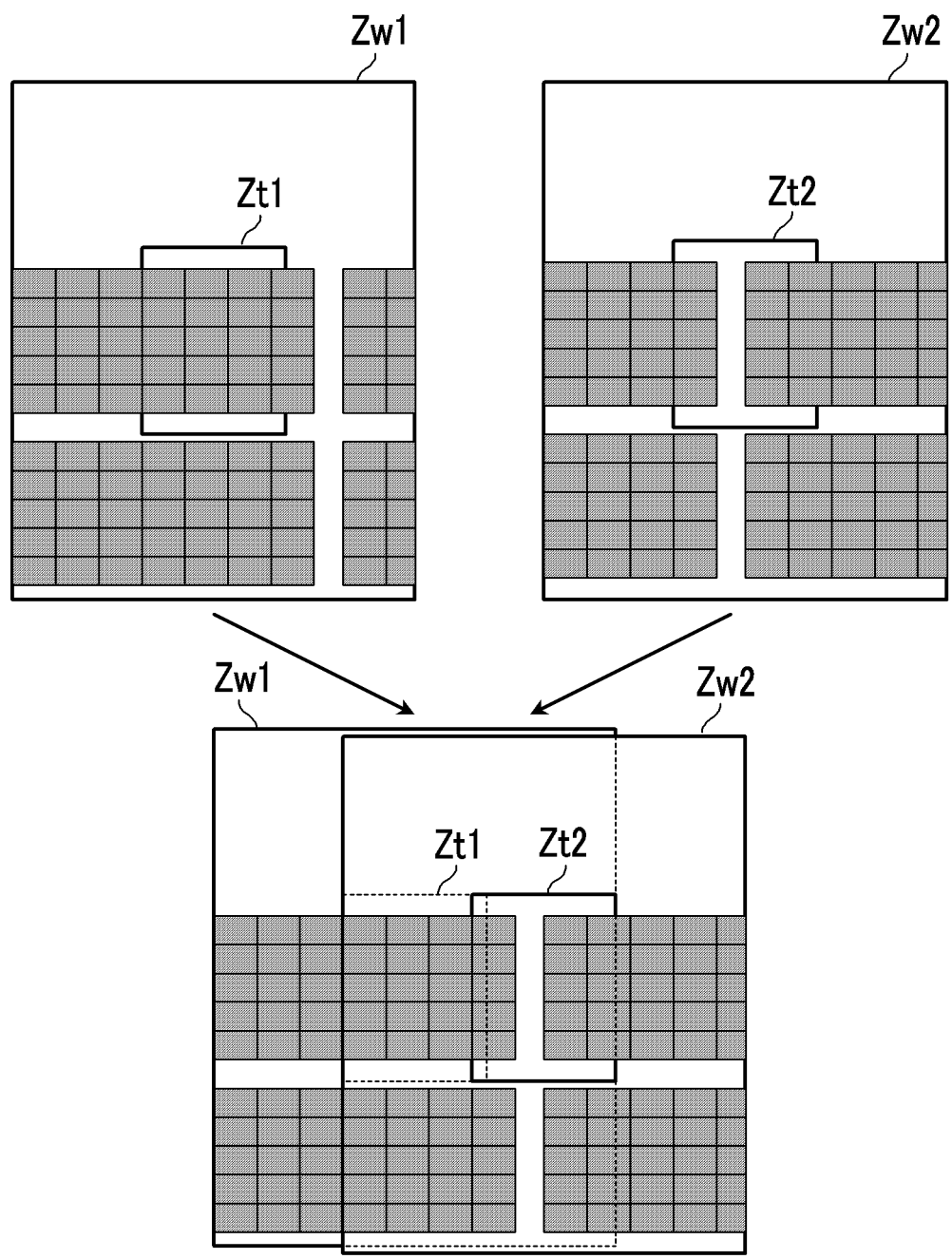
FIG. 20 is a diagram for describing a method of compositing two telephoto images based on two wide angle images.

FIG. 20 is a diagram illustrating a method of compositing two telephoto images based on two wide dynamic range wide angle images.

In FIG. 20, imaging ranges Zw1 and Zw2 of two adjacent wide angle images overlap with each other in more than 50% of the whole image. The composition information acquisition part 2b acquires the composition information (the position and the attitude of the imaging apparatus 100 in a case of capturing each of the two wide angle images) based on a plurality of corresponding feature points in the overlapping region between the two wide dynamic range wide angle images. The composite image generation part 2c can composite wide angle images such that corresponding feature points are registered to overlap with each other by projecting the two wide angle images from, as a starting point, the position of the imaging apparatus 100 in a case of capturing each of the two wide angle images to the imaging direction corresponding to the attitude of the imaging apparatus 100 using the horizontal plane as a projection plane. In the present invention, the feature points are detected in the wide dynamic range wide angle images.

In the present invention, two telephoto images are appropriately composited using telephoto images that are captured at the same time as the wide angle images are used instead of the wide dynamic range wide angle images, by performing projection by reflecting an angle of view ratio (θ1/θ2) between the angle of view θ1 of the telephoto optical system 310 and the angle of view θ2 of the wide angle optical system 320 illustrated in FIG. 16. The matrix C (particularly, the focal length) which represents the camera intrinsic parameters and is illustrated in [Expression 1] is different between the telephoto optical system 310 and the wide angle optical system 320. Thus, by using the composition information acquired by analyzing the wide angle image group and performing transformation by reflecting a difference in camera intrinsic parameter, the two telephoto images can be appropriately composited.

It is preferable that imaging ranges Zt1 and Zt2 of the two composited telephoto images have a small overlapping part between both images. The reason is that the overlapping part between the adjacent telephoto images is not used for acquiring the composition information for compositing the telephoto images, and the number of times of capturing the telephoto image group can be significantly decreased by reducing the overlapping part between the telephoto images.

Even in a case where there is no overlapping part between the telephoto images, the telephoto image group can be composited. In this case, a gap is generated in the composited image. However, the gap can be filled by performing imaging again. The gap can also be filled with the wide dynamic range wide angle image. In this case, resolution of the image in the gap part is decreased.

Figure 21:
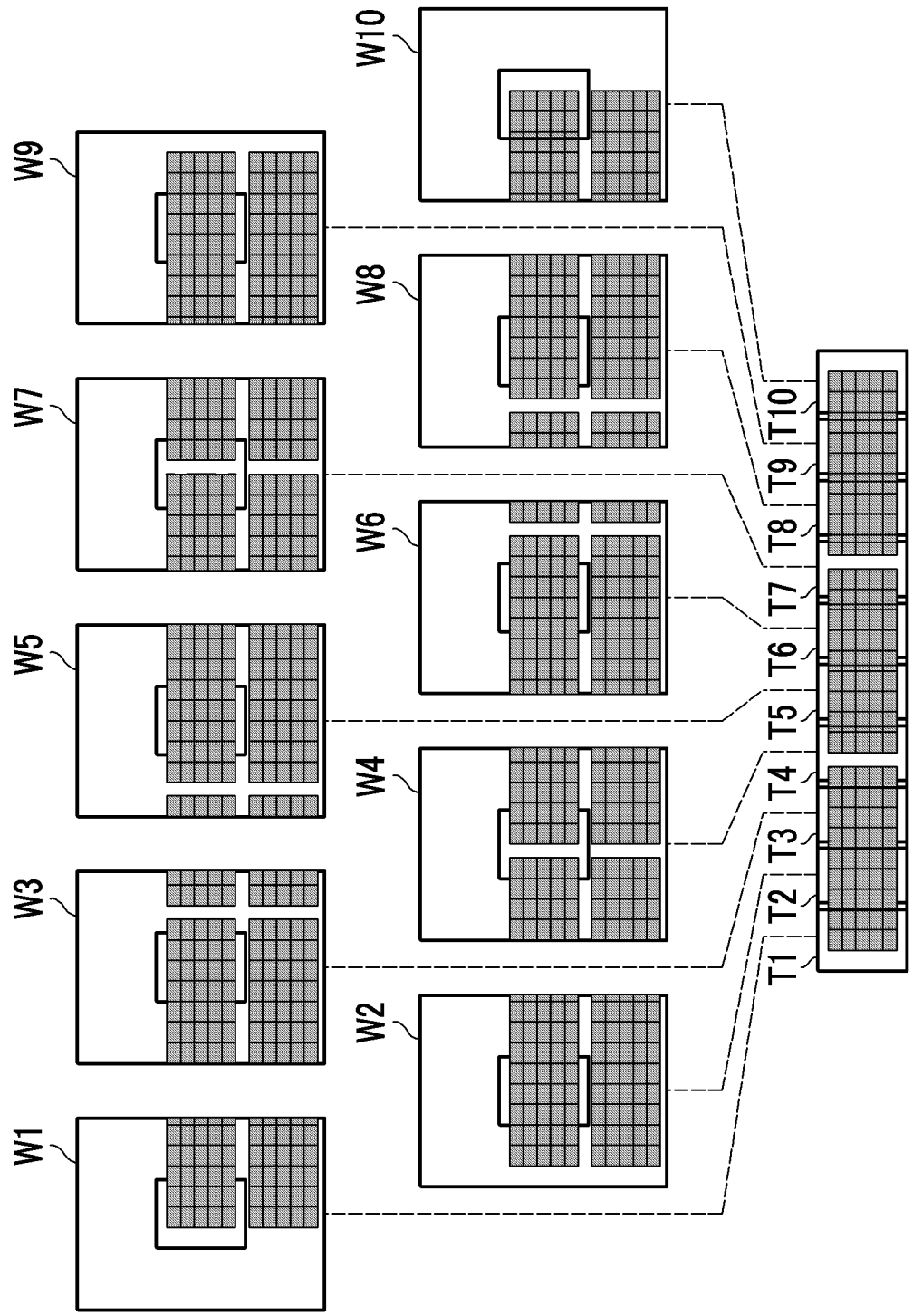
FIG. 21 is a conceptual diagram of generation of a composite image.

FIG. 21 is a conceptual diagram of generation of the composite image.

FIG. 21 illustrates 10 wide dynamic range wide angle images W1 to W10 obtained in a case where the imaging apparatus 100 almost linearly flies, and 10 telephoto images T1 to T10 composited based on the composition information acquired from the wide dynamic range wide angle images W1 to W10. In FIG. 21, the telephoto images T1 to T10 are illustrated in small size in order to illustrate imaging ranges of the wide dynamic range wide angle images W1 to W10 and the telephoto images T1 to T10. However, image sizes of the telephoto images T1 to T10 are large (resolution is high).

Returning to FIG. 17, the composite image in which the telephoto image group is composited by the composite image generation part 2c can be displayed by outputting the composite image to the display part 3 and can also be stored by outputting the composite image to the recording part 4.

A user can observe the subject (in the present example, the solar power generation facility 500) using the composite image displayed on the display part 3. Particularly, in a case of observing the solar power generation units 510 constituting the solar power generation facility 500 and furthermore, the solar cell modules 520 constituting the solar power generation unit 510 in detail (in a case of observing a stain, a defect, or the like in the solar power generation unit 510), the user can enlarge and display the composite image on the display part 3. Even in a case of enlarging and displaying the composite image, the composite image has high resolution and can be observed in detail because the composite image is generated by compositing the telephoto images.

Second Embodiment of Acquisition of Composition Information

The composition information acquisition part 2b illustrated in FIG. 17 extracts, using any wide dynamic range wide angle image as a standard, a plurality of feature points (a plurality of sets of correspondence points having a matching SIFT feature amount or the like) present in an overlapping region with an adjacent wide dynamic range wide angle image by analyzing the wide dynamic range wide angle image group.

Next, a projective transformation matrix of the adjacent wide dynamic range wide angle image for matching between a corresponding feature points of the adjacent wide dynamic range wide angle image and a plurality of feature points of the standard wide dynamic range wide angle image is calculated.

A detected number (number of sets) of feature points having a matching feature amount needs to be greater than or equal to a number necessary for calculating transformation parameters used for geometrically transforming one of the two images.

A projective transformation expression is illustrated in the following expression.

$$X=(ax+by+s)/(px+qy+1)$$

$$Y=(cx+dy+t)/(px+qy+1) \qquad \text{[Expression 2]}$$

The transformation parameters of projective transformation refer to eight parameters of a, b, s, c, d, t, p, and q in [Expression 2]. Coordinate values before and after the projective transformation are denoted by (x, y) and (X, Y).

Accordingly, the eight transformation parameters used for the projective transformation can be calculated by formulating eight simultaneous equations obtained by substituting coordinate values of each of the plurality of sets of feature points in [Expression 2] and solving the eight simultaneous equations.

The transformation parameters of the projective transformation are sequentially calculated based on the wide dynamic range wide angle image group.

The transformation parameters of the projective transformation acquired by the composition information acquisition part 2b are input into the composite image generation part 2c as the composition information to be used for compositing the telephoto image group. The composite image generation part 2c composites the telephoto image group by performing the projective transformation of another telephoto image group to a telephoto image corresponding to the standard wide dynamic range wide angle image based on the input composition information and information related to the focal lengths of the wide angle optical system 320 and the telephoto optical system 310.

Third Embodiment of Acquisition of Composition Information

The composition information acquisition part 2b illustrated in FIG. 17 estimates, as the composition information, each of the position and the attitude of the imaging apparatus 100 and a solid shape of the subject in a case where each wide dynamic range wide angle image of the wide dynamic range wide angle image group is captured, by analyzing the wide dynamic range wide angle image group.

In this case, the wide dynamic range wide angle image group is captured from various angles such that a region not imaged is not present for the subject having a solid shape.

The solid shape of the subject is a collection of three-dimensional positions of a plurality of feature points having a matching feature between the wide dynamic range wide angle images. It is preferable to acquire highly dense three-dimensional positions by appropriately interpolating the three-dimensional positions of the plurality of feature points.

The composite image generation part 2c generates an image in which the telephoto image group is composited by mapping a texture corresponding to the telephoto image group to a three-dimensional model surface of the subject including the three-dimensional positions of the plurality of feature points. That is, the composite image generation part 2c generates a polygon mesh for recognizing the shape of the subject based on three-dimensional positions including the plurality of feature points acquired by the composition information acquisition part 2b, extracts a texture corresponding to the polygon mesh from the telephoto image group, and maps the texture to the generated polygon mesh.

A three-dimensional composite image (three-dimensional image) in which the telephoto image group is composited is recorded in the recording part 4. The composite image generation part 2c or an image playback part, not illustrated, can display an image of the subject seen from any viewpoint on the display part 3 by reading out the three-dimensional image recorded in the recording part 4 and projecting the three-dimensional image by designating a viewpoint position, a projection plane, and the like.

[Image Generation Method]

FIG. 22 is a flowchart of an image generation method according to the embodiment of the present invention.

First, the wide dynamic range image generation part 302 generates the wide dynamic range wide angle images (step S10) (wide dynamic range image generation step). Then, each of the wide dynamic range wide angle image group and the telephoto image group is input into the image acquisition part 2a (steps S11 and S12) (image acquisition step).

The composition information acquisition part 2b acquires the composition information to be used for compositing the telephoto image group by analyzing the input wide dynamic range wide angle image group (step S13) (composition information acquisition step).

The composite image generation part 2c generates the composite image in which the telephoto image group is composited based on the composition information acquired in step S13, the information (angle of view ratio) related to the focal lengths of the wide angle optical system 320 and the telephoto optical system 310 of the imaging apparatus 100, and the telephoto image group (step S14). The composite image is generated by composition by projecting each telephoto image of the telephoto image group to the imaging direction of the imaging apparatus 100 from the position of the imaging apparatus 100 as a starting point by reflecting the angle of view ratio between the wide angle optical system 320 and the telephoto optical system 310.

An image in a center region (region corresponding to an angle of view of the telephoto image) of each image of the wide dynamic range wide angle image group and each image of the telephoto image group are the same image except for having different resolution. Thus, the composition information obtained by analyzing the wide dynamic range wide angle image group can be used for compositing the telephoto image group.

Accordingly, the number of times of capturing the telephoto image group can be significantly decreased, and a high resolution composite image can be generated.

FIG. 23 is a flowchart illustrating another embodiment of the image generation method according to the embodiment of the present invention and particularly, illustrates a processing procedure of generating the three-dimensional image by the composition information acquisition part 2b and the composite image generation part 2c.

In FIG. 23, the composition information acquisition part 2b extracts the feature points included in the region (overlapping region) in which the wide dynamic range wide angle images of the wide dynamic range wide angle image group overlap with each other (step S100) and decides the correspondence relationship (correspondence points having a matching local feature amount) of the feature points between the wide dynamic range wide angle images (step S110).

Next, the composition information acquisition part 2b estimates the position and the attitude of the imaging apparatus 100 based on the plurality of corresponding feature points between the wide dynamic range wide angle images (step S120). In addition, the composition information acquisition part 2b estimates the three-dimensional positions of the feature points at the same time from an estimation result of the position and the attitude of the imaging apparatus 100 (step S130).

The position and the attitude of the imaging apparatus 100 can be estimated by obtaining the matrix M representing the camera extrinsic parameters illustrated in [Expression 1] based on image coordinates of the plurality of feature points. The SfM method and the SLAM methods are known as a method of estimating the camera extrinsic parameters based on the plurality of feature points on the image.

The solid shape of the subject including the three-dimensional positions of the feature points estimated in step S130 is estimated (step S140). An image (three-dimensional image) in which the telephoto image group is composited by mapping the texture corresponding to the telephoto image group to the estimated solid shape (three-dimensional model surface) of the subject (step S150).

<<Subject of Wide Dynamic Range>>

Next, a subject of a wide dynamic range will be described.

Figure 24:
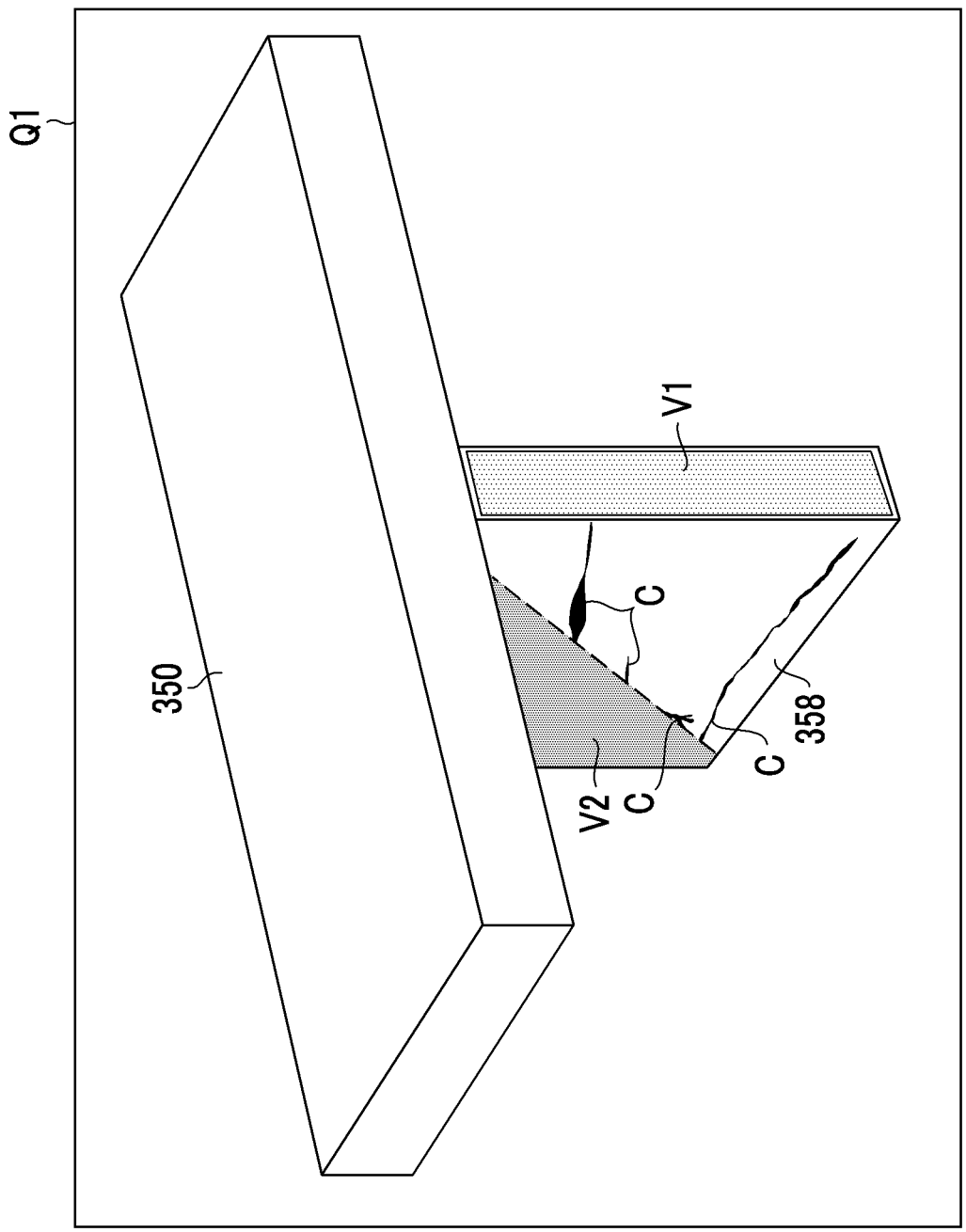
FIG. 24 is a diagram illustrating a wide angle image.

FIG. 24 is a diagram illustrating a wide angle image obtained by imaging a bridge 350 using the wide angle optical system 320.

The bridge 350 includes a pier 358, and a plurality of cracks C are present in the pier 358. In the following description, the cracks C of the pier 358 and feature points of the cracks C will be mainly described, and other parts will not be described.

In FIG. 24, a wide angle image Q1 of a normal dynamic range that is captured at an appropriate exposure is illustrated. A wash-out region V1 that faces the sun and thus, is washed out is present in the pier 358. In addition, a blocked-up shadow region V2 that is shaded from the sun and thus, has blocked-up shadow is present in the pier 358. That is, the pier 358 is a subject of a wide dynamic range having the wash-out region V1 and the blocked-up shadow region V2. In the wash-out region V1 of the wide angle image Q1, an image cannot be obtained regardless of the presence of the cracks C in the pier 358. In addition, in the blocked-up shadow region V2 of the wide angle image Q1, blocked-up shadow is present, and an image cannot be obtained regardless of the presence of the cracks C in the pier 358.

Figure 25:
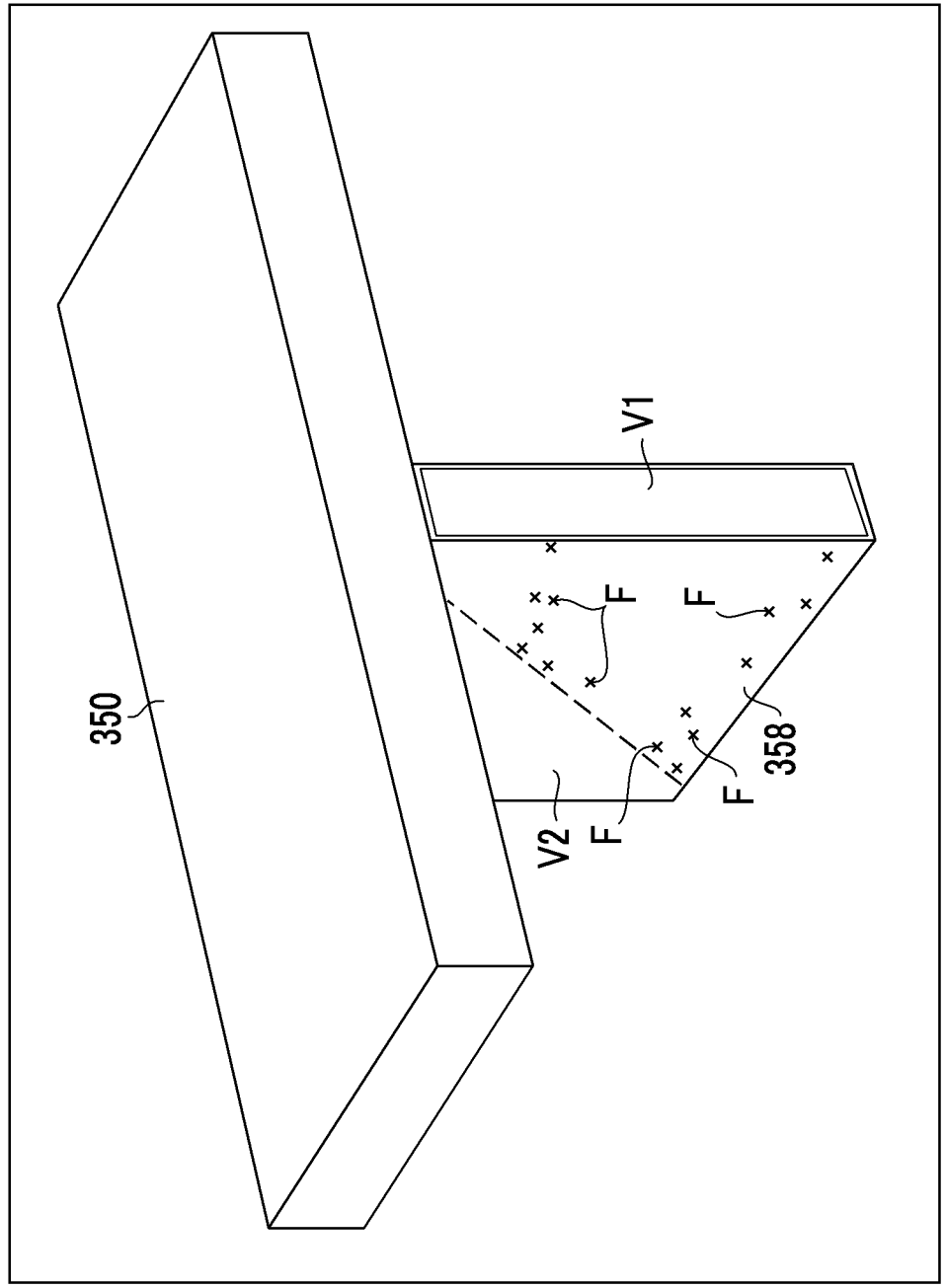
FIG. 25 is a diagram illustrating one example of a result of detection of feature points.

FIG. 25 is a diagram illustrating one example of a result of detection of the feature points based on the wide angle image Q1 illustrated in FIG. 24.

Feature points F are detected by the composition information acquisition part 2b. The composition information acquisition part 2b detects the feature points F based on an image of the cracks C in the wide angle image Q1. Thus, the composition information acquisition part 2b can detect the feature points F in only a region in which the image of the cracks C is successfully captured. In the wide angle image Q1, the image of the cracks C in the wash-out region V1 and the blocked-up shadow region V2 cannot be obtained. Thus, the feature points F in the wash-out region V1 and the blocked-up shadow region V2 are not detected.

In a case of compositing the telephoto image, more accurate composition information can be obtained as the number of feature points F detected by the composition information acquisition part 2b is increased. Accordingly, in the present invention, a large number of feature points F are detected by performing dynamic range enlargement processing on the wide angle image. In the following description, a case of obtaining the wide dynamic range wide angle image by obtaining two wide angle images of different exposure amounts will be described.

Figure 26:
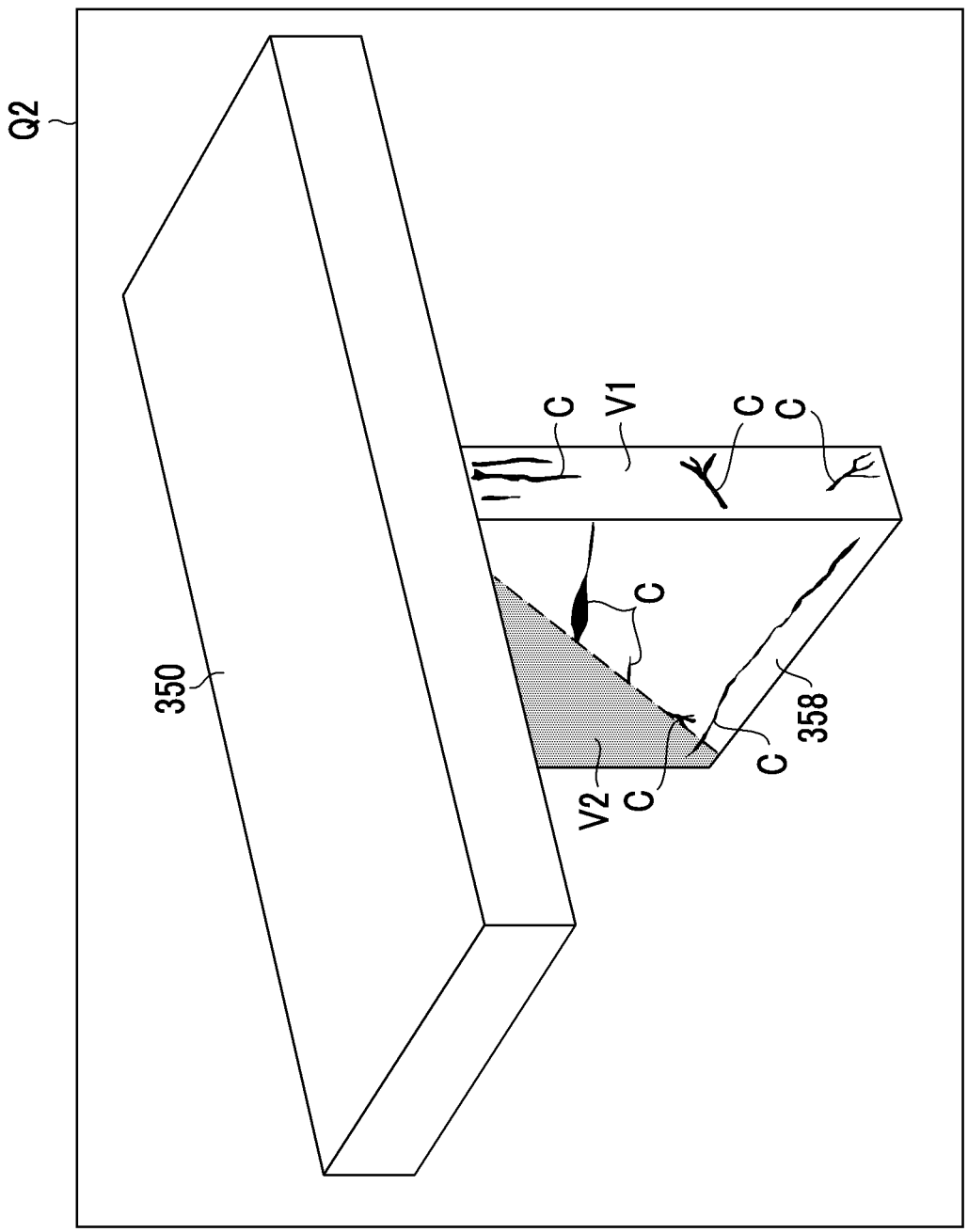
FIG. 26 is a diagram illustrating a wide angle image in a case where imaging is performed by decreasing an exposure amount.

FIG. 26 is a diagram illustrating a wide angle image Q2 in a case where imaging is performed by decreasing the exposure amount. The wide angle image Q2 is captured at an exposure amount smaller than the wide angle image Q1 captured at an appropriate exposure. Specifically, the wide angle image Q2 is captured by decreasing the exposure amount such that the image of the cracks C is obtained even in the wash-out region V1 in the wide angle image Q1.

Figure 27:
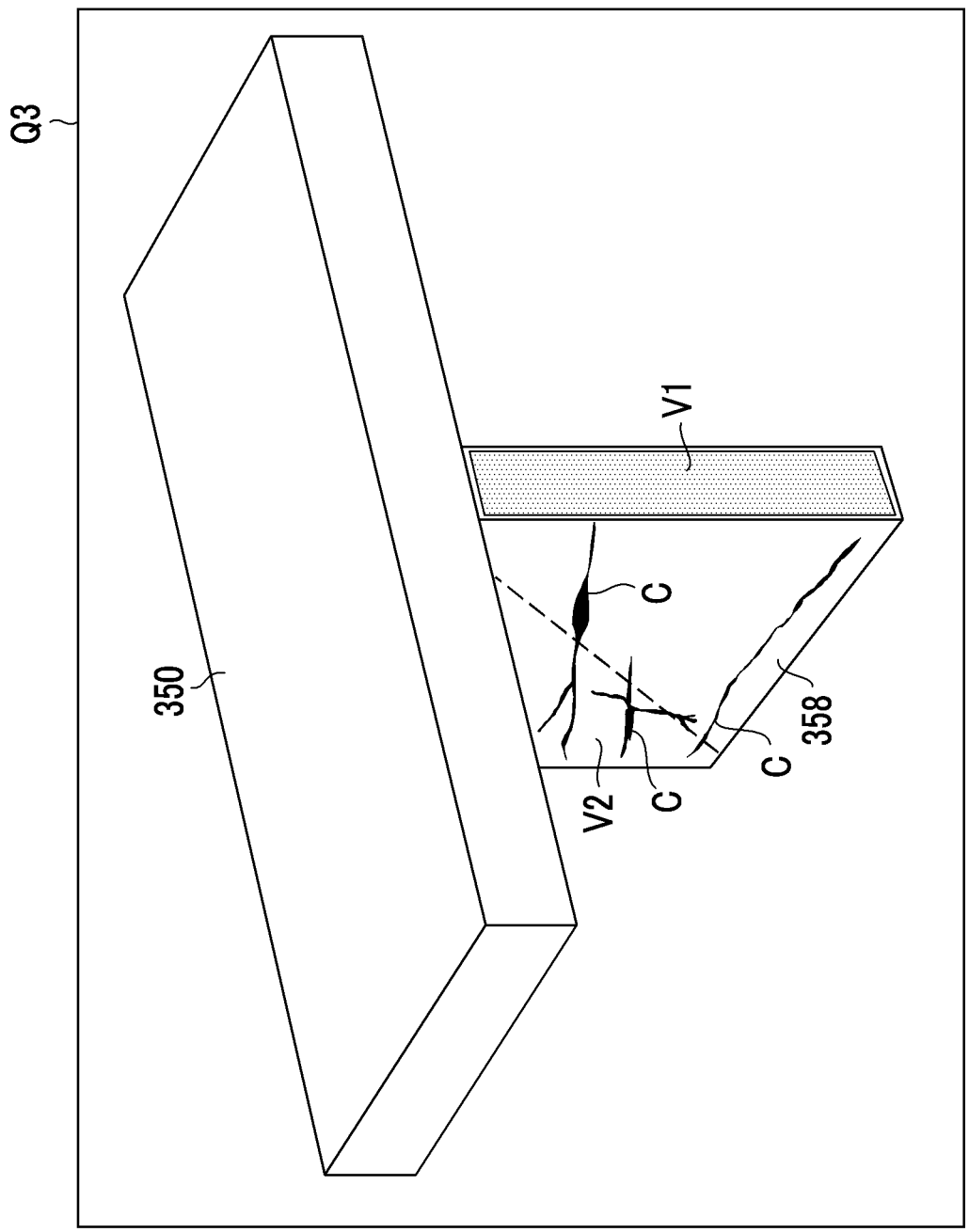
FIG. 27 is a diagram illustrating a wide angle image in a case where imaging is performed by increasing the exposure amount.

FIG. 27 is a diagram illustrating a wide angle image Q3 in a case where imaging is performed by increasing the exposure amount. The wide angle image Q3 is captured at a larger exposure amount than the wide angle image Q1 captured at an appropriate exposure. Specifically, the wide angle image Q3 is captured by increasing the exposure amount such that the image of the cracks C is obtained even in the blocked-up shadow region V2 in the wide angle image Q1.

Figure 30:
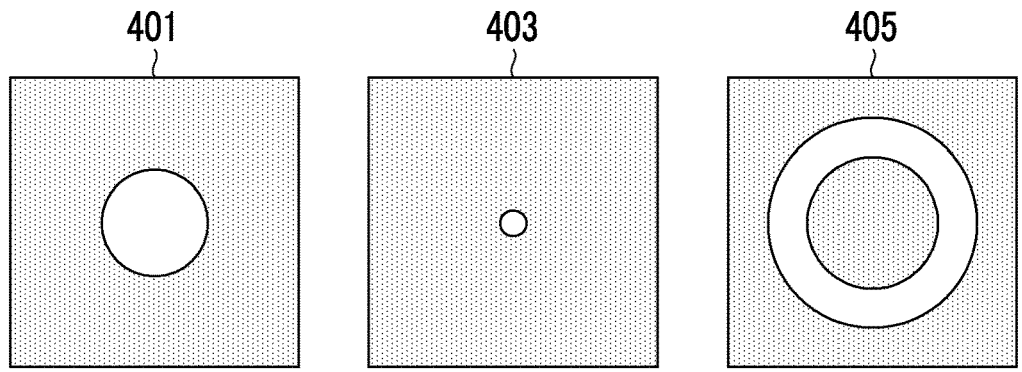
FIG. 30 is a diagram illustrating light blocking masks in a case of acquiring two wide angle images of different exposures and a telephoto image.
Figure 32:
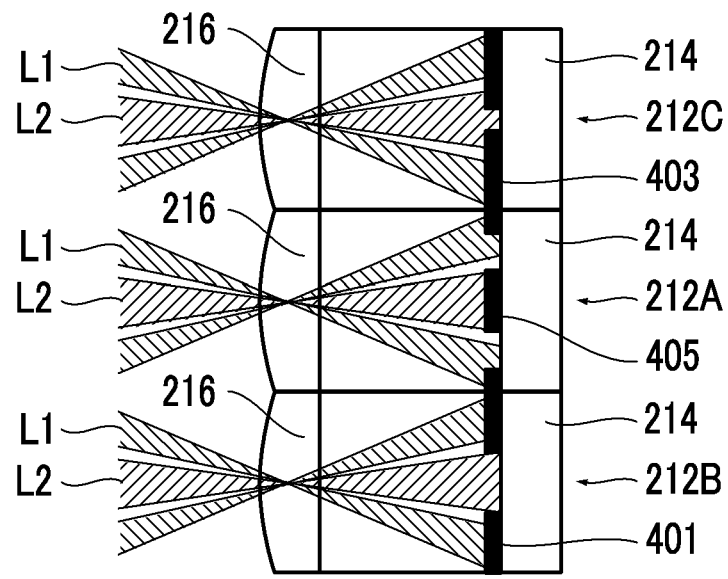
FIG. 32 is a conceptual diagram of the configuration in which each pixel of the image sensor selectively receives light from the corresponding optical system.

The wide angle image Q2 is obtained from third pixels 212C in which a light blocking mask 403 to be described using FIG. 30 and FIG. 32 is installed, and the wide angle image Q3 is obtained from the second pixels 212B in which a light blocking mask 401 is installed. The wide angle image Q1 and the wide angle image Q2 are captured at the same time at the same imaging position.

Figure 28:
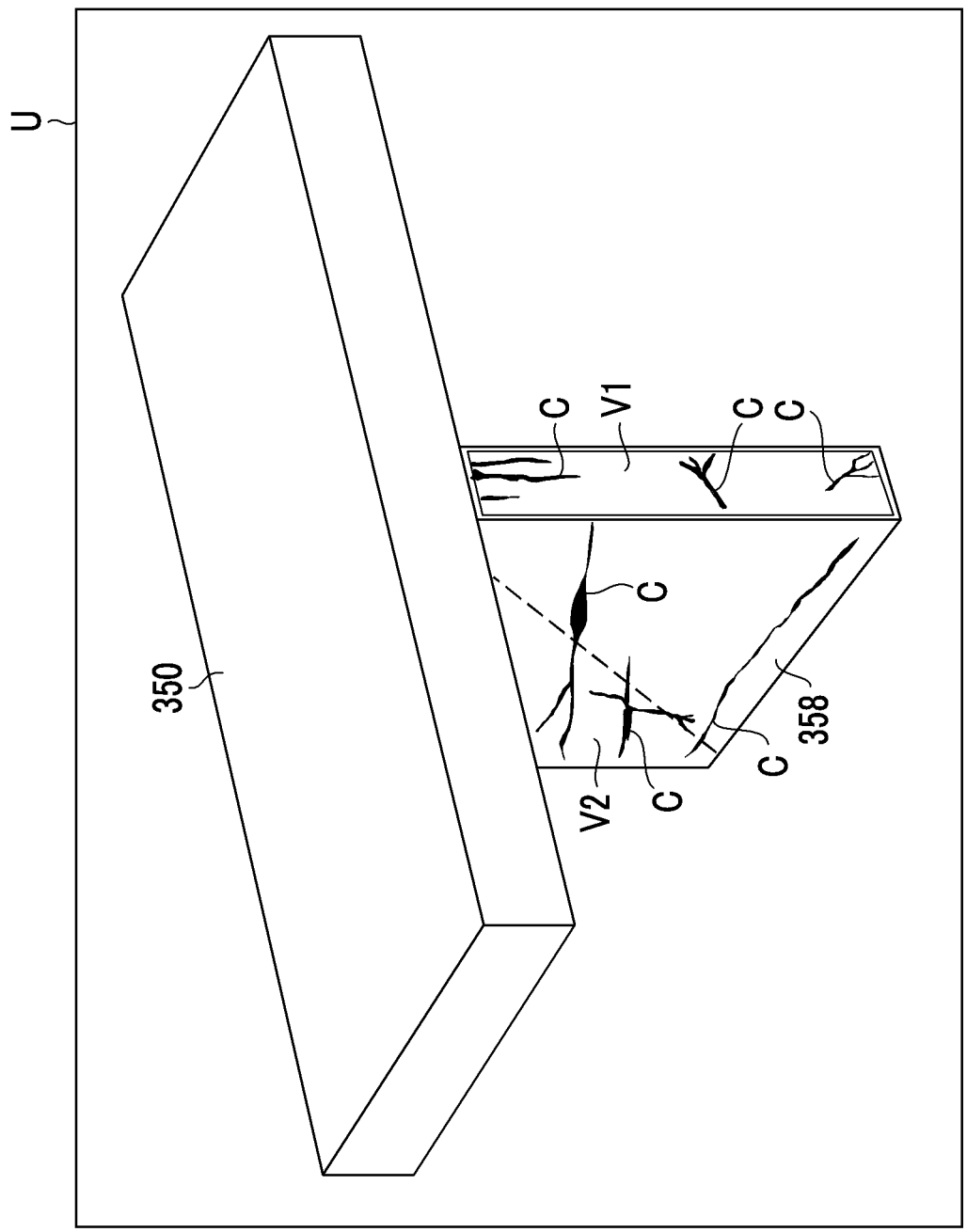
FIG. 28 is a diagram illustrating a wide dynamic range wide angle image.

FIG. 28 is a diagram illustrating a wide dynamic range wide angle image.

A wide dynamic range wide angle image U is generated by the wide dynamic range image generation part 302. Specifically, the wide dynamic range wide angle image U is generated by performing the dynamic range enlargement processing (composition) on the wide angle image Q2 and the wide angle image Q3. The generated wide dynamic range wide angle image U has an enlarged dynamic range, and the image of the cracks C in the wash-out region V1 and the blocked-up shadow region V2 can be obtained.

Figure 29:
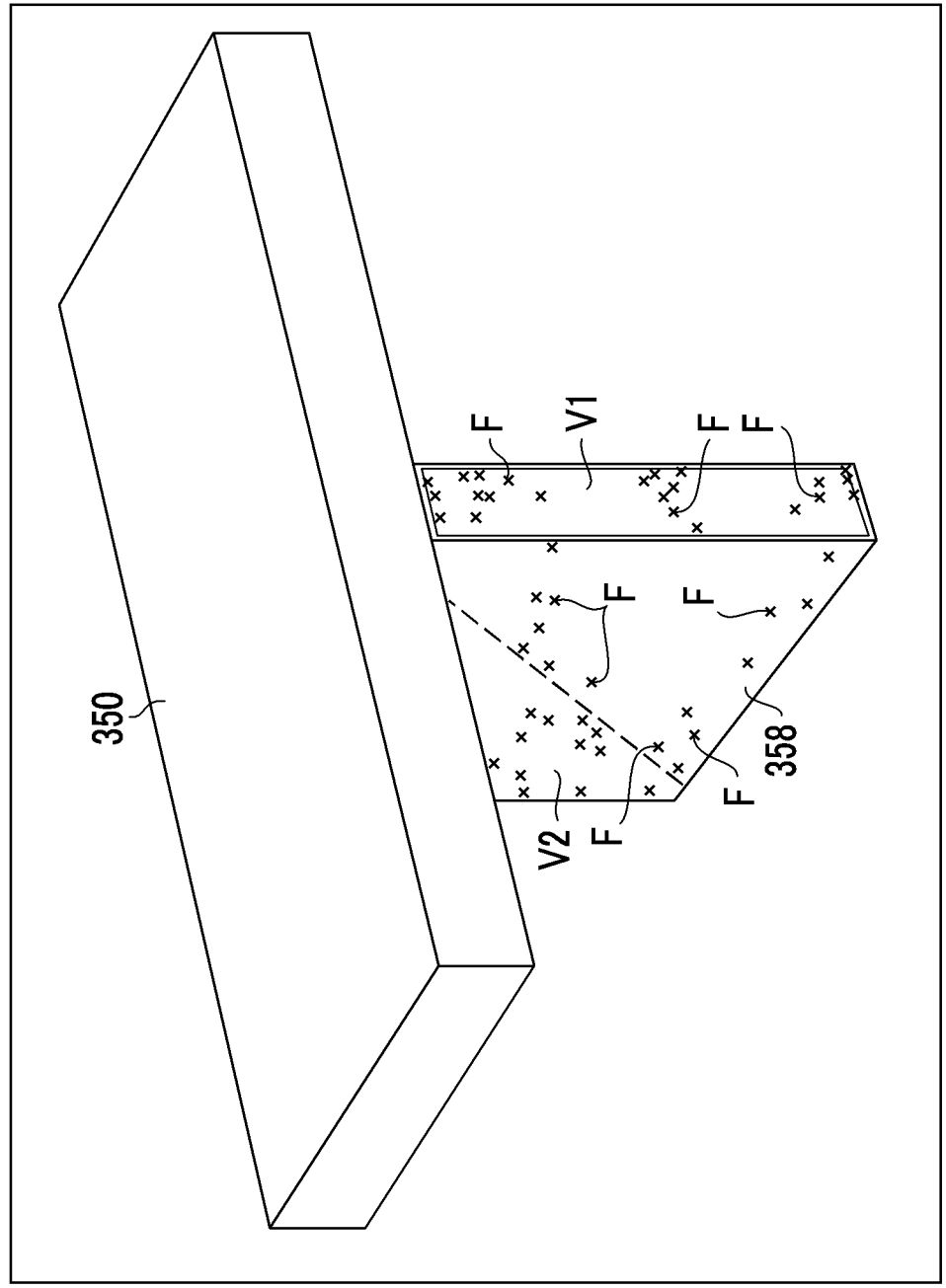
FIG. 29 is a diagram illustrating one example of the result of detection of the feature points.

FIG. 29 is a diagram illustrating one example of a result of detection of the feature points F in the wide dynamic range wide angle image U. The composition information acquisition part 2b can detect more feature points F by detecting the feature points F based on the wide dynamic range wide angle image U. More feature points F are detected in a detection result of the feature points F based on the wide dynamic range wide angle image U, compared to a detection result (refer to FIG. 25) of the feature points F based on a wide angle image U1 of a normal dynamic range. The reason is that since the image of the cracks C is obtained in the wash-out region V1 and the blocked-up shadow region V2 in the wide dynamic range wide angle image U, the feature points F can be detected even in the wash-out region V1 and the blocked-up shadow region V2.

As described above, by detecting the feature points F based on the wide dynamic range wide angle image U, more feature points F can be detected, and more accurate composition information can be obtained.

<<Aspect of Acquisition of Wide Angle Image>>

Next, an example of acquiring two wide angle images of different exposures to be input into the wide dynamic range image generation part 302 will be described.

In a case of acquiring two images of different exposures, a method of acquiring two images by performing imaging twice by changing the exposure is present. However, in this method, a deviation in time occurs in a case of acquiring two images. Thus, a deviation in image may occur.

Therefore, a method of acquiring two wide angle images of different exposures at the same time in the imaging apparatus 100 will be described below.

FIG. 30 is a diagram illustrating light blocking masks in a case of acquiring two wide angle images of different exposures and a telephoto image. By using three types of light blocking masks illustrated in FIG. 30, two wide angle images of different exposure amounts and a telephoto image can be acquired at the same time by performing imaging once. Two captured images of different exposure amounts are acquired from the photodiode 214 in which the light blocking mask 401 having a large size central hole and the light blocking mask 403 having a small size central hole are disposed. A difference in exposure amount occurs due to a magnitude of a size of the central hole of the light blocking mask. That is, the exposure amount varies by changing an area of an opening shape. For example, in a case where a diameter is changed by ¼, a quantity of light is changed by ¹⁄₁₆, and a difference in exposure amount corresponding to four stops can be expressed. The user can adjust a magnitude of the exposure amount with respect to an appropriate exposure using the size of the central hole of the light blocking mask. A telephoto image is acquired from the photodiode 214 in which a light blocking mask 405 having a donut shape is disposed.

Figure 31:
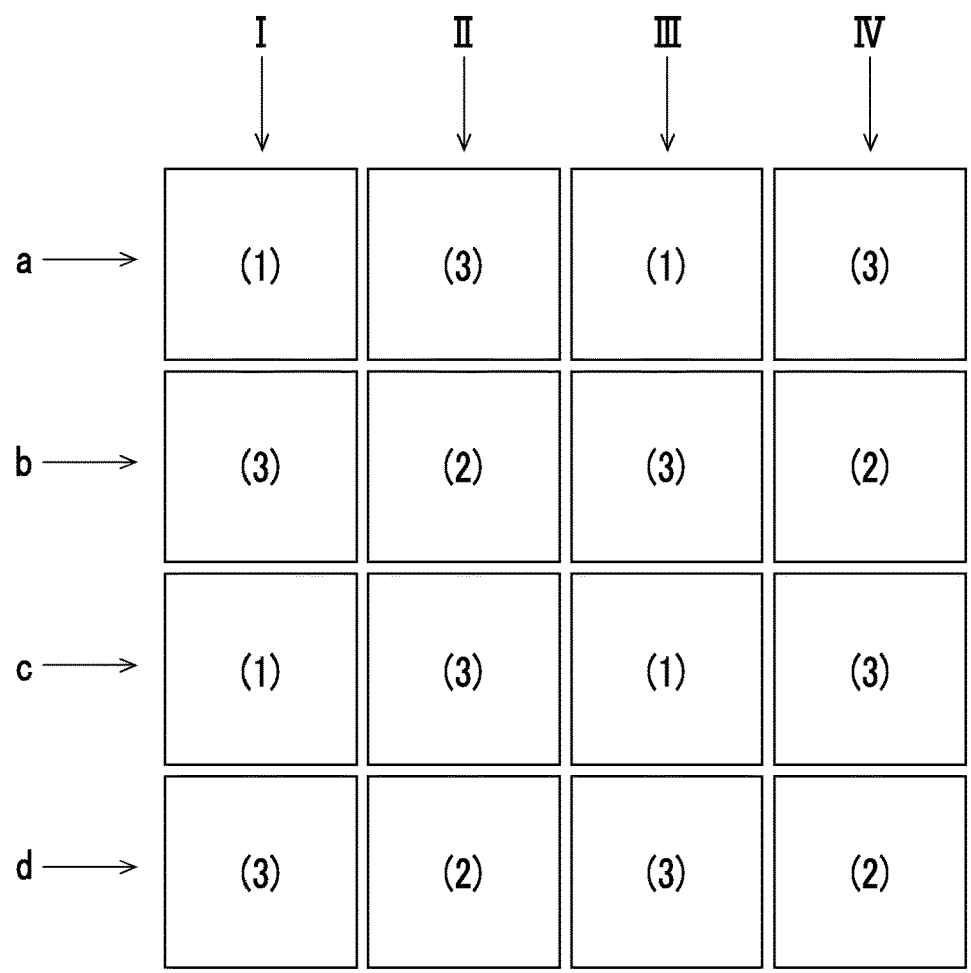
FIG. 31 is a diagram illustrating an example of arrangement of light blocking masks.

FIG. 31 is a diagram illustrating an example of arrangement of three types of light blocking masks described using FIG. 30. In FIG. 31, (1) denotes the light blocking mask 401 having a large size central hole, (2) denotes the light blocking mask 403 having a small size central hole, and (3) denotes the light blocking mask 405 having a donut shape. As illustrated in FIG. 31, arrangement is made in a checkered pattern (checkered flag pattern) of the light blocking mask 401 having a large size central hole, the light blocking mask 403 having a small size central hole, and the light blocking mask 405 having a donut shape. Specifically, in 4×4 arrangement, the light blocking mask 401 having a large size central hole and the light blocking mask 405 having a donut shape are alternately arranged in a row and c row, and the light blocking mask 405 having a donut shape and the light blocking mask 403 having a small size central hole are alternately arranged in b row and d row. In I column and III column, the light blocking mask 401 having a large size central hole and the light blocking mask 405 having a donut shape are alternately arranged. In II column and IV column, the light blocking mask 405 having a donut shape and the light blocking mask 403 having a small size central hole are alternately arranged.

FIG. 32 is a conceptual diagram of a configuration in which each pixel of the image sensor 210 in a case where the light blocking masks illustrated in FIG. 30 are disposed selectively receives light from a corresponding optical system. Parts already described using FIG. 12 will be designated by the same reference signs and will not be described.

As illustrated in FIG. 32, each pixel is configured to comprise the photodiode 214, the microlens 216, and the light blocking masks 401, 403, and 405. The microlens 216 and the light blocking masks 401, 403, and 405 function as a pupil separation unit that causes luminous flux passing through each of the telephoto optical system 310 and the wide angle optical system 320 to be selectively incident on each pixel of the image sensor 210 by pupil separation.

The light blocking masks 401, 403, and 405 are arranged between the microlens 216 and the photodiode 214. The light blocking masks 401, 403, and 405 block a part of light passing through the microlens 216. The light blocking mask 405 of the first pixel 212A blocks the light L2 passing through the wide angle optical system 320. The light blocking mask 401 of the second pixel 212B blocks the light L1 passing through the telephoto optical system 310. The light blocking mask 403 of the third pixel 212C blocks the light L1 passing through the telephoto optical system 310. A light blocking amount of the light L1 varies due to a difference in size of the central hole between the light blocking mask 401 and the light blocking mask 403 (refer to FIG. 30). Accordingly, wide angle images of different exposure amounts can be acquired.

By the above configuration, the first pixels 212A selectively receive the light L1 passing through the telephoto optical system 310, the second pixels 212B selectively receive the light L2 passing through the wide angle optical system 320, and the third pixels 212C selectively receive the light L2 passing through the wide angle optical system 320. Accordingly, an image signal of the telephoto image obtained through the telephoto optical system 310 can be acquired at the same time by acquiring the image signals of the first pixels 212A. At the same time, image signals of two wide angle images of different exposure amounts obtained through the wide angle optical system 320 can be acquired by acquiring image signals of the second pixels 212B and the third pixels 212C.

Figure 33:
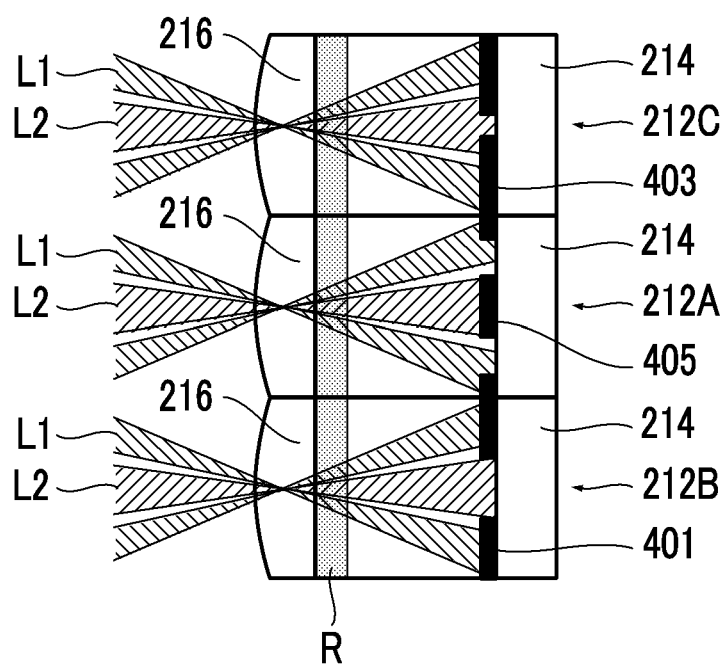
FIG. 33 is a conceptual diagram of the configuration in which each pixel of the image sensor selectively receives light from the corresponding optical system.

FIG. 33 is a conceptual diagram of a configuration in which each pixel of the image sensor 210 in a case where a color image signal is obtained selectively receives light from a corresponding optical system. Parts already described using FIG. 12 and FIG. 32 will be designated by the same reference signs and will not be described.

In FIG. 33, a red color filter R is disposed on a surface of the microlens 216 facing the photodiode 214. Accordingly, a red image signal of the telephoto image obtained through the telephoto optical system 310 and red image signals of two wide angle images of different exposure amounts obtained through the wide angle optical system 320 can be acquired.

Figure 34:
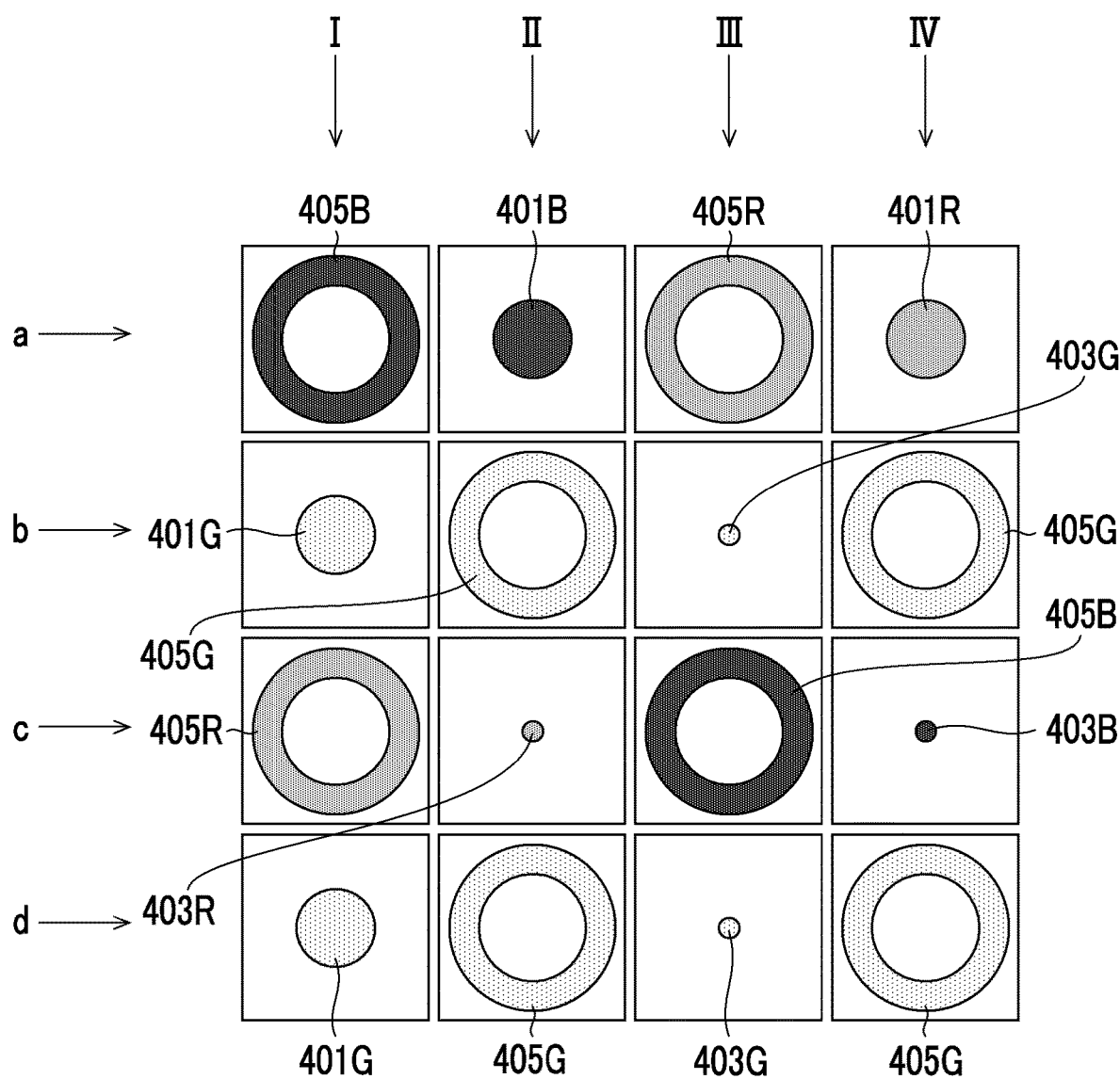
FIG. 34 is a diagram illustrating an example of arrangement of light blocking masks and color filters.

FIG. 34 is a diagram illustrating an example of arrangement of three types of light blocking masks illustrated in FIG. 30 and color filters. In FIG. 34, arrangement of color filters of red (R), green (G), and blue (B) and the light blocking masks 401, 403, and 405 corresponding to the color filters are illustrated. For example, a part in which a blue color filter and the light blocking mask 405 are correspondingly arranged is denoted by reference sign 405B. A correspondence relationship between arrangement of the color filters of red (R), green (G), and blue (B) and the light blocking masks 401, 403, and 405 is denoted by reference signs. Specifically, in 4×4 arrangement, reference sign 405B, reference sign 401B, reference sign 405R, and reference sign 401R are arranged in a row. In c row, reference sign 405R, reference sign 403R, reference sign 405B, and reference sign 403B are arranged. In b row and d row, reference sign 401G, reference sign 405G, reference sign 403G, and reference sign 405G are arranged.

In I column, reference sign 405B, reference sign 401G, reference sign 405R, and reference sign 401G are arranged. In II column, reference sign 401B, reference sign 405G, reference sign 403R, and reference sign 405G are arranged. In III column, reference sign 405R, reference sign 403G, reference sign 405B, and reference sign 403G are arranged. In IV column, reference sign 401R, reference sign 405G, reference sign 403B, and reference sign 405G are arranged. By having such arrangement, pixels of red (R), green (G), and blue (B) having the light blocking masks 401, 403, and 405 can be almost equally obtained.

Figure 35:
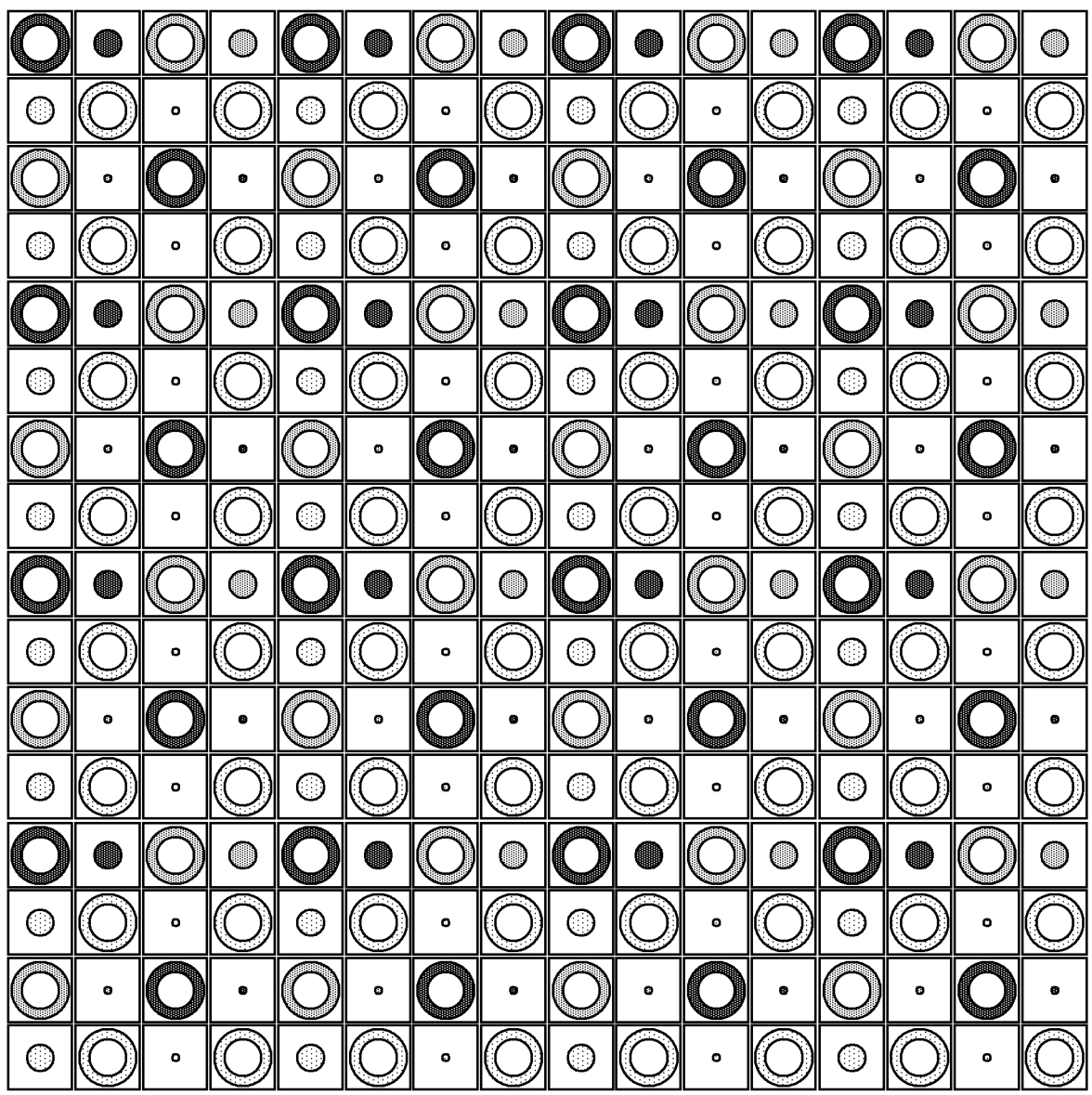
FIG. 35 is a diagram illustrating arrangement of color filters.

FIG. 35 is a diagram illustrating arrangement of color filters covering the whole surface of the image sensor 210 by repeating 4×4 arrangement illustrated in FIG. 34 as one unit.

Other Embodiments

Next, other embodiments of the present invention will be described.

Figure 36:
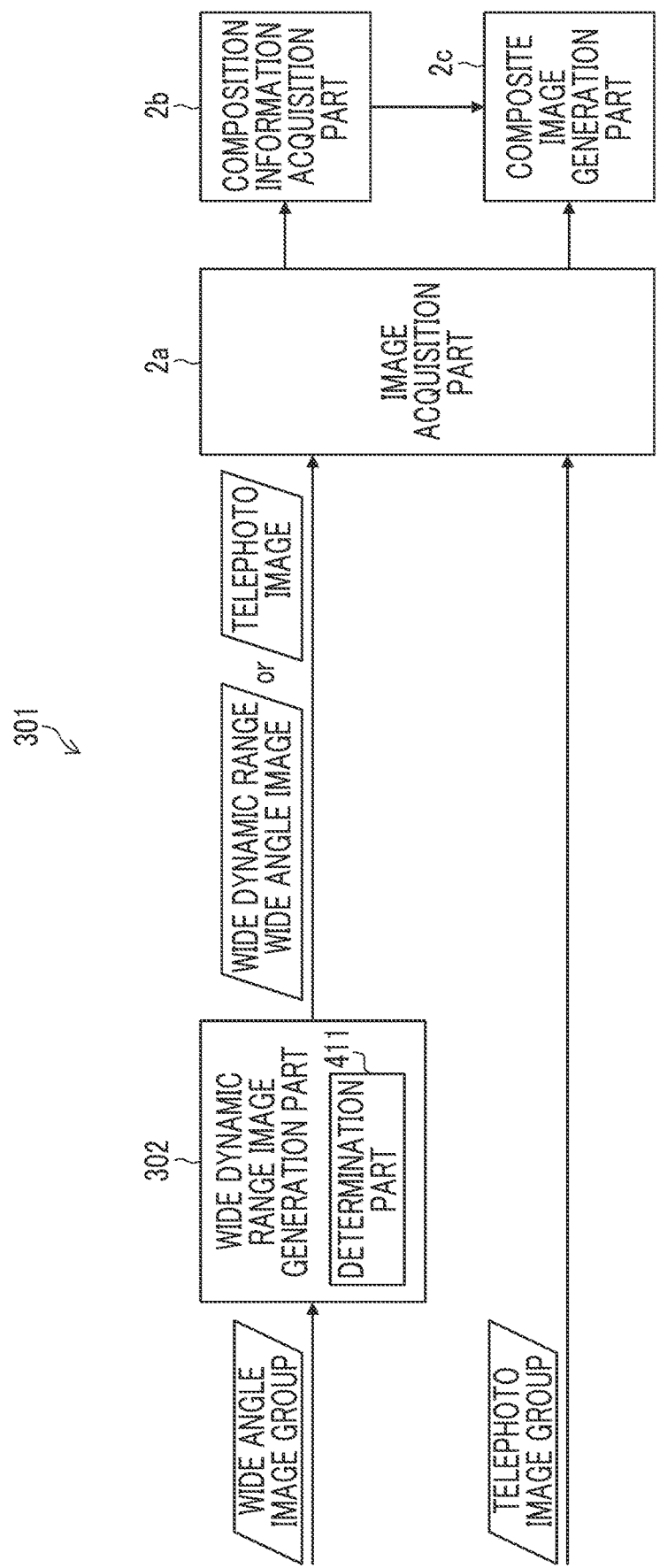
FIG. 36 is a function block diagram illustrating an embodiment of the image generation part.

FIG. 36 is a function block diagram illustrating an embodiment of the image generation part 301 of the present embodiment. Parts already described using FIG. 17 will be designated by the same reference signs and will not be described.

The image generation part 301 mainly comprises the wide dynamic range image generation part 302, a determination part 411, the image acquisition part 2a, the composition information acquisition part 2b, and the composite image generation part 2c.

The determination part 411 determines whether or not to execute generation of the wide dynamic range wide angle image by the wide dynamic range image generation part 302 in accordance with a width of an intensity of light of the wide angle image. The wide dynamic range image generation part 302 generates the wide dynamic range wide angle image only in a case where the determination part 411 determines to execute generation of the wide dynamic range wide angle image. The wide dynamic range image generation part 302 does not generate the wide dynamic range wide angle image in a case where the determination part 411 determines not to execute generation of the wide dynamic range wide angle image. In this case, the wide angle image is input into the image acquisition part 2a.

Various standards can be employed as a determination standard of the determination part 411. For example, the determination part 411 performs determination based on a size of a brightness range of the wide angle image. Specifically, in a case where the brightness range is greater than or equal to a threshold value, the wide dynamic range wide angle image is generated. In a case where the brightness range is less than the threshold value, the wide dynamic range wide angle image is not generated. Alternatively, for example, in a case where the number of wash-out and/or blocked-up shadow pixels of the wide angle image is greater than or equal to a threshold value, the determination part 411 determines to generate the wide dynamic range wide angle image. In a case where the number of wash-out and/or blocked-up shadow pixels of the wide angle image is less than the threshold value, the determination part 411 determines not to generate the wide dynamic range wide angle image. Alternatively, for example, in a case where a size of a wash-out and/or blocked-up shadow region of the wide angle image is greater than or equal to a threshold value, the determination part 411 determines to generate the wide dynamic range wide angle image. In a case where the size of the wash-out and/or blocked-up shadow region of the wide angle image is less than the threshold value, the determination part 411 determines not to generate the wide dynamic range wide angle image.

The determination part 411 may perform determination in accordance with a width of an intensity of light of a region of the wide angle image corresponding to a region analyzed by the composition information acquisition part 2b in the wide dynamic range wide angle image. Specifically, in a case where the bridge 350 described using FIG. 24, FIG. 25, and FIG. 26 is imaged, the determination part 411 determines a range of brightness of the bridge 350. In this case, a region 352 and a region 354 are not the bridge 350 and are background regions and thus, are not included in a region to be determined. A region 356 is a part of a region of the bridge 350 and thus, is included in the region to be determined.

Figure 37:
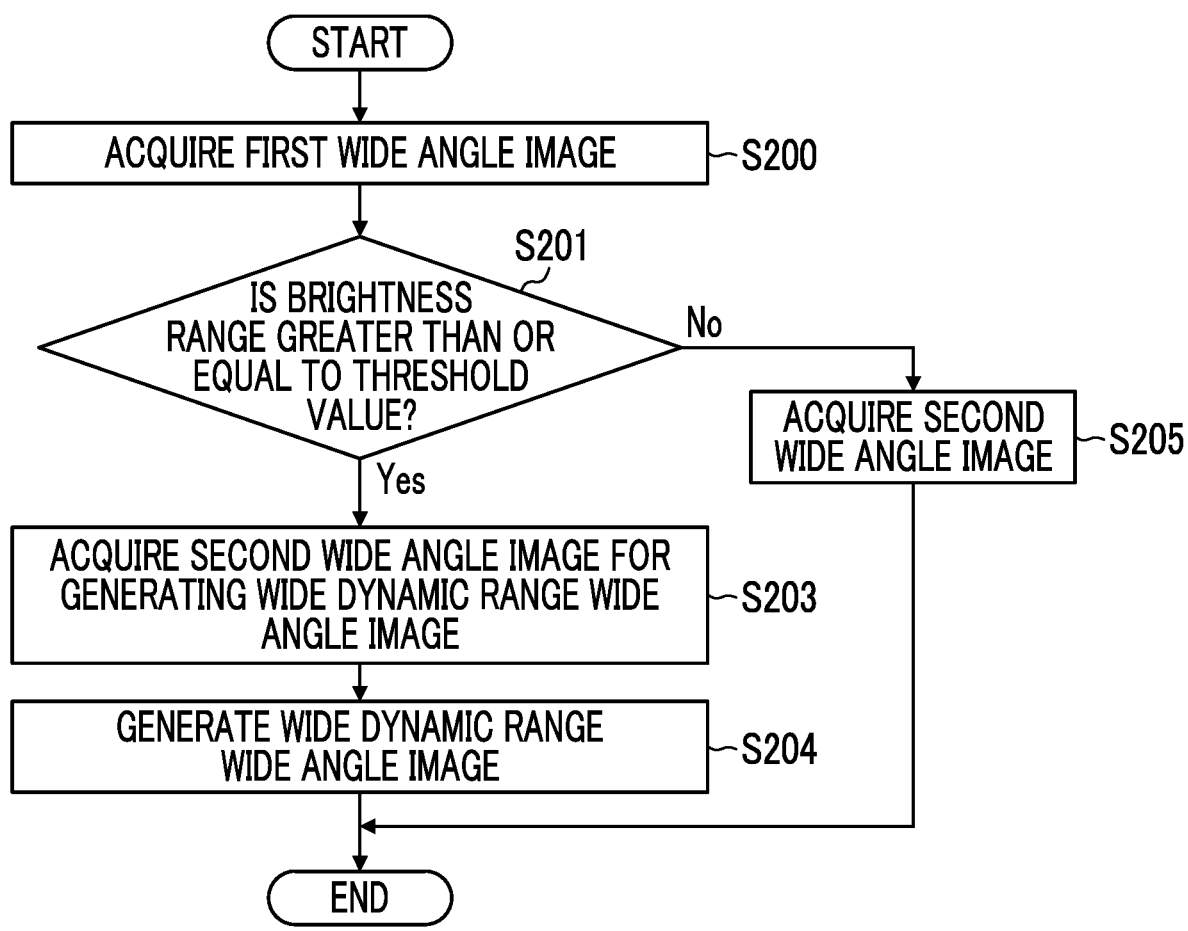
FIG. 37 is a flowchart illustrating an operation of the imaging apparatus.

Next, a determination timing of the determination part 411 of the present embodiment will be described. FIG. 37 is a flowchart illustrating an operation of the imaging apparatus 100 in a case where determination is performed by the determination part 411 after a first wide angle image is captured, and then, a second wide angle image is captured. In the following description, acquisition of the telephoto image acquired at the same time as the first wide angle image and the second wide angle image will not be described.

First, the first wide angle image is acquired (step S200) and is input into the wide dynamic range image generation part 302. The determination part 411 acquires the first wide angle image and determines whether or not a brightness range of the first wide angle image is greater than or equal to the threshold value (step S201) (determination step). In a case where the brightness range of the first wide angle image is greater than or equal to the threshold value, a wide angle image for generating the wide dynamic range wide angle image is acquired as a subsequent wide angle image (second wide angle image) (step S203). Specifically, a wide angle image is captured at an exposure smaller than an appropriate exposure, or two wide angle images of different exposures are captured. The acquired second wide angle image is input into the wide dynamic range image generation part 302, and the wide dynamic range wide angle image is generated (step S204). In a case where the brightness range of the first wide angle image is less than the threshold value, the second wide angle image is acquired by normal imaging (wide dynamic range wide angle image is not generated) (step S205).

<<System>>

In the above description, a form of compositing the telephoto image in the imaging apparatus 100 is described. However, the telephoto image may be composited by a computer on which an image generation apparatus 2 is mounted.

Figure 38:
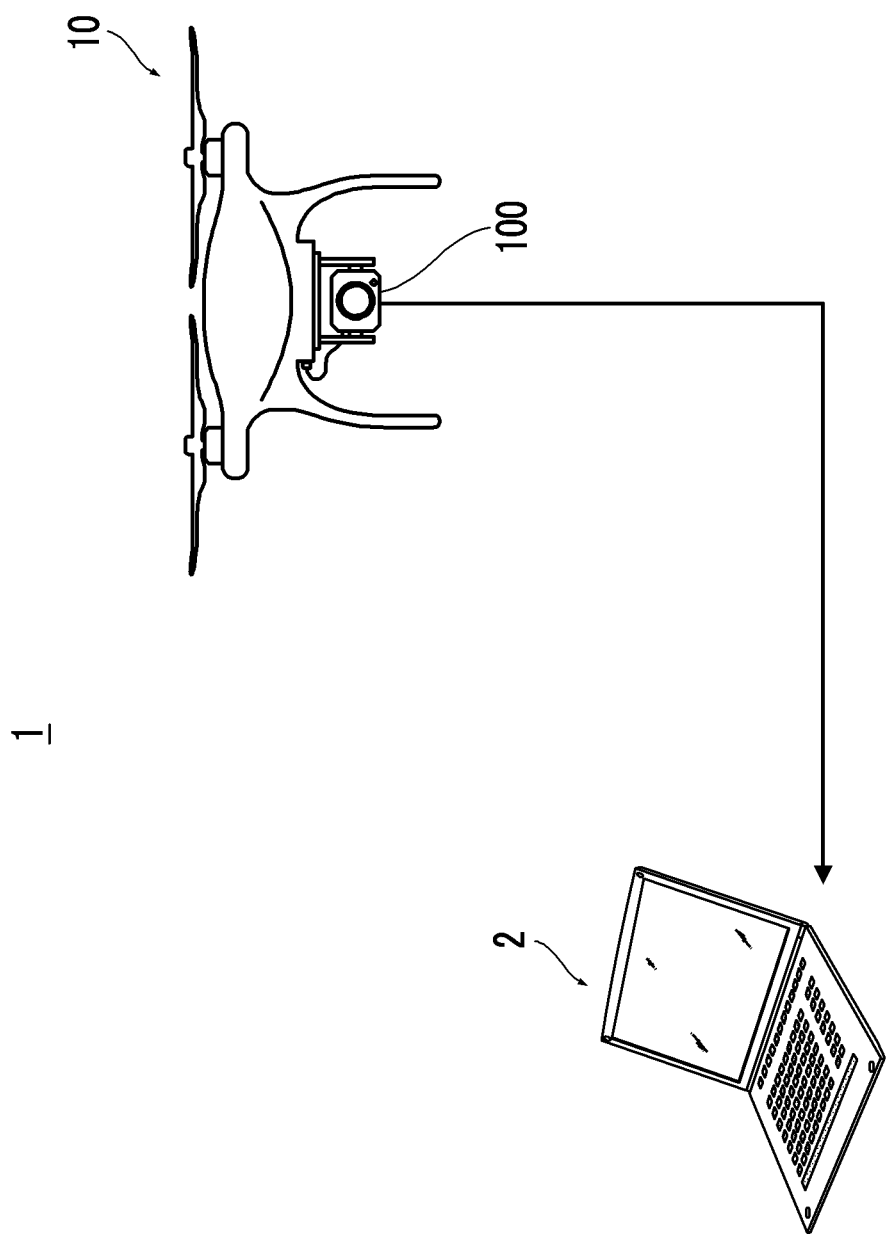
FIG. 38 is a diagram schematically illustrating a system.

FIG. 38 is a diagram conceptually illustrating a system 1 according to the embodiment of the present invention. The system 1 according to the embodiment of the present invention is configured with the unmanned aerial vehicle 10 on which the imaging apparatus 100 is mounted, and the image generation apparatus 2. The wide dynamic range wide angle image and the telephoto image acquired by the imaging apparatus 100 are input into the image generation apparatus 2. The wide dynamic range wide angle image and the telephoto image may be input into the image generation apparatus 2 for each predetermined period or each time imaging is performed. Alternatively, the wide dynamic range wide angle image and the telephoto image may be input into the image generation apparatus 2 at once after acquisition of all captured images is finished by the imaging apparatus 100. The wide dynamic range wide angle image and the telephoto image are input into the image generation apparatus 2 in a wired or wireless manner.

FIG. 39 is a block diagram illustrating a functional configuration example of the image generation apparatus 2 of the present embodiment. Parts already described will be designated by the same reference signs and will not be described.

The image generation apparatus 2 comprises the image acquisition part 2a, the composition information acquisition part 2b, and the composite image generation part 2c. The telephoto image and the wide dynamic range wide angle image acquired by the imaging apparatus 100 are acquired by the image acquisition part 2a. The composition information is acquired from the wide dynamic range wide angle image by the composition information acquisition part 2b. Then, the telephoto image group is composited based on the composition information, the information related to the focal lengths of the wide angle optical system 320 and the telephoto optical system 310, and the telephoto image group.

[Others]

While the imaging apparatus 100 is mounted on the unmanned aerial vehicle 10, the imaging apparatus 100 is not limited to the unmanned aerial vehicle and may be mounted on a manned aerial vehicle, an artificial satellite, an automobile, a robot, and other moving objects. The imaging apparatus 100 may be mounted on a tripod head or the like, and imaging may be performed while revolving the camera. Furthermore, imaging may be performed while a person holds the imaging apparatus 100 in a hand and changes the position of the imaging apparatus 100. In this case, the moving object is not necessary.

The image generation program which is installed on the computer for causing the computer to function as the image generation apparatus 2, and a computer-readable recording medium (non-transitory recording medium) on which the image generation program is recorded are also one aspect of the present invention.

The composition information acquired by analyzing the wide dynamic range wide angle image group is not limited to the present embodiment. Any composition information that is to be used for compositing the telephoto image group and is acquired based on a plurality of feature points included in the overlapping region between the wide dynamic range wide angle images may be used. The telephoto image to be composited may be a two-dimensional image or a three-dimensional image.

The present invention is not limited to the above embodiments and can be subjected to various modifications without departing from the spirit of the present invention.

EXPLANATION OF REFERENCES

1: image generation system
2: image generation apparatus
2a: image acquisition part
2b: composition information acquisition part
2c: composite image generation part
3: display part
4, 124, 232: recording part
10: unmanned aerial vehicle
12: controller
12a: controller operation part
12b: controller display part
12c: controller side wireless communication part
12d: controller micom
14: main body frame
14A: torso portion
14B: arm portion
14C: leg portion
16: propeller
20: propeller drive motor
22: motor driver
24: sensor part
26: vehicle side wireless communication part
28: vehicle side wired communication part
30: unmanned aerial vehicle micom
30a: movement control part
30b: camera control part 30c: vehicle side wireless communication control part
30d: vehicle side wired communication control part
100: imaging apparatus
210: image sensor
210a: image sensor driver
212A: first pixel
212B: second pixel
214: photodiode
216: microlens
218: light blocking mask
230: analog signal processing part
234: camera side wired communication part
236: camera micom
236a: digital signal processing part
236b: recording control part
236c: camera side wired communication control part
236d: imaging control part
236e: stop control part
236f: focusing control part
236g: lens position detection part
300: imaging lens
301: image generation part
302: wide dynamic range image generation part
310: telephoto optical system
310a: first lens
310b: first mirror
310c: second mirror
310d: stop
320: wide angle optical system
320a: first lens
320b: second lens
320c: stop
320d: third lens
320e: fourth lens
330: common lens
340: focusing motor
340a: focusing motor driver
342a: photointerrupter
342b: MR sensor
344: stop motor
344a: stop driver
500: solar power generation facility
510: solar power generation unit
520: solar cell module
FP: feature point
Im1, Im2: image
L: optical axis
L1, L2: light
M: matrix
O: origin
R: arrow
T1 to T10: telephoto image
W1 to W10: wide angle image
X1, X2: range
Zt, Zt1, Zt2, Zw, Zw1, Zw2: imaging range
θ1, θ2: angle of view

What is claimed is:

1. An imaging apparatus comprising:
an imaging optical system including a wide angle optical system and a telephoto optical system having a common optical axis;
a directional sensor that includes a plurality of pixels configured with photoelectric conversion elements arranged in two dimensions, the directional sensor including the plurality of pixels selectively receiving luminous flux incident through each of the wide angle optical system and the telephoto optical system by pupil separation; and
at least one processor configured to:
generate, based on an image signal from the directional sensor, a wide dynamic range wide angle image obtained by enlarging a dynamic range of a wide angle image captured through the wide angle optical system;
acquire a wide dynamic range wide angle image group configured with the generated wide dynamic range wide angle image, and a telephoto image group which is captured at the same time as the wide dynamic range wide angle image group and is configured with a telephoto image which is the image signal from the directional sensor and is captured through the telephoto optical system, wherein a subject is imaged in the wide dynamic range wide angle image group and the telephoto image group while an imaging position is changed;
acquire composition information to be used for compositing the telephoto image group by analyzing the acquired wide dynamic range wide angle image group; and
generate an image in which the telephoto image group is composited, based on the composition information, information related to focal lengths of the wide angle optical system and the telephoto optical system, and the telephoto image group.

2. The imaging apparatus according to claim 1,
wherein the at least one processor detects a feature point of the wide dynamic range wide angle image by analyzing the wide dynamic range wide angle image group.

3. The imaging apparatus according to claim 1,
wherein the at least one processor estimates the imaging position and an attitude in a case of capturing the wide dynamic range wide angle image and a solid shape of the subject using a structure from motion method or a simultaneous localization and mapping method.

4. The imaging apparatus according to claim 1, further comprising:
the at least one processor is further configured to determine whether or not to execute generation of the wide dynamic range wide angle image in accordance with a width of an intensity of light of the wide angle image,
acquire a wide angle image group configured with the wide angle image and the telephoto image group in a case where the wide dynamic range wide angle image is not generated, and
acquire the composition information to be used for compositing the telephoto image group by analyzing the wide angle image group.

5. The imaging apparatus according to claim 4,
wherein the at least one processor performs determination in accordance with a width of an intensity of light of a region of the wide angle image corresponding to a region to be analyzed in the wide dynamic range wide angle image.

6. The imaging apparatus according to claim 1,
wherein the at least one processor generates the wide dynamic range wide angle image based on the wide angle image obtained by performing imaging at an exposure smaller than an appropriate exposure.

7. The imaging apparatus according to claim 1,
wherein the at least one processor generates the wide dynamic range wide angle image based on two wide angle images of different exposures.

8. The imaging apparatus according to claim 7,
wherein the directional sensor receives luminous flux corresponding to a plurality of the wide angle images of different exposures at the same time.

9. An unmanned moving object comprising:
the imaging apparatus according to claim 7; and
at least one processor configured to control movement,
wherein the at least one processor decreases a movement speed in a case of acquiring two wide angle images of different exposures.

10. An unmanned moving object comprising:
the imaging apparatus according to claim 1; and
at least one processor configured to control movement.

11. An imaging method of an imaging apparatus including an imaging optical system including a wide angle optical system and a telephoto optical system having a common optical axis, and a directional sensor that includes a plurality of pixels configured with photoelectric conversion elements arranged in two dimensions, the directional sensor including the plurality of pixels selectively receiving luminous flux incident through each of the wide angle optical system and the telephoto optical system by pupil separation, the imaging method comprising:
generating, based on an image signal from the directional sensor, a wide dynamic range wide angle image obtained by enlarging a dynamic range of a wide angle image captured through the wide angle optical system;
acquiring a wide dynamic range wide angle image group configured with the wide dynamic range wide angle image, and a telephoto image group which is captured at the same time as the wide dynamic range wide angle image group and is configured with a telephoto image which is the image signal from the directional sensor and is captured through the telephoto optical system, a subject being imaged in the wide dynamic range wide angle image group and the telephoto image group while an imaging position is changed;
acquiring composition information to be used for compositing the telephoto image group by analyzing the acquired wide dynamic range wide angle image group; and
generating an image in which the telephoto image group is composited, based on the composition information, information related to focal lengths of the wide angle optical system and the telephoto optical system, and the telephoto image group.

12. The imaging method according to claim 11,
wherein in acquiring the composition information, a feature point of the wide dynamic range wide angle image is detected by analyzing the wide dynamic range wide angle image group.

13. The imaging method according to claim 11,
wherein in acquiring the composition information, the imaging position and an attitude in a case of capturing the wide dynamic range wide angle image and a solid shape of the subject are estimated using a structure from motion method or a simultaneous localization and mapping method.

14. The imaging method according to claim 11, further comprising:
determining whether or not to execute generation of the wide dynamic range wide angle image in generating the wide dynamic range wide angle image, in accordance with a width of an intensity of light of the wide angle image,
wherein in acquiring the image, a wide angle image group configured with the wide angle image and the telephoto image group are acquired in a case where the wide dynamic range wide angle image is not generated, and
in acquiring the composition information, the composition information to be used for compositing the telephoto image group is acquired by analyzing the wide angle image group.

15. A system comprising an imaging apparatus and an image generation apparatus,
wherein the imaging apparatus includes:
an imaging optical system including a wide angle optical system and a telephoto optical system having a common optical axis;
a directional sensor having a plurality of pixels configured with photoelectric conversion elements arranged in two dimensions, the directional sensor including the plurality of pixels selectively receiving luminous flux incident through each of the wide angle optical system and the telephoto optical system by pupil separation; and
a camera-side micom configured to generate, based on an image signal from the directional sensor, a wide dynamic range wide angle image obtained by enlarging a dynamic range of a wide angle image captured through the wide angle optical system, and
the image generation apparatus includes at least one processor configured to:
acquire a wide dynamic range wide angle image group configured with the wide dynamic range wide angle image generated by the camera-side micom, and a telephoto image group which is captured at the same time as the wide dynamic range wide angle image group and is configured with a telephoto image which is the image signal from the directional sensor and is captured through the telephoto optical system, a subject being imaged in the wide dynamic range wide angle image group and the telephoto image group while an imaging position is changed;
acquire composition information to be used for compositing the telephoto image group by analyzing the acquired wide dynamic range wide angle image group; and
generate an image in which the telephoto image group is composited, based on the composition information, information related to focal lengths of the wide angle optical system and the telephoto optical system, and the telephoto image group.

16. A non-transitory computer-readable recording medium causing a computer to execute an imaging step of an imaging apparatus in a case where an instruction stored in the recording medium is read out by the computer, the imaging apparatus including an imaging optical system including a wide angle optical system and a telephoto optical system having a common optical axis, and a directional sensor that includes a plurality of pixels configured with photoelectric conversion elements arranged in two dimensions, the directional sensor including the plurality of pixels selectively receiving luminous flux incident through each of the wide angle optical system and the telephoto optical system by pupil separation, the imaging step comprising:
generating, based on an image signal from the directional sensor, a wide dynamic range wide angle image obtained by enlarging a dynamic range of a wide angle image captured through the wide angle optical system;

acquiring a wide dynamic range wide angle image group configured with the wide dynamic range wide angle image, and a telephoto image group which is captured at the same time as the wide dynamic range wide angle image group and is configured with a telephoto image which is the image signal from the directional sensor and is captured through the telephoto optical system, a subject being imaged in the wide dynamic range wide angle image group and the telephoto image group while an imaging position is changed;

acquiring composition information to be used for compositing the telephoto image group by analyzing the acquired wide dynamic range wide angle image group; and generating an image in which the telephoto image group is composited, based on the composition information, information related to focal lengths of the wide angle optical system and the telephoto optical system, and the telephoto image group.

\* \* \* \* \*